US008713513B2

(12) United States Patent
Sarkar et al.

(10) Patent No.: US 8,713,513 B2
(45) Date of Patent: Apr. 29, 2014

(54) EVALUATING PROGRAMMER EFFICIENCY IN MAINTAINING SOFTWARE SYSTEMS

(75) Inventors: Santonu Sarkar, Bangalore (IN); Girish Maskeri Rama, Bangalore (IN); Nagaraja Nanjegowda Siddaramappa, Bangalore (IN); Avinash C. Kak, West Lafayette, IN (US); Shubha Ramachandran, Bangalore (IN)

(73) Assignee: Infosys Limited, Bangalore (IN)

( * ) Notice: Subject to any disclaimer, the term of this patent is extended or adjusted under 35 U.S.C. 154(b) by 1882 days.

(21) Appl. No.: 11/610,442

(22) Filed: Dec. 13, 2006

(65) Prior Publication Data
US 2008/0155508 A1 Jun. 26, 2008

(51) Int. Cl.
*G06F 9/44* (2006.01)
*G06Q 10/00* (2012.01)
(52) U.S. Cl.
USPC ........... 717/101; 717/104; 717/132; 705/7.38
(58) Field of Classification Search
None
See application file for complete search history.

(56) References Cited

U.S. PATENT DOCUMENTS

| 5,689,711 | A  | * | 11/1997 | Bardasz et al. ............... 717/105 |
| 5,826,256 | A  | * | 10/1998 | Devanbu ............................. 1/1 |
| 6,502,239 | B2 | * | 12/2002 | Zgarba et al. ................. 717/168 |
| 6,505,341 | B1 | * | 1/2003  | Harris et al. .................. 717/100 |
| 6,530,075 | B1 | * | 3/2003  | Beadle et al. .................. 717/114 |
| 6,611,786 | B1 | * | 8/2003  | Zhang et al. ................... 702/156 |
| 6,622,299 | B1 | * | 9/2003  | Santosuosso et al. ........ 717/127 |
| 6,984,177 | B2 | * | 1/2006  | Lydon et al. .................... 463/42 |
| 7,010,780 | B2 | * | 3/2006  | Perycz et al. ................... 717/107 |
| 7,069,546 | B2 |   | 6/2006  | Tsarfati |
| 7,111,283 | B2 | * | 9/2006  | Fraser et al. ................... 717/136 |
| 7,146,605 | B2 | * | 12/2006 | Beer et al. ..................... 717/126 |
| 7,428,726 | B1 |   | 9/2008  | Cowan et al. |
| 7,437,717 | B1 |   | 10/2008 | Cowan et al. |
| 7,478,367 | B2 | * | 1/2009  | Morgan et al. ................. 717/124 |
| 7,788,641 | B2 | * | 8/2010  | Tarr et al. ....................... 717/125 |
| 7,797,669 | B1 | * | 9/2010  | Rehof et al. ................... 717/100 |
| 7,895,579 | B2 |   | 2/2011  | Guerrera et al. |
| 8,370,195 | B1 | * | 2/2013  | Whitcomb et al. ........... 705/7.38 |
| 2001/0037492 | A1 | * | 11/2001 | Holzmann ......................... 717/4 |
| 2002/0100022 | A1 | * | 7/2002  | Holzmann ..................... 717/126 |
| 2002/0144236 | A1 | * | 10/2002 | Beer et al. ..................... 717/124 |
| 2002/0170048 | A1 | * | 11/2002 | Zgarba et al. ................. 717/168 |
| 2003/0056193 | A1 | * | 3/2003  | Perycz et al. ................... 717/107 |
| 2003/0084425 | A1 | * | 5/2003  | Glaser ............................. 717/110 |
| 2003/0212982 | A1 | * | 11/2003 | Brooks et al. .................. 717/100 |
| 2004/0031015 | A1 | * | 2/2004  | Ben-Romdhane et al. ... 717/107 |

(Continued)

OTHER PUBLICATIONS

Mitchell et al., On the Automatic Modularization of software systems using the bunch Tool, IEEE Transactions in Sofware Engineering, vol. 32, No. 3, Mar. 2006, p. 193-207.*

(Continued)

*Primary Examiner* — Tuan Q. Dam
*Assistant Examiner* — Zheng Wei
(74) *Attorney, Agent, or Firm* — Klarquist Sparkman, LLP

(57) ABSTRACT

Quality of modularization of source code is tested using different perspectives such as a structural modularity perspective, an architectural modularity perspective, a size perspective, and a similarity of purpose perspective. A history of changes in modularization may be kept such that the degree to which given source code is well-modularized can be determined over time. The changes made to the code by individual programmers may be kept, such that the degree to which their coding enhanced or harmed modularization may be tracked.

20 Claims, 52 Drawing Sheets

(56) References Cited

U.S. PATENT DOCUMENTS

| | | | |
|---|---|---|---|
| 2004/0143819 A1* | 7/2004 | Cheng et al. | 717/125 |
| 2005/0210441 A1* | 9/2005 | Tarr et al. | 717/101 |
| 2005/0223363 A1* | 10/2005 | Black-Ziegelbein et al. | 717/127 |
| 2006/0075305 A1* | 4/2006 | Robinson et al. | 714/38 |
| 2006/0206872 A1* | 9/2006 | Krishnaswamy | 717/133 |
| 2006/0248504 A1* | 11/2006 | Hughes | 717/101 |
| 2007/0106575 A1* | 5/2007 | Barr et al. | 705/30 |
| 2007/0234319 A1* | 10/2007 | Matsutsuka et al. | 717/140 |
| 2007/0250817 A1 | 10/2007 | Boney | |
| 2007/0250818 A1 | 10/2007 | Boney | |
| 2008/0148225 A1 | 6/2008 | Sarkar et al. | |
| 2008/0155508 A1 | 6/2008 | Sarkar et al. | |
| 2008/0256518 A1* | 10/2008 | Aoshima et al. | 717/127 |
| 2009/0158249 A1 | 6/2009 | Tomkins et al. | |
| 2009/0187396 A1* | 7/2009 | Kinno et al. | 703/22 |
| 2010/0070948 A1 | 3/2010 | Rama et al. | |
| 2010/0070949 A1 | 3/2010 | Rama et al. | |

OTHER PUBLICATIONS

Merant PVCS Version Manager User's Guide, 2000, pp. 1-382.*
Allen et al., "Measuring coupling and cohesion of software modules: An information-theory approach," in *Proc. Seventh International Software Metrics Symposium (Metrics '01)*. IEEE, pp. 124-134, 2001.
Andritsos et al., "Information-theoretic software clustering," *IEEE Transactions on Software Engineering*, vol. 31, No. 2, pp. 150-165, Feb. 2005.
Arevalo, "High-level views in object-oriented systems using formal concept analysis," Ph.D. dissertation, 133 pages, 2004.
Arisholm et al., "Dynamic coupling measurement for object-oriented software," *IEEE Transactions on Software Engineering*, vol. 30, No. 4, pp. 491-506, Aug. 2004.
Bachmann et al., "Software architecture documentation in practice: Documenting architectural layers," Carnegie Mellon University, Software Engineering Institute, Special Report CMU/SEI-2000-SR-004, 45 pages, 2000.
Briand et al., "Property-based software engineering measurement," *IEEE Transactions on Software Engineering*, vol. 22, No. 1, pp. 68-85, Jan. 1996.
Briand et al., "A unified framework for coupling measurement in object-oriented systems," *IEEE Transactions on Software Engineering*, vol. 25, No. 1, pp. 91-121, 1999.
Chidamber et al., "A metrics suite for object oriented design," *IEEE Transactions on Software Engineering*, vol. 20, No. 6, pp. 476-493, 1994.
Churcher et al., "Comments on a metrics suite for object-oriented design" *IEEE Transactions on Software Engineering*, vol. 21, No. 3, pp. 263-265, 1995.
Clements et al., *Documenting Software Architecture, Views and Beyond*. Addison Wesley, 553 pages, Sep. 2002.
Darcy et al., "Software complexity: Toward a unified theory of coupling and cohesion," in *ICSC Workshop Spring 2002*, pp. 1-12, 2002.
Doval et al., "Automatic clustering of software systems using a genetic algorithm," in *Proceedings of Software Technology and Engineering Practice*, pp. 1-9, 1999.
El Emam et al., "The Optimal Class Size for Object Oriented Software," *IEEE Trans. Software Eng.*, vol. 28, No. 5, pp. 494-509, May 2002.
Fahmy et al., "Software architecture transformations," in *Proceedings of the International Conference on Software Maintenance*, San Jose, pp. 88-96, Oct. 2000.
Fenton et al., *Software Metrics: A Rigorous and Practical Approach*, PWS Publishing Co., 652 pages, 1997.
Girba et al., "Yesterdays weather: Guiding early reverse engineering efforts by summarizing the evolution of changes," in *Proceedings of the International Conference on Software Maintenance*, I. C. Society, Ed., pp. 1-10, 2004.
Halstead, *Elements of Software Science*, Operating and Programming Systems Series. New York, NY: Elsevier Publications, vol. 7, 169 pages, 1977.

Harman et al., "An empirical study of the robustness of two module clustering fitness functions," in *Proceedings of the 2005 conference on Genetic and evolutionary computation*. New York, NY, USA: ACM Press, pp. 1029-1036, 2005.
Hatton, "Reexamining the fault density-component size connection," *IEEE Software*, vol. 14, No. 2, pp. 89-97, 1997.
Hutchens et al., "System structure analysis: clustering with data binding," *IEEE Transactions on Software Engineering*, vol. SE-11, No. 8, pp. 749-757, Aug. 1985.
Kitchenham et al., "Towards a framework for software validation measures" *IEEE Transactions on Software Engineering*, vol. 21, No. 12, p. 929-944, Dec. 1995.
Lakos, *Large Scale C++ Software Design*, Addison-Wesley, 895 pages, 1996.
MacCormack et al., "Exploring the structure of complex software designs: An empirical study of open source and proprietary code," Harvard Business School Working Paper, Tech. Rep. 05-016, pp. 1-39, 2004.
Mandavi et al., "A multiple hill climbing approach to software module clustering," in *ICSM*, 19th International Conference on Software Maintenance (ICSM 2003). IEEE Computer Society, pp. 1-10, 2003.
Mancoridis et al., "Bunch: A clustering tool for the recovery and maintenance of software system structures," in *ICSM*, pp. 1-10, 1999.
Mancoridis et al., "Using automatic clustering to produce high level system organizations of source code," in *IWPC '98: Proceedings of the 6th International Workshop on Program Comprehension*. Washington, DC, USA: IEEE Computer Society, pp. 45-52, 1998.
Martin, "Design principles and design patterns," www.objectmentor.com, pp. 1-34, 2000.
McCabe et al., "Software complexity," *Crosstalk, Journal of Defense Software Engineering*, vol. 7, No. 12, 10 pages, Dec. 1994.
Mitchell et al., "Search based reverse engineering," in *SEKE '02: Proceedings of the 14th international conference on Software engineering and knowledge engineering*. New York, NY, USA: ACM Press, pp. 431-438, 2002.
Morasca et al., "Comments on 'Towards a Framework for Software Measurement Validation,'" *IEEE Trans. Software Eng.*, vol. 23, No. 3, pp. 187-188, Mar. 1997.
Offutt et al., "A software metric system for module coupling," *Journal of Systems and Software*, vol. 20, No. 3, pp. 295-308, 1993.
Oman et al., "Constructing and testing of polynomials predicting software maintainability," *Journal of Systems and Software*, vol. 24, No. 3, pp. 251-266, Mar. 1994.
Parnas, "On the criteria to be used in decomposing systems into modules," *Communications of the ACM*, vol. 15, No. 12, pp. 1053-1058, 1972.
Rosenberg, "Some Misconceptions About Lines of Code," *Proc. Fourth Int'l Software Metrics Symp. (Metrics '97)*, pp. 137-142, 1997.
Sarkar et al., "API-Based and Information-Theoretic Metrics for Measuring the Quality of Software Modularization," *IEEE Transactions on Software Engineering*, vol. 33, No. 1, pp. 14-32, Jan. 2007.
Sartipi et al., "Component clustering based on maximal association," in *Proc. Eighth Working Conference on Reverse Engineering (WCRE '01)*, pp. 103-114, 2001.
Sartipi, "Software architecture recovery based-on pattern matching," Ph.D. dissertation synopsis, School of Computer Science, University of Waterloo, pp. 1-5, 2003.
Sartipi, "Software architecture recovery based-on pattern matching," Ph.D. dissertation, School of Computer Science, University of Waterloo, 312 pages, 2006.
Schwanke, "An Intelligent Tool for Reengineering Software Modularity," *Proc. 18th Int'l Conf Software Eng.*, pp. 83-92, May 1991.
Seng et al., "Search-based improvement of subsystem decompositions," *Proceedings of the 2005 conference on Genetic and evolutionary computation*, 1045-1051, 2005.
Sharma et al., "Applicability of Weyukers property 9 to object oriented metrics," *IEEE Transactions on Software Engineering*, vol. 32, No. 3, pp. 209-211, Mar. 2006.
Shokoufandeh et al., "Spectral and meta-heuristic algorithms for software clustering," *Journal of System and Software*, vol. 77, No. 3, pp. 213-223, Sep. 2005.

(56) References Cited

OTHER PUBLICATIONS

Siff et al., "Identifying modules via concept analysis," *IEEE Transactions on Software Engineering*, vol. 25(6), pp. 749-768, 1999.

Stevens et al., "Structured design," *IBM Systems Journal*, vol. 13, pp. 115-139, 1974.

Tonella, "Concept analysis for module restructuring," *IEEE Transactions on Software Engineering*, vol. 27, No. 4, pp. 351-363, 2001.

van Rysselberghe et al., "Studying software evolution information by visualizing the change history," in *20th IEEE International Conference on Software Maintenance*, pp. 328-337, Sep. 2004.

Wen et al., "Software clustering based on omnipresent object detection," in *IWPC '05: Proceedings of the 13th International Workshop on Program Comprehension.* Washington, DC, USA: IEEE Computer Society, pp. 269-278, 2005.

Weyuker, "Evaluating software complexity measures," *IEEE Transactions on Software Engineering*, vol. 14, No. 9, pp. 1357-1365, Sep. 1988.

Yourdon et al., *Structured Design: Fundamentals of a Discipline of Computer Program and Systems Design.* Yourdon Press, 493 pages, 1979.

Sarkar et al., "API-Based and Information-Theoretic Metrics for Measuring the Quality of Software Modularization," IEEE Transactions on Software Engineering, Jan. 2007, accessed from IEEE digital library at www.computer.org on Dec. 7, 2006, 19 pages.

Sarkar et al., "Metrics for Analyzing Module Interactions in Large Software Systems," APSEC '05, Dec. 15-17, 2005, 8 pages.

\* cited by examiner

SLIM TOOL – Metrics Report
Overall System Health

4402

4404

4406

4408

4502

4504

4506

4508

EVALUATING PROGRAMMER EFFICIENCY IN MAINTAINING SOFTWARE SYSTEMS

COPYRIGHT AUTHORIZATION

A portion of the disclosure of this patent document contains material which is subject to copyright protection. The copyright owner has no objection to the facsimile reproduction by any one of the patent disclosure, as it appears in the United States Patent and Trademark Office patent files or records, but otherwise reserves all copyright rights whatsoever. Portions copyright IEEE (IEEE Transactions on Software Engineering, 2007), used with permission.

FIELD

The field relates generally to developing metrics to determine software quality. More particularly, the field relates to metrics developed to determine level of modularization of a software program.

BACKGROUND

Large software systems are generally developed systematically using structured development methodology. One common aspect is to organize the software into logical modules. Modules, ideally, are logical groupings of functions and related data structures that together offer a well-defined service. Correct module use promotes encapsulation. That is, implementation details are hidden, and interaction details with other modules (and the rest of the world) are consistently implemented through a set of published application programming interface (API) functions.

Modules themselves may be organized in layers. Layers, typically, are organized hierarchically such that modules in a given layer are only allowed to call modules in lower layers. Systems which are well modularized and which use layers properly are easier to understand as each change to the system only affects a small portion of the overall system. Thus, changes have less overall effect. For example, it takes less time to add new functionality, change existing functionality, and test and release the resulting modified modules even by those who are not conversant with the software.

Various measures of modularization have been proposed to determine modularization quality, such as cohesion metrics, coupling metrics, and combined cohesion/coupling metrics. Cohesion measures how self-contained code is, that is, how well the code in a module works together to provide a specific piece of functionality without the need for assistance from other modules. For example, cohesion can be measured as the ratio of the number of internal function-call dependencies that actually exist to the maximum possible internal dependencies.

Coupling measures the dependency of different code groupings; that is, within a module, to what degree changes in one function may affect other. Low coupling usually implies high cohesion, and vice versa. Ideally modules should have high cohesion (be self-contained) and low coupling (be relatively independent of other modules.)

One common metric, Modularization Quality (MQ), is a combined cohesion/coupling metric, and is calculated as the difference between the average cohesion and the average coupling.

Variations on the MQ which have been developed include a modified MQ which is the sum of modularization factors (MF) for clusters. For a given cluster, MF can be calculated as $$\frac{i}{i+1/2*j},$$

where i is the sum of internal function-call dependency weights and j is the sum of external function-call dependency weights. The cluster factor for a module is expressed as the ration of a weighted sum of the functional-call dependencies internal to a module to the sum of internal and external dependency weights.

Metrics have also been derived from a relational graph representation of software artifacts such as functions, data types, variable, etc. Relations such as function-call dependencies, type declaration of variables, macro definitions, and so on are mapped between modules. This class of metrics measures the degree of association between a module and other modules.

Other metrics include measures of how many methods are packed into classes, the depth of inheritance trees, inheritance fan-out, and measures of the degree of couplings between objects, where couplings are created by one object invoking a method on another object.

Tools which have been developed for software clustering have also, albeit indirectly, proposed modularization metrics. Software clustering tools may be used to determine, or more usually, recover the underlying architecture of, a software system after some catastrophic event. These tools attempt to partition a software system into logical, cohesive subsystems. For example, automated software-partitioning tools have been developed which quantitatively characterize modules by the degree to which the functions packaged within the same module contain shared information, such as by determining the degree of commonality of the names of data objects within the functions. Modules can also be characterized on the basis of function-call dependencies, such that if a function A calls a function B, then functions A and B are presumed to belong to the same module. Other metrics have also been proposed. These include quantitatively characterizing the degree to which functions packaged within the same module contain shared information. Functions may share information, for example, on the commonality of the names of data objects.

Structural information, such as shared name substrings for functions and variables, function-call dependencies, and so on can also be used to determine modularization. Another approach is to try to isolate "omnipresent objects," which are heavily-used object and functions. Analyses, such as those described earlier, relating to cohesion and coupling are then performed. This is done with the belief that omnipresent objects, unless specially categorized, distort the coupling/cohesion analysis.

However, these complexity metrics do not analyze the software from a coherent set of perspectives that together give an overall impression of how well the system is modularized from a variety of perspectives. That is, they do not analyze a system at large in terms of their modules, the cohesiveness of the modules, the interactions between modules, and how well the system has been divided into layers—super-modules. Furthermore, even the best-designed system can have its modularity degrade as the system ages and is maintained.

Even though a legacy application development can begin as a well modularized system with a layered architecture, it gradually degrades over a period of time as the system is maintained. The degradation in modularity can happen due to ad-hoc bug fixes and enhancements which disregard modularity design principles, such as have been discussed. Such degradation in modularity can cause a formerly robust system to become rigid and fragile.

In such a scenario, a manager who has responsibility for maintenance and enhancement of a legacy application, is not in a position to take appropriate corrective measures in spite of realizing the gradual degradation of the maintainability of the system if he or she has no way to accurately measure the type and location of the degradation or who, specifically, is causing the degradation. Because there is currently no good way to measure this degradation, there is similarly no good way to determine when the degradation occurs, or who or what is the likely cause of such degradation.

As the deterioration of modularity is not recognized, there is no reason for programmers, unaware of the problem, to concentrate on fixing the problem. Furthermore, there is no way to measure how well an individual programmer may be preserving or degrading the modularity of the system.

Thus, there is a need for systems and methods to measure system modularity that is, modularization quality.

SUMMARY

In an exemplary embodiment, a modularization evaluator may be used to determine the quality and/or the degree of modularization of a portion of software source code. This modularization evaluator may have a number of modules.

Modularization quality of modules may be evaluated using a structural modularity perspective which measures function-call traffic through an Applications Programming Interface (API) of at least one module. This metric may be calculated by one or more of the following indices: a model interaction index, an implicit dependency index, a non-API function closedness index, and an API function usage index.

Modularization quality of modules may be evaluated using an architectural modularity perspective that measures organization of modules into hierarchical partitions. This metric may be calculated by one or more of the following indices: a layer organization index, a cyclic dependency index, a model interaction stability index, and a testability index.

Modularization quality of modules may be evaluated using a size perspective that measures uniformity of module sizes in relation to total size of the source code, and which may have one or more of the following indices: a module size uniformity index and a module size boundedness index.

Modularization quality of modules may be evaluated using a similarity of purpose perspective that measures similarity of purpose of groupings within the source code, and which may have one or more of the following indices: a concept domination metric, and a coherency metric.

A history of changes in modularization as reflected in the source code may be kept such that the degree to which given source code is well-modularized can be determined over time. The changes made to the code by individual programmers may be kept, such that the degree to which their coding enhanced or harmed modularization may be tracked.

The foregoing and other objects, features, and advantages of the invention will become more apparent from the following detailed description, which proceeds with reference to the accompanying figures.

DETAILED DESCRIPTION

Overview of Technologies

The technologies described herein can be used in any of a variety of scenarios in which accurate determination of modularization of a software system or a portion of a software system is useful. For example, owners of software systems consisting of legacy code (which may consist of a million lines or more) may need to know whether the code should be automatically or semi-automatically modularized. To make this determination, the current degree of modularization must be understood. Furthermore, once such code is modularized, the success of the modularization can be determined by applying any of the techniques taught herein.

As another example, a company wishing to maintain existing code with a high degree of modularity can use the systems and methods herein to measure the quality of code at different times and thus take steps to ensure that the code's modularization does not degrade over time.

As a further example, a company can track the changes made by specific programmers to code, which may be legacy code, and by applying the modularization metrics taught herein, can determine the degree to which various programmers inadvertently introduced changes into the given body of software that has led to deterioration of the system modularity.

Source code includes any computer programming files that are human-readable, but that can be converted to machine-readable form. The type of source code used is not a limitation on the embodiments described herein. For example, and without limitation, the source code can be written in one, or more than one programming languages, thousands of which exist. Examples of possible source code programming languages include, but are not limited to, COBOL, C, C++, and Java.

A module is a logically cohesive unit of code. This may include files, functions, data structures, variables, and the like. For example, it may be a group of related classes (in object-oriented programming), may be substantially all the code in a single file, may be a group of related files, or the modules may be organized in a different fashion.

The word function here indicates any software grouping with input-output functions, such that procedures, subprograms, etc., are included.

Example 1

Exemplary System for Producing Modularization Quality Evaluation

Figure 1:
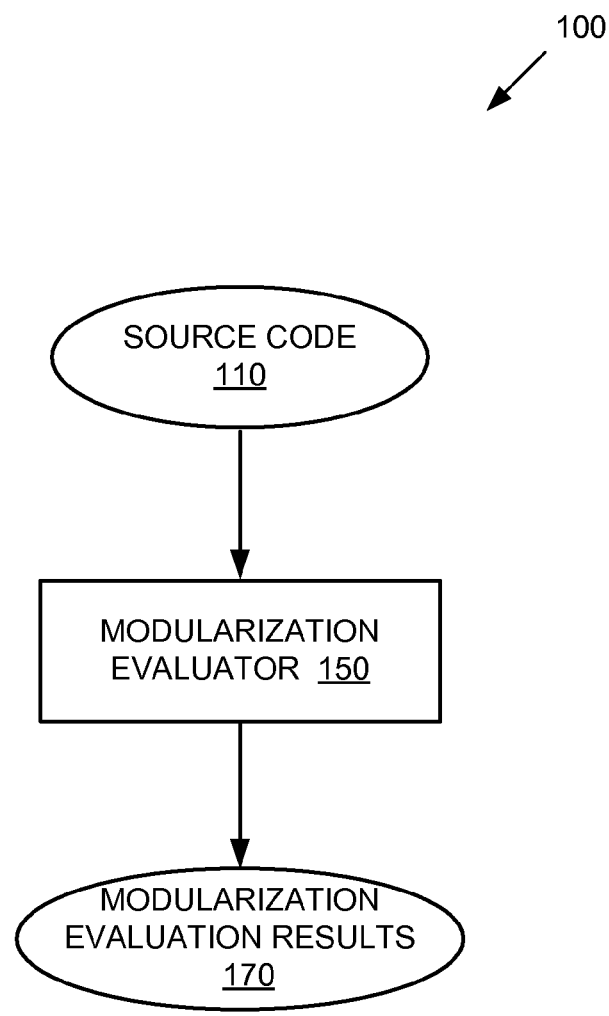
FIG. 1 is a block diagram of an exemplary system for using a modularization quality evaluator to evaluate at least a portion of the source code of a software program to determine modularization quality evaluation results.

FIG. 1 shows an exemplary system 100 for producing modularization quality evaluation results 170 of a software system. The source code 110 may be a large computer program, a computer program of any size for which modularization makes sense, or a portion of such a computer program. The source code may be written in any human-readable language which can be converted into machine-readable language. This source code 110 is processed by the modularization evaluator 150 to determine modularization results 170 which correspond to how well (or poorly) the software code is modularized. The modularization evaluator 150 can employ any of the modularization evaluators described herein.

Example 2

Exemplary Method for Producing Modularization Quality Evaluation

Figure 2:
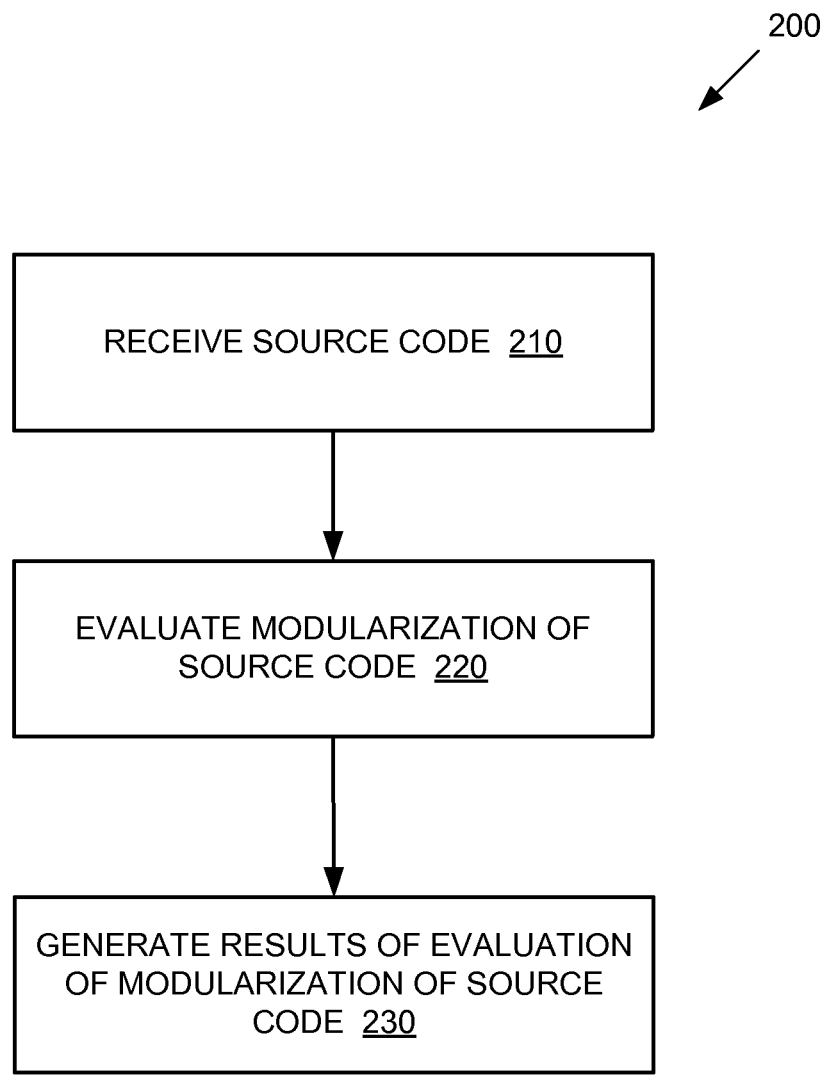
FIG. 2 is flowchart of an exemplary method for evaluating at least a portion of the source code of a software program to determine modularization quality evaluation results.

FIG. 2 shows an exemplary method 200 for producing a modularization quality evaluation. The method can be performed, for example, by the system 100 of FIG. 1. The method 200 and any of the other methods described herein can be performed by computer-executable instructions stored on one or more computer-readable media.

At 210 source code (e.g., the source code 110 of FIG. 1) representing at least a portion of a software program is received. At 220, the modularization of the source code 210 is evaluated. As described in the examples, modularization can be evaluated by a variety of metrics, including but not limited to: coupling-based structural metrics, size-based metrics, architectural metrics, metrics based on similarity of purpose, and the individual metrics contained therein.

At 230, the results (e.g., the modularization quality evaluation results 170) of the evaluation of the modularization of the source code is generated using the output of the source code evaluation 220.

Example 3

Exemplary Modularization Quality Evaluation Results

In any of the examples herein, the exemplary modularization quality evaluation results can comprise any one or more of the modularization metrics described herein.

The degree and quality of modularization can be observed from various perspectives which guide, but do not drive, the specifics of the various modularization metrics. Each of the modularization metrics embodiments discussed in any of the examples may incorporate one or more of the following modularization principles, discussed below.

Principles Related to Similarity of Purpose.

A module, ideally, groups a set of data structures and functions that together offer a well-defined service—similarity of purpose. The following principles can be used to determine if individual modules have a similar purpose:

maximization of module coherence on the basis of similarity of and singularity of purpose, minimization of purpose dispersion; maximization of module coherence on the basis of commonality of goals; and minimization of global dispersion.

Principles Related to Module Encapsulation.

Encapsulating the implementation code of a module and requiring that the external world interact with the module through its published API's is a widely accepted design practice. The following modularization principles can be used to capture these notions:

maximization of API-based inter-module call traffic; and
    minimization of non-API based inter-module call traffic.

Principle Related to Module Extendibility.

One of the most significant reasons for object-oriented software development is that the classes (subclassing) can be easily extended whenever one desires a more specialized functionality. Extending object-oriented software through the notion of subclassing allows for a more organized approach to software development and maintenance since it allows for easier demarcation of code authorship and responsibility. While module-level compartmentalization of code does not lend itself to the types of software extension rules that are easy to enforce in object-oriented approaches, one nonetheless wishes for the modules to exhibit similar properties when it comes to code extension and enhancement. The following principle captures these aspects of code modularization:

maximization of stand-alone module extendibility.

Principle Related to Module Testability.

Testing is a major part of software development. A common form of testing, requirements-based testing, ensures that, at a minimum, the software conforms to chosen standards and protocols. Testing must also ensure that the software behaves as expected for a full range of inputs, both correct and incorrect, from users and processes, at the level of program logic in the individual functions and at the module interaction level. Furthermore, testing must take into account the full range of competencies of other agents that are allowed to interact with the software. Testing procedures can easily run into combinatorial problems when modules cannot be tested independently. For example, if each module is to be tested for N inputs, the two interdependent modules must be tested for $N^2$ inputs. Modularization must therefore strive to fulfill the following principle:

maximization of stand-alone testability of modules.

Principle Related to Acyclic Dependencies.

Cyclic dependencies between modules of a body of software should be minimized. Cyclic dependencies exist when two or more modules depend on each other. This leads to combinatorial problems when testing, difficulty in testing modules separately, and, most troublingly, the requirement that modules must be aware of the evolution of internal details of other modules—defeating the purpose of modularity. Cyclic dependencies becomes even more of a problem when modules are organized in horizontal layers, as often happens in reasonably-sized, reasonably-designed software systems. Layering serves an important organizational function; modules in one layer can, optimally, only seek the services of the layers below it. When modules in one layer require the services of higher layers (as indicated by cyclic dependencies) the purpose of layering is defeated. Therefore, modularization should follow the principle:

maximization of unidirectionality of control flow in layered architectures.

Principles Related to Module Size.

It is believed that modules of a large software system should be roughly the same size. As is intuitively plausible, the number of defects in a module goes up with the size of the module. But, counterintuitively, the overall number of defects in a large software system also rises when the individual modules are too small. Therefore, modularization should follow the principles:

module size bounds observance maximization of module size uniformity.

The modularization metrics embodiments taught herein relate to at least one of the principles enumerated in this example.

Example 4

Figure 3:
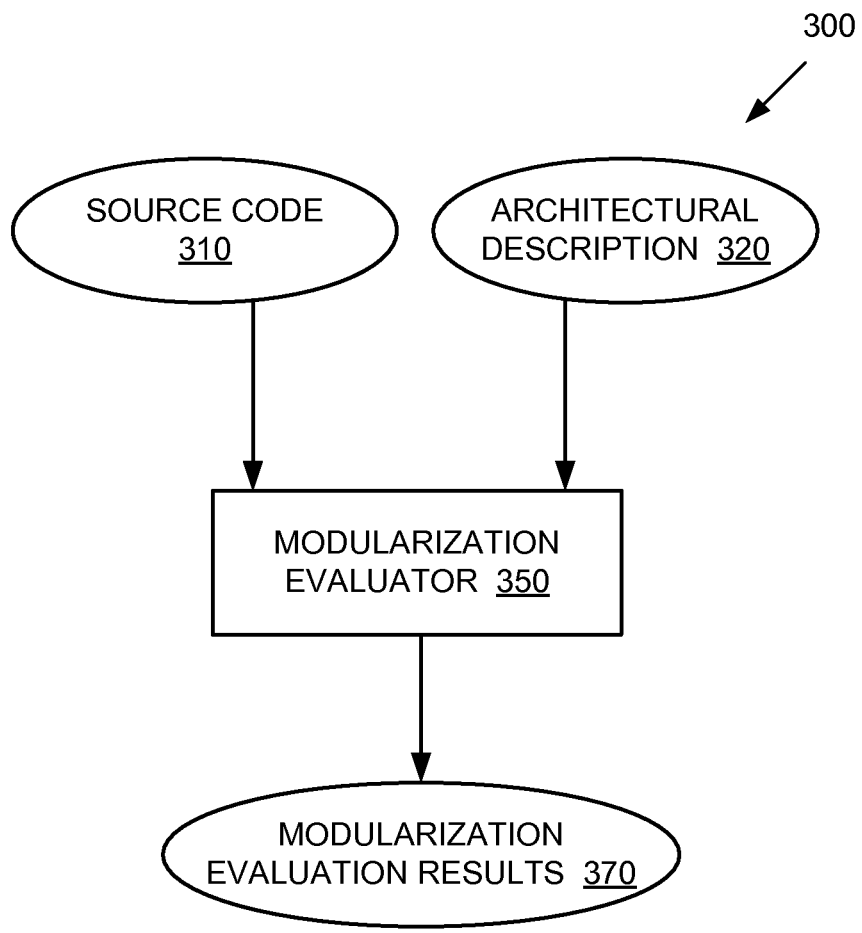
FIG. 3 is a block diagram of an exemplary system for using a modularization quality evaluator in conjunction with source code, and an architectural description of the source code to determine modularization quality evaluation results.

Exemplary System for Using a Modularization Evaluator in Conjunction with Source Code, and an Architectural Description of the Source Code to Determine Modularization Quality Evaluation Results FIG. 3 shows an exemplary system 300 for producing modularization quality evaluation results 370 of a software system using both source code and an architectural description of the source code. The source code 310 and an architectural description of the source code 320 are both used as inputs into the modularization evaluator 350 to produce modularization quality evaluation results 370.

Modern software engineering dictates that software should generally be organized along a set of modules. One way of thinking about modules is that they capture a set of design decisions which are hidden from other modules. Furthermore, the interaction between modules should primarily be through module interfaces. A module can also be thought of as grouping a set of functions and data structures. This often leads to a specific module implementing one or more business concepts. This grouping may take place, for example, on the basis of similarity of purpose or on the basis of commonality of goal. The difference between the two is subtle but important. As example of a module that represents the first type of grouping is the java.util package of the Java platform. The different classes of this package provide different types of containers for storing and manipulating objects. A module such as the java.net package is designed to provide support for networking—commonality of goal. The asymmetry between modules may be exemplified by the fact that you are likely to use a java.util class in a java.net based program, but much less likely to do so the other way around.

In either case, modules promote encapsulation (information hiding) by separating the module's interface from its implementation. The module interface expresses the elements that are provided by the module for use by other modules. In a well-organized system, the interface elements are visible to other modules, while the implementation, hidden from other modules, contains the working code that corresponds to the elements declared in the interface. Such a module interface is known as its Application Programming Interface (API). It is widely accepted that the overall quality of software is generally enhanced when interactions between modules are restricted to take place through the published API's for the module.

The architectural description of the source code 320 is a description of how the source code is partitioned into modules; that is, what portion of the code belongs to which module. This description 320 may also include a description of how the modules are organized into layers. This organization description may be in the form of original design documents, or the organization description may be built into the source code itself, in which case there are markers of some kind in the code that indicate which portions of the code belong to which modules and to which layers. Modularization of code may be determined by someone of skill in the art, and may be entered by hand, either in part, or for the entire system being evaluated, into a user interface of the modularization evaluator. The architectural description 320 may be derived from modularization results received from an automatic modularizer, in which case, the output of the automatic modularizer is used, either as is, or converted to a form that the modularization evaluator 350 can read.

Example 5

Figure 4:
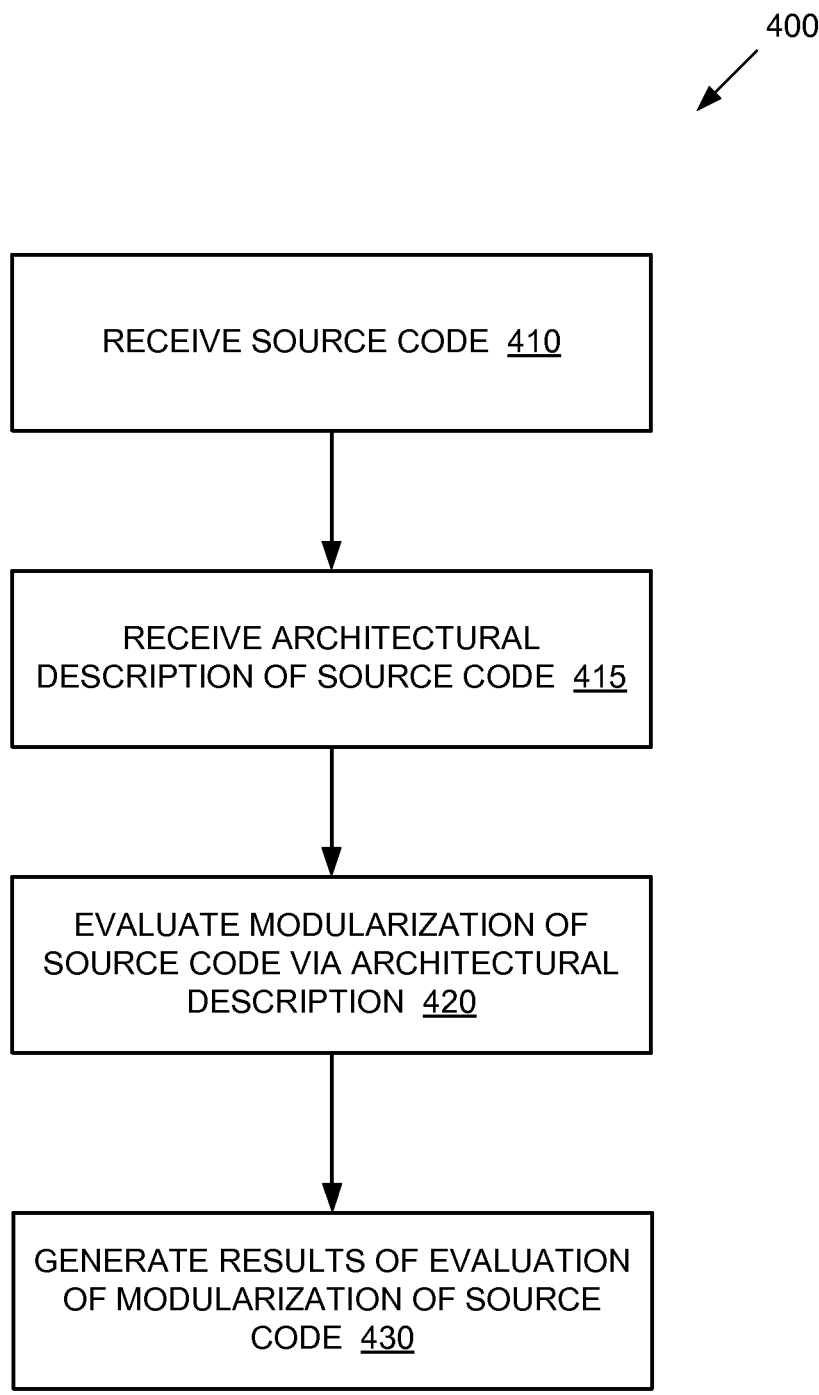
FIG. 4 is a flowchart of an exemplary method for evaluating source code and an architectural description of the source code to determine modularization quality results.

Exemplary Method for Evaluating Source Code and an Architectural Description of the Source Code to Determine Modularization Quality Evaluation Results FIG. 4 shows an exemplary method 400 for evaluating source code and an architectural description of the source code to determine modularization results. The method can be performed, for example, by the system 200 of FIG. 2. At 410 the source code (such as the source code 310) is received. At 415 an architectural description of the source code (such as the architectural description 320) is received. The order that process blocks 410 and 415 happen is unimportant. For example, the source code could be received prior to the architectural description, or vice versa. At 420, the modularization of the source code is evaluated using the architectural description 320 (FIG. 3) and the source code 310 (FIG. 3). At 430, results of the evaluation of modularization of the source code is generated.

Example 6

Figure 5:
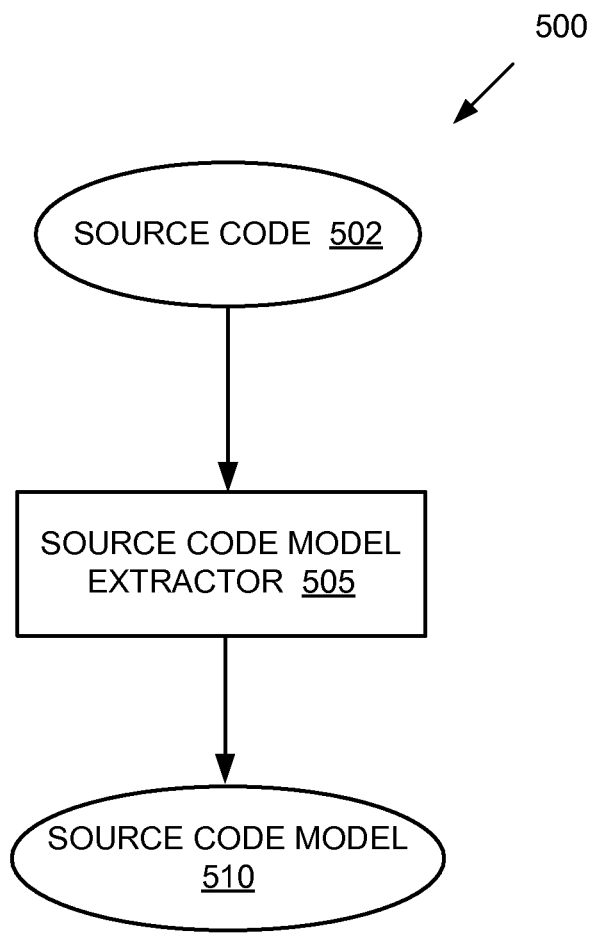
FIG. 5 is a block diagram of an exemplary system to evaluate modularization quality of the source code using a model of the source code.

Exemplary System to Evaluate Modularization Quality of the Source Code Using a Model of the Source Code In any of the examples herein describing evaluating source code, a model of the source code can be evaluated instead of or in addition to the source code. FIG. 5 shows an exemplary system 500 to evaluate modularization quality of the source code using a model of the source code. Source code 502 (e.g. the source code 110 of FIG. 1) is received. A source code model extractor 505 parses the source code 502 and derives a high level model of the source code 510. This high-level model 510 can be used for the source code 502 in any of the examples given herein.

The high level model can comprise file information, function information, function dependency information, global variable information, data structure information, dependency between global variables and functions, data structures and functions, and other programming constructs. In one embodiment, the source code information is stored in an SQL (Structured Query Language) database.

Example 7

Figure 6:
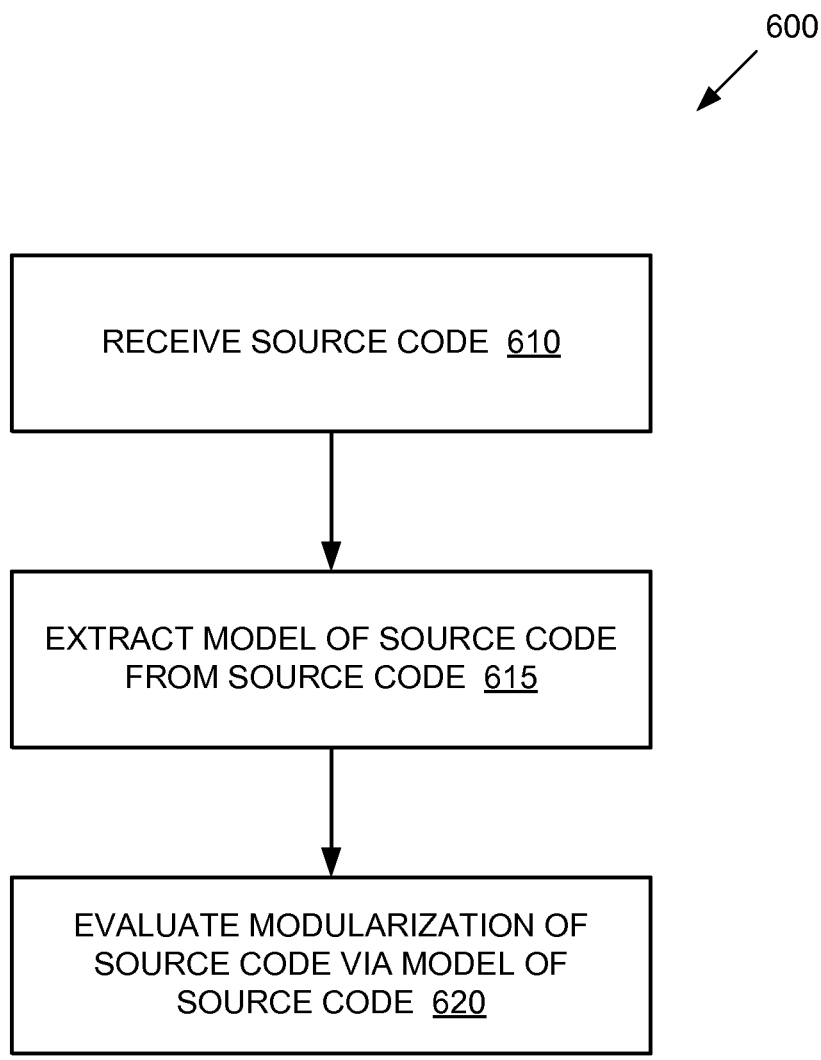
FIG. 6 is a flowchart of an exemplary method to evaluate modularization quality of source code using a model of the source code.

Exemplary Method to Evaluate Modularization Quality of the Source Code Using a Model of the Source Code FIG. 6 shows an exemplary method 600 to evaluate modularization quality of the source code using a model of the source code. The method can be performed, for example, by the system 500 of FIG. 5. At 610, a source code representation is received. At 615, a model of the source code, such as the model 510 (FIG. 5), is extracted from the source code. This may be done by parsing the source code representation and then deriving a high level model of the source code from the parsed version. Then, using, at least, the output of process block 610, modularization of the source code via the model of the source code 615 is evaluated 620.

Example 8

Figure 7:
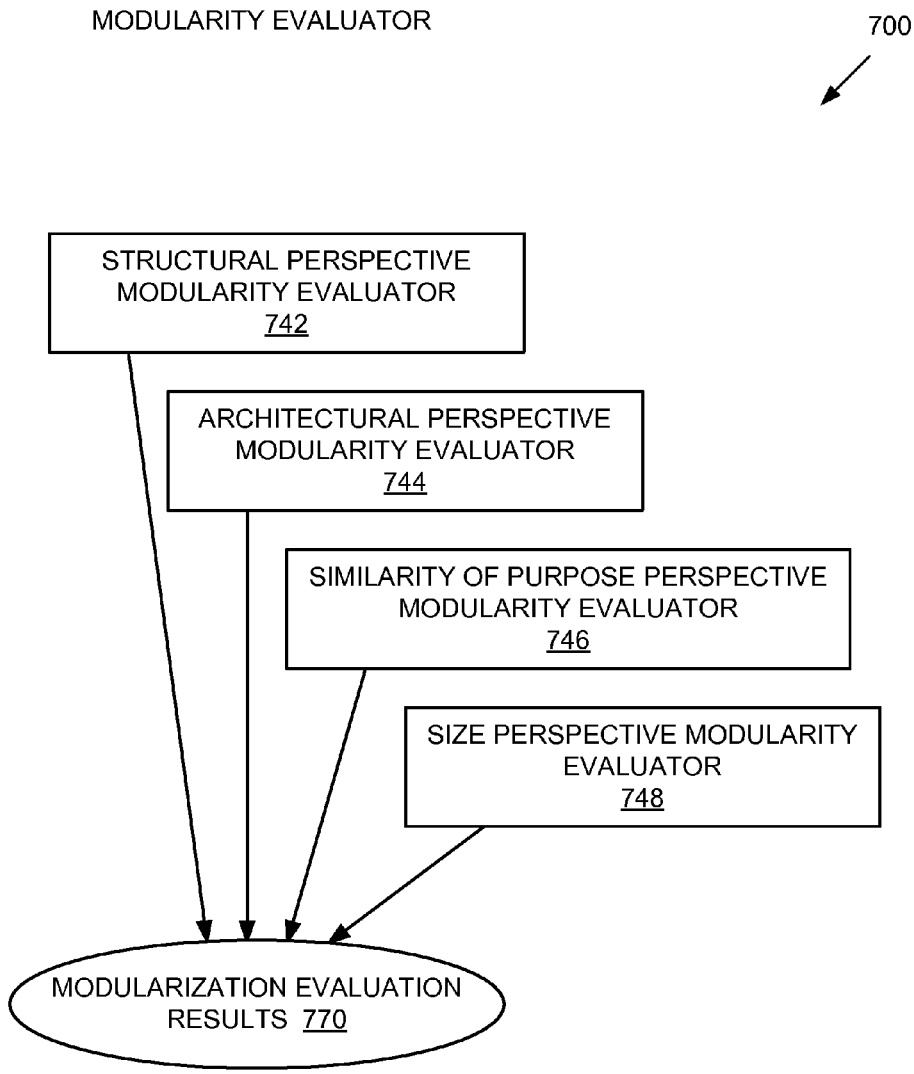
FIG. 7 is a block diagram of an exemplary system to evaluate modularization quality of modules using different modularization perspectives.

Exemplary Component to Evaluate Modularization Quality of Source Code Using Different Modularization Perspectives FIG. 7 shows an exemplary system 700 of a modularization module configured to evaluate modularization quality of source code using different modularization perspectives. Each of the evaluators shown, the structural perspective evaluator 752, the architectural perspective modularity evaluator 754, the similarity of purpose perspective evaluator 756, and the size perspective modularity evaluator 758, can be a portion of, or an entire, modularization evaluator such as the modularization evaluator 150.

Source code 702 (e.g. the source code 110 of FIG. 1) is received. This source code is used as input for any of the evaluators 752, 754, 756, 758 shown.

The structural perspective modularity evaluator 752 evaluates the source code 702 from a coupling-based structural perspective that provides various measures of the function-call traffic through the API's of the modules in relation to the overall function-call traffic producing modularization quality evaluation results 770.

The architectural perspective modularity evaluator 754 evaluates the source code 702 by determining how well modules within the source code are organized into higher-level structures, with an emphasis on the horizontally layered structures. The architectural perspective modularity evaluator 754 produces modularization quality evaluation results 770.

The similarity of purpose modularity evaluator 756 evaluates the source code 702 based on clues provided within the source code on the purposes of the modules and their constituent parts. In software, it is frequently the case that either the name of a function, the names of variables within a function, words within the comments of a function, etc., hold some clue as to the purpose of the function inside the module and to the purpose of the module itself. The developers of complex software often leave behind clues as they name variables, comment code, write debugging routines, and the like. These clues can be thought of as "concepts." For example, given the case of a module devoted to interest calculations in banking software, a concept might be the word "interest", which is likely to show up in various artifacts of the module either in its full or an abbreviated form. With regard to software characterization, such concepts may then be used by the similarity of purpose modularity evaluator 756 to assess whether or not the software adheres to the principles that are based on the semantics of the module contents. The similarity of purpose modularity evaluator 756 produces modularization quality evaluation results 770.

The size perspective modularity evaluator 758 evaluates whether the modules within the software code 702 are approximately equal in size, and whether the average module size is appropriate for the software code 702 as a whole. The size perspective modularity evaluator 758 produces modularization quality evaluation results 770.

Example 9

Figure 8:
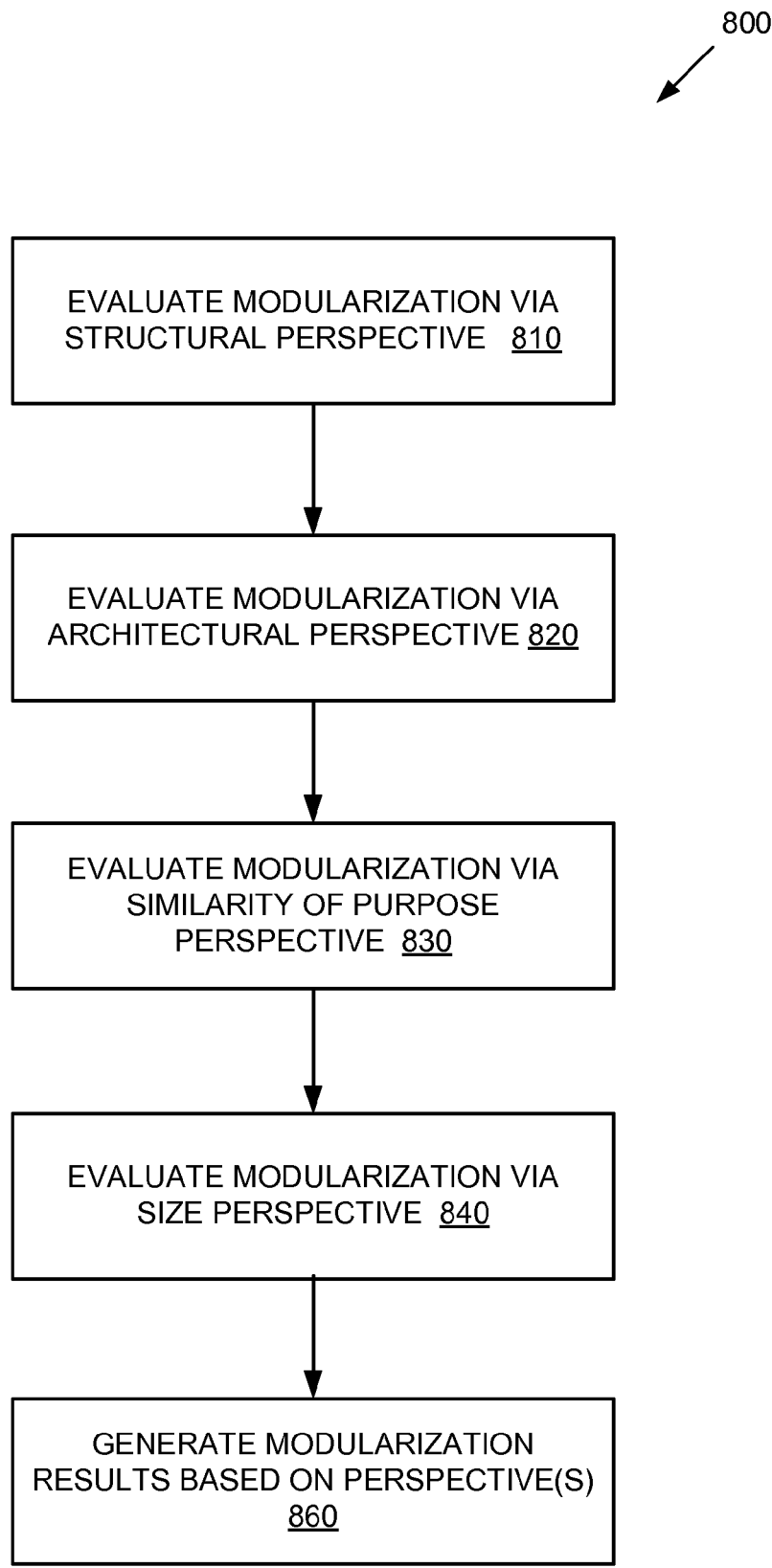
FIG. 8 is a flowchart of an exemplary method to evaluate modularization of quality modules using different modularization perspectives.

Exemplary Method to Evaluate Modularization Quality of Source Code Using Different Modularization Perspectives FIG. 8 shows an exemplary method 800 to evaluate modularization quality of source code using different modularization perspectives. The method can be performed, for example, by the Modularization evaluator 350 of FIG. 3. Each of the modularization quality evaluations—810, 820, 830, and 840—can be performed separately, as shown, or can be performed sequentially, such that, for example, modularization via a structural perspective 810 can be evaluated first, followed by any of the other evaluations 820, 830, or 840; or the evaluations can be performed in another order.

At 810, modularization quality is evaluated via a structural perspective. At 820, modularization quality is evaluated via an architectural perspective. At 830 modularization quality is evaluated via a testability perspective. At 840, modularization quality is evaluated via a size perspective. At 860, modularization quality results are generated based on the one or more perspective evaluations.

Example 10

Figure 9:
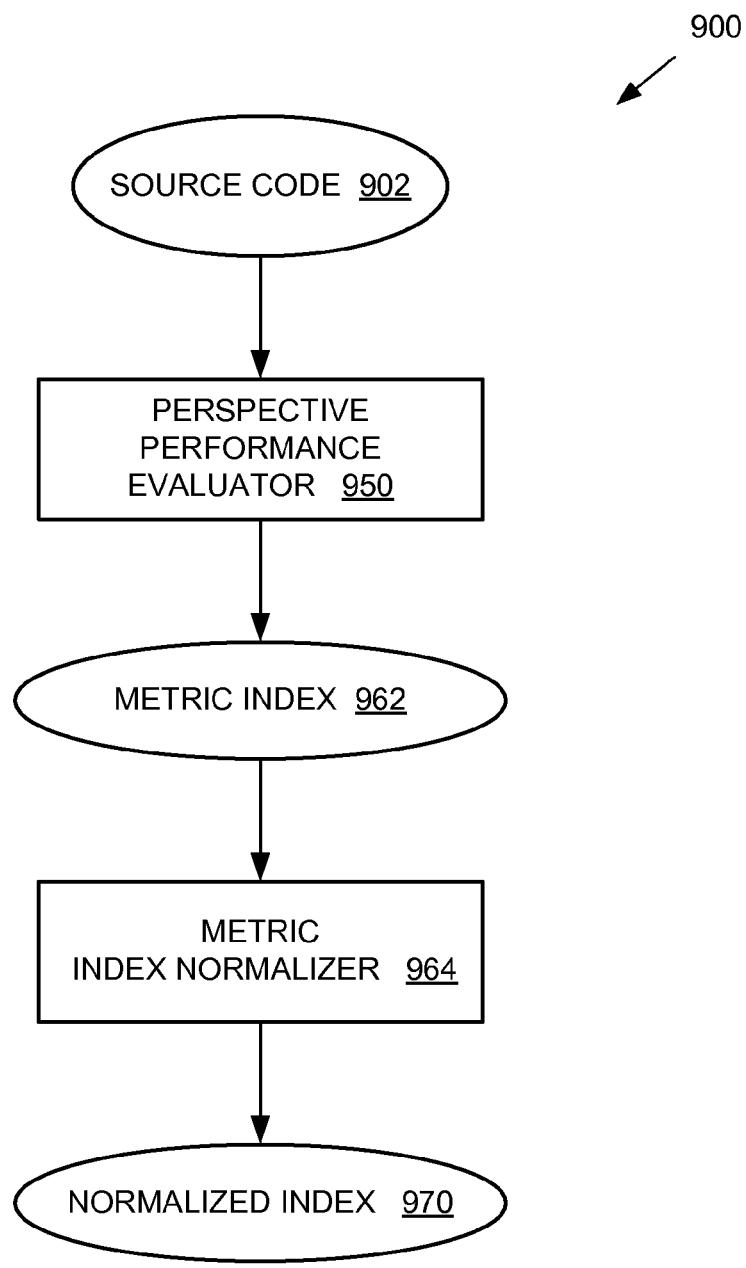
FIG. 9 is a block diagram of an exemplary system to normalize a modularization quality evaluation result to produce a normalized index.

Exemplary Modularization Quality Evaluator Component to Produce a Normalized Index FIG. 9 shows an exemplary system 900 of a modularization evaluator configured to produce a normalized index, which can then be used as at least a portion of the modularization quality evaluation results. At 902, a source code representation is received. For example, the source code representation can be source code 110 of FIG. 1; or, as a further example, may be a source code model 510 such as is shown in FIG. 5. The modularization results evaluator 950 (which may be a modularization evaluator, such as the modularization evaluator 350 (FIG. 3)) then evaluates the source code 902 to produce a metric index 962, which is a measure of how well the code is modularized.

Any of the modularization indices discussed, for example, in connection with example 8, may be used for the evaluation by the modularization results evaluator 950. This metric index 962 may be any number at any scale. A metric index normalizer 964 then normalizes the metric index 962 to produce a normalized index 970 such that its value lies between 0 and 1, with 0 being the lowest, worst, score—poor modularization, and 1 indicating the highest score possible—the best possible modularization. The normalized index can then be used as the entire, or as a portion of, any of the modularization quality evaluation results described herein, such as the modularization quality evaluation results 170 (FIG. 1).

Example 11

Exemplary Method to Produce Modularization Quality Evaluation Results

Figure 10:
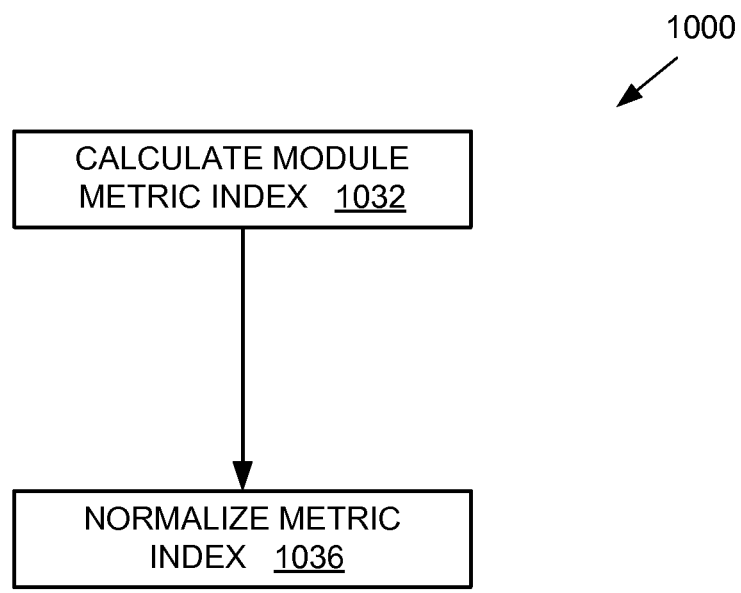
FIG. 10 is a flowchart of an exemplary method to normalize a modularization quality evaluation result to produce a normalized index.

FIG. 10 shows an exemplary method 1000 to normalize a modularization result to produce a normalized index. The method can be performed, for example, by the modularization results evaluator 950 of FIG. 9. At 1010, a source code representation is received. For example, the source code representation can be source code 110 of FIG. 1; or, as a further example, may be a source code model 510 such as is shown in FIG. 5. At 1032, a module metric index is calculated. Any of the modularization indices discussed, for example, in connection with example 8, may be calculated. At 1036, the metric index, which may be any number, is normalized such that the lowest measure of modularization essentially equals 0, while the best possible modularization score is essentially equal to 1.

Example 12

Exemplary Normalization

In any of the examples herein, normalization can normalize an index so that it falls within a range (e.g., 0-1, 0-11, and the like).

Example 13

Exemplary Notation Usage

In any of the examples herein, the notation that follows can be used.

If M denotes a set of elements, |M| denotes its cardinality; that is the total count of the elements in the set.

S, the source code, will be considered to consist of M modules $\{m_1, m_2, \ldots, m_M\}$.

All of the functions in S will be denoted by the set $F=\{f_1, f_2, \ldots, f_F\}$. These are assumed to be distributed over the M modules.

An API function for a given module is denoted as $f^a$.

A non-API function for a given module is denoted as $f^{ea}$.

The notation L denotes the set of layers $\{L_1, L_2, \ldots, L_p\}$ into which the modules have been organized.

$K(f)$ denotes the total number of calls made to a function $f$ belonging to a module m. Of these, $K_{ext}(f)$ denotes the number of calls arriving from other modules, and $K_{int}(f)$ indicates the number of calls from within the same modules. It follows, therefore, that $K(f) = K_{ext}(f) + K_{int}(f)$.

$\hat{K}(f)$ denotes the total calls made by a function f.

For a module m, $K_{ext}^j(f)$, $K_{ext}^j(f) \leq K_{ext}(f)$ denotes the external calls made to function f in the module m from the module $m_j$.

$K_{ext}(m)$ denotes the total number of external function calls made to the module m. If m has $f_1 \ldots f_n$ functions, then $$K_{ext}(m) = \sum_{f \in \{f_1 \ldots f_n\}} K_{ext}(f).$$

Example 14

Exemplary API Function Identification

In any of the examples herein, API functions (as opposed to non-API functions) can be identified using the heuristic that an ideal API function is called, generally, by functions belonging to other modules. Similarly, an ideal non-API function is never exposed; that is, it is never called by functions from other modules. Using this heuristic, a function can be declared to be API or non-API depending on the relative frequency of the function being called from other modules versus the frequency the function is called by its home module. Two threshold parameters, $\alpha$, and $\beta$ are defined. For a function f in a module m, having K(F) number of calls made to it, where $K_{ext}(F)$ are the external calls made to it and $K_{int}(F)$ are the internal calls made to it. If $K_{ext}(F) > \alpha \cdot K(F)$, f is considered to be an API function for m. Similarly, a function f' in the module m is treated as a non-API function if $K_{int}(f') > \beta \cdot K(F)$.

Example 15

Figure 11:
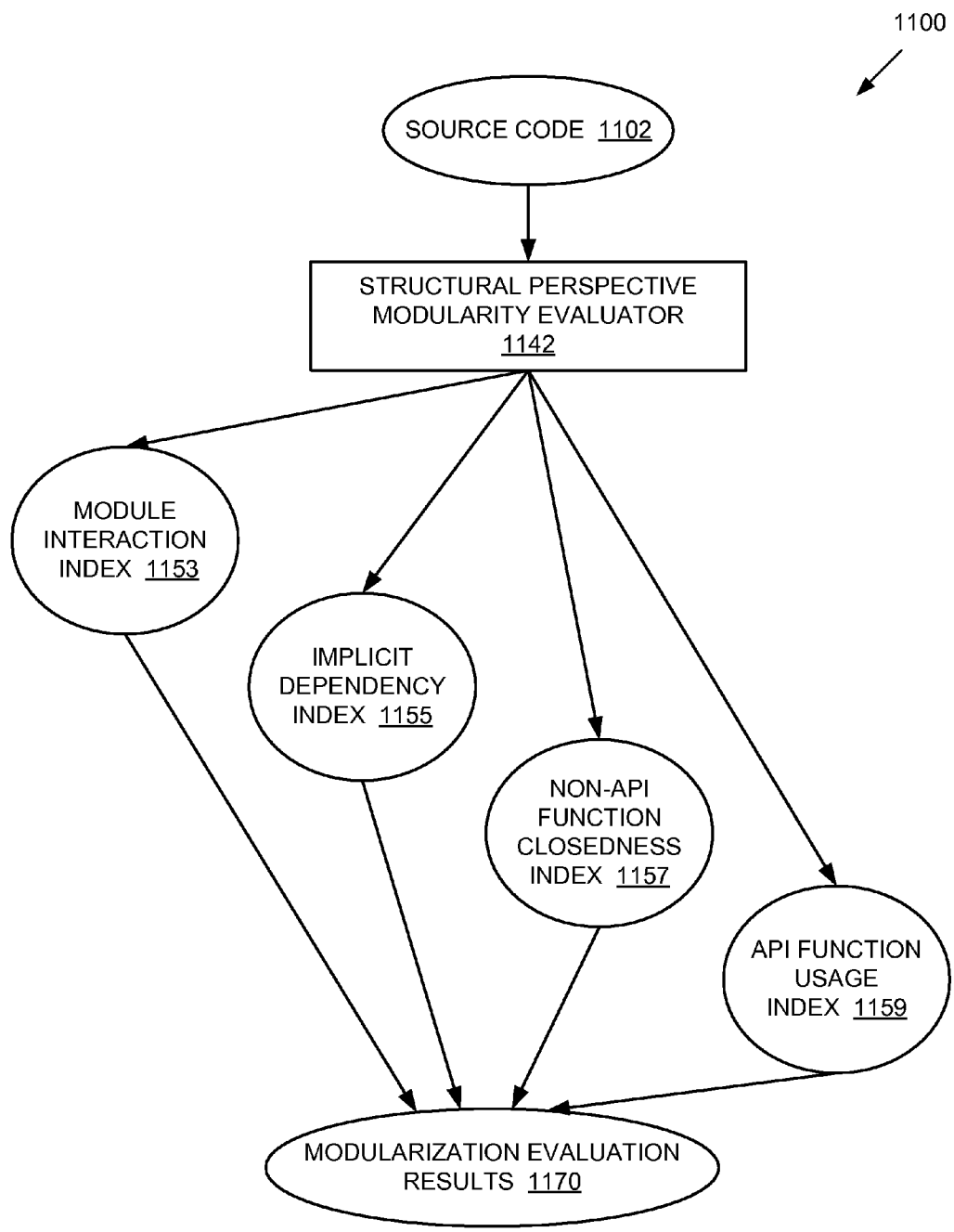
FIG. 11 is a block diagram of an exemplary system to evaluate modularization quality of source code using a structural modularity perspective.

Exemplary System to Evaluate Modularization Quality of System Source Code Using a Structural Perspective FIG. 11 is an exemplary system 1100 to evaluate modularization quality of modules using a structural perspective. At 11102, a source code representation of a software system (or a portion thereof) is received. A structural perspective modularity evaluator 1142, such as the structural perspective modularity evaluator 752 (FIG. 7), can calculate any one, or a group of one or more of, the following structural indices: the module interaction index 1153, the implicit dependency index 1155, the non-API function closedness index 1157, and the API function usage index 1159, each of which will be discussed in turn. Each of these indices can then be used as modularization quality evaluation results 11170.

It should be noted that each of the structural indices 1153, 1155, 1157, and 1159 are expressed as normalized values, with the worst value being 0 and the highest being 1. Other equally valid indices with a different range of values are also envisioned, following the teachings here.

Module Interaction Index

The module interaction index 1153 (abbreviated MII) calculates how effectively a module's API functions have been used by the other modules in the system. The total number of function calls (or close to the total) made through modules is calculated. This can be calculated in any fashion as known to someone of skill in the art. The total number of API functions made through modules is also calculated.

Assume that a module m has n functions $\{f_1 \ldots f_n\}$, out of which, there are n1 API functions $\{f_1^a \ldots f_{n1}^a\}$. Also assume that the system $\Sigma$ has $m_1 \ldots m_n$, modules. Then, the model interaction index (MII) 1153, for modules calculated, becomes the total number of function calls made through the API in the module, as calculated, divided by the total number of function calls made in any fashion within the module, as calculated. Expressed using the notation described in example 12, this becomes:

$$MII(m) = \frac{\sum_{f^a \in \{f_1^a \ldots f_{n1}^a\}} K_{ext}(f^a)}{K_{ext}(m)}$$

When there are no external calls made through module m, this value is 0.

For the entire system, the MII 1153 is the sum of individual MII module values divided by the total number of modules, or:

$$MII(S) = \frac{1}{M} \sum_{i=1}^{M} MII(m_i)$$

As an alternative formulation of the module interaction index 1153, $K_{ext}(f)$ and $K_{ext}(f^a)$ can be calculated as a weighted sum of the number of times the function $f$ and $f^a$ are called externally. For example, if a function $f$ in a module m is called 5 times from module $m_1$ and 7 times from module $m_2$, rather than $K_{ext}(f)=5+1$, as in the previous calculation, $K_{ext}(f)$, $=(w_{m1}*5)+(w_{m2}*7)$. Each module would be weighted depending on its relative importance with relation to module m. The weights, generally, would be values between 0 and 1. If both weights equal 1, the formula reduces to the previous version of MII. Similarly, MII(S) 1153 can be a simple average, a weighted average, a median value, etc.

The module interaction index 1153 measures if a given software system adheres to the module encapsulation principle discussed with reference to example 3. Recall, that this principle suggests that a well designed module should expose a set of API functions through which other modules would interact. The API functions can be thought of as the service that the module has to offer. Since these API functions are meant to be used by the other modules, the internal functions of a module typically do not call API functions of the module. Therefore, to the maximum extent possible, a non-API function of a module should not receive any external calls.

It may be observed, that in the first equation, above, $$\sum_{f^a \in \{f_1^a \ldots f_{n1}^a\}} K_{ext}(f^a),$$

for a module m, increases as more and more inter-module calls are routed through the API functions of m. As the number of calls of any type routed through the API increases as the total percentage of total calls within the module, MiI will approach 1. In the ideal case, when MII equals 1, it can be seen that all calls within a module would be routed through the API functions. By the same analysis, MII(Σ) will equal 1 when all calls within the system are routed strictly through the API functions.

Certain types of modules, such as driver modules, are used in some systems to orchestrate the other modules. For these driver modules, MII(m) may be very close to 0. In such cases, it should still be understood that the overall goal of a modularization effort should be to achieve a large MII for those modules in which such a measurement makes sense.

Implicit Dependency Index

The implicit dependency index 1155 (abbreviated IDI) measures the number of functions that write to global entities in modules other than the ones they reside in. An insidious form of dependency between modules comes into existence when a function in one module writes to a global variable that is read by a function in another module. The same dependence occurs when a function in one module writes to a file whose contents are important to the execution of another function in a different module, such as when modules interact with one another through shared database files. Such dependencies can be thought of as implicit dependencies.

Detecting implicit dependencies often requires a dynamic runtime usage scenario analysis of the software. Such analysis is both time-consuming and difficult, and becomes more so the larger the size of the system under consideration. An easier metric is proposed here. The Implicit Dependency Index (IDI) 1155 is constructed by recording, for modules, the number of functions that write to global entities (such as variables, files, databases), when the global entities are also accessed by functions in other modules. This is done on the belief that the larger this count is in relation to the total inter-module traffic, the more implicit dependencies exist.

To calculate the IDI 1155, some new notation must first be defined. $D_g(m_i, m_j)$, $i \neq j$ denotes the number of dependencies created when a function in $m_i$ writes to a global entity that is subsequently accessed by some function in $m_j$. Let $D_f(m_i, m_j)$, $i \neq j$ denote the number of explicit calls made by functions in $m_i$ to functions in $m_j$. $C(m_i)$ is the set of modules that depend on $m_i$ by having at least one implicit dependency. This metric assumes that the larger $D_g$ is in relation to $D_f$, the worse the modularization of the software. The metric IDI 1155 is defined as follows:

$$IDI(m) = \frac{\sum_{m_j \in C(m)} D_f(m, m_j)}{\sum_{m_j \in C(m)} (D_f(m, m_j) + D_f(m, m_j))}$$

$$= 1 \text{ when } C(m) = \emptyset$$

$$IDI(S) = \frac{1}{M} \sum_{i=1}^{M} IDI(m_i)$$

As an alternative formulation of APIU(m), modules $m_i \in C(m)$ that have indirect dependencies with m can be weighted. Using the same notation as the previous metrics, IDI(m) can be generalized as:

$$IDI(m) = \frac{\sum_{m_j \in C(m)} w_m^f(m_j) * D_f(m, m_j)}{\sum_{m_j \in C(m)} \left(w_m^d(m_j) * D_g(m, m_j) + w_m^f(m_f) * D_f(m, m_j)\right)}.$$

The weights $w^d$ and $w^f$ can be any number between 0 and 1. Even though IDI(S) is shown, above, as a simple average, a weighted average, a median value, and the like, can also be used.

With regard to where this metric belongs in the landscape of principles presented in example 3, ideally, all interaction between modules should be through published API functions, implying that the number of implicit dependencies must be few and far between. Therefore, in an ideal API-based system the IDI 1155 would be equal to one. This is in conformance with the principle of module encapsulation which requires a minimum of such implicit, non-API-based communications.

The IDI 1155 is then used as a modularization quality evaluation result 1170.

Non-API Function Closedness Index

The non-API function closedness index 1157 (abbreviated NC) calculates how effectively a module's non-API functions are used. Ideally, the non-API functions of a module should not bypass the API, that is they should not expose themselves to the external world. In reality, however, a module may exist in a semi-modularized state where inter-module calls are made outside the APIs. This is especially true in large legacy systems that have been only partially modularized. In this intermediate state, functions may exist that participate both in inter-module and intra-module call traffic. The extent of this traffic is measured using the non-API function closedness index 1157.

Extending the notation presented in example 13, let $F_m$ represent the set of functions within a module m; $F_m^a$ represent the set of API functions within module m, and $F_m^{na}$ represent the non-API functions within module m. Ideally, $F_m = F_m^a + F_m^{na}$. However, it is difficult enough to categorize a function with enough particularity to determine whether it is an API function or a non-API function, so it is understood that the theoretical ideal will most likely not be met.

In any case, NC 1155 is measured, for a specific module, by dividing the number of non-API functions by the sum of the total number of functions minus the API functions. In the notation we have defined, this becomes:

$$NC(m) = \frac{|F_m^{na}|}{|F_m| - |F_m^a|}$$

If there are no non-API functions in a given module, it can be seen that NC(m) equals 0.

For the system NC 1157, the index is the total of the individual module indices divided by the total number of modules, or:

$$NC(S) = \frac{1}{M} \sum_{i=1}^{M} NC(m_i)$$

As an alternative formulation of NC(m) user-defined weights can be introduced for each, or some of the sets of functions, such that:

$$NC(m) = \frac{w_1 * |F_m^{na}|}{w_2 * |F_m| - w_3 * |F_m^a|}.$$

Similarly, NC(s) can be calculated as a simple average (as is shown above), a weighted average, a median value, etc.

As a well-designed module does not expose the non-API functions to the external world, and assuming we correctly categorize functions as either API functions or non-API functions, $F_m - F_m^a$ should be equal to $F_m^{na}$. Therefore, NC(m)=1 for an ideal module, with NC(m)=0 for a module where non-API functions are exposed.

API Function Usage Index

The API function usage index 1159 (abbreviated APIU) determines what fraction of the API functions exposed by a module are being used by the other modules. When a big, monolithic module presents a large and versatile collection of API functions offering many different services, any one of the modules with which it interfaces may need only a fraction of its services. That is, any single module interacts with it may only use a small portion of its API. This indicates improper module design and suggests that the module does not have a coherent purpose. It is considered a better design for such modules to be split into smaller (or at least different) modules which offers a set of services, the bulk of which will be used by most of the modules that access it.

To calculate this metric, suppose that m has n API functions, and that $n_j$ number of the API functions are called by a module $m_j$. Also suppose that there are k modules $m_1 \ldots m_k$ that call one or more of the API function of module m. The APIU 1159 for a single module is equal to the sum of the number of API functions in m called by each module that interfaces with m divided by the quantity equal to the total number of modules that interface with m multiplied by the number of functions in m. Mathematically, this can be written as:

$$APIU(m) = \frac{\sum_{j=1}^{k} n_j}{n * k}$$

It can be seen that APIU(m) equals 0 if m has no API functions, or if there are no other modules that interact with m.

The APIU 1159 of a system E is the sum of the APIU's of individual modules divided by the number of modules with a non-zero number of APIU functions, which can be expressed as:

$$APIU(S) = \frac{1}{M_{apiu}} \sum_{i=1}^{M_{apiu}} APIU(m_i)$$

As an alternative formulation of APIU(m), each module $m_1 \ldots m_k$ which calls one or more of the API function of module m may be assigned an importance for their interaction with m. This importance is modeled as $w_m(m_i)$ and can be a number between 0 and 1. The alternate formula for APIU(m) then becomes:

$$APIU(m) = \frac{\sum_{j=1}^{k} w_m(m_j) * n_j}{n * k}$$

When the weights are equal to 1, the formula reduces to the previous version of APIU. Furthermore, APIU(S) can be processed a simple average as shown above, a weighted average, a median value, etc.

This metric characterizes the software, albeit indirectly and partially, in accordance with the similarity of purpose principles. For example, maximizing module coherence on the basis of commonality of goals requires that the modules not be monolithic pieces of code which provide disparate services. Making modules focused with regard to the nature of their services should push the APIU metric 1159 at least closer to its maximum value, 1. However, it should be noted that this metric does not actually analyze the specificity of the API functions, but is merely an artifact that occurs when such specificity exists. Therefore, this APIU metric 1159 can be considered in conjunction with the other metrics for its full benefit.

Example 16

Figure 12:
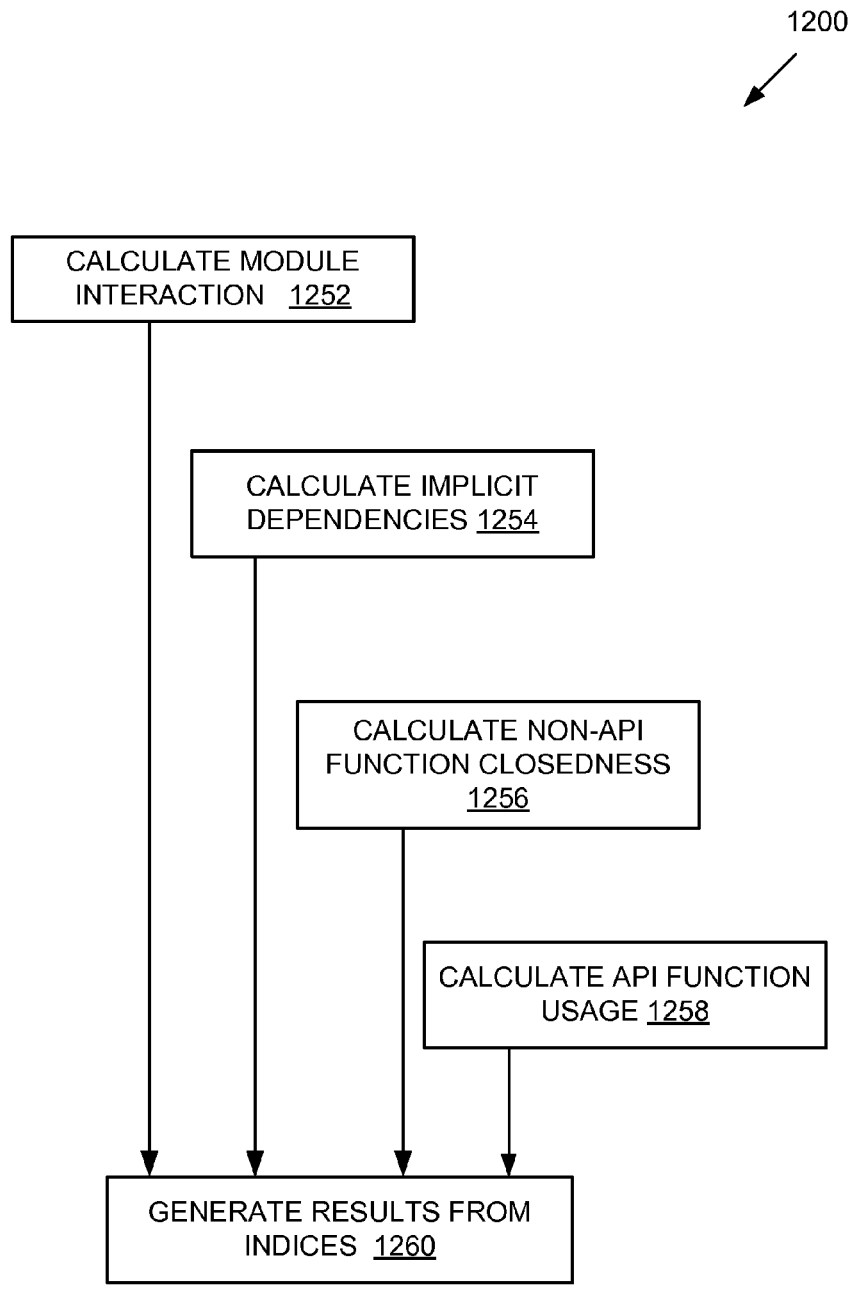
FIG. 12 is a flowchart of an exemplary method to evaluate modularization quality of source code using a structural modularity perspective.

Exemplary Method to Evaluate Modularization Quality of System Source Code from a Structural Perspective FIG. 12 shows an exemplary method 1200 to evaluate modularization quality of modules using a structural perspective. The method can be performed, for example, by the structural perspective modularization evaluator 1150 of FIG. 11. Each of the structural modularization quality evaluations—1252, 1254, 1256, and 1258—can be performed separately, as shown, or can be performed sequentially, such that, for example, module interaction 1252 can be calculated first, followed by any of the other calculations 1254, 1256, and 1258; or the calculations can be performed in another order. A structural perspective calculation can produce an index, such as any of the indices 1153, 1155, 1157, 1159 shown in FIG. 11, and discussed with reference to example 13. Each of the structural metrics calculations will now be discussed in turn.

At 1252, module interaction is calculated. This can produce a module interaction index 1153 (FIG. 11). In an exemplary embodiment, to calculate the module interaction index, for each module the total number of external function calls made through APIs for that specific module are calculated. Also, the total number of external calls to each module is calculated. At 1260, results can be generated using the module interaction index 1153.

At 1254, the implicit dependency of a module is calculated. This can produce an implicit dependency index 1155 (FIG. 11).

At 1256, the non-API function closedness index is calculated. This can produce a non-API function closedness index 1157 (FIG. 11).

At 1258, the API function usage index is calculated. This can produce an API function usage index 1159 (FIG. 11).

At 1260, after one or more structural performance module evaluations have been calculated, results can be generated from the one or more calculated indices.

Example 17

Figure 13:
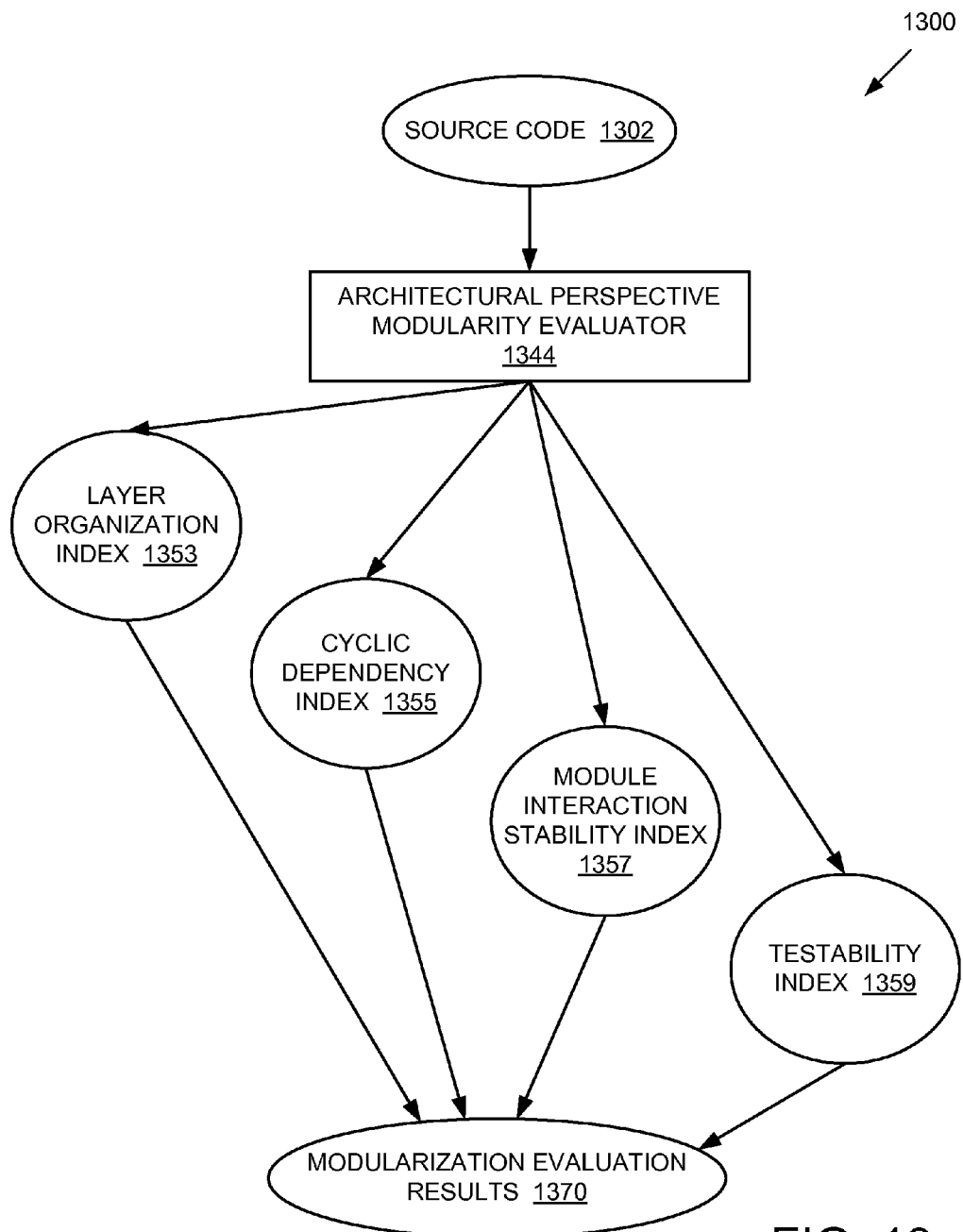
FIG. 13 is a block diagram of an exemplary system to evaluate modularization quality of source code using an architectural perspective.

Exemplary System to Evaluate Modularization Quality of System Source Code from an Architectural Perspective FIG. 13 is an exemplary system to evaluate modularization quality of modules using an architectural perspective. At 1302 a source code representation of a software system (or a portion thereof) is received. An architectural perspective modularity evaluator 1344, such as the architectural perspective modularity evaluator 754 (FIG. 7), can calculate any one, or a group of one or more of, the following architectural modularity indices: the layer organization index 1353, the cyclic dependency index 1355, the model interaction stability index 1357, and the testability index 1359, each of which will be discussed in turn. Each of these indices can then be used as modularization quality evaluation results 1370.

Architecture here can mean an organization of modules into higher-level structures, especially the horizontally-layered structures. Generally, good software design requires that modules in any one layer are only allowed to call modules in layers below them. This keeps the lower modules, which should have more basic functionality, more stable with respect to any future changes. However, imposing (or preserving) such layering on modules is complicated by the presence of cyclic dependencies between modules. The metrics here relate the layered organization of modules in the presence of possible cyclic dependencies.

It should be noted that each of the architectural modularity indices 1353, 1355, 1357, and 1359 are expressed as normalized values, with the worst value being 0 and the highest being 1. Other equally valid indices with a different range of values are also envisioned, following the teachings here.

The Cyclic Dependency Index

The Cyclic Dependency Index 1355, abbreviated "Cyclic," measures the extent of cyclic dependencies between the modules of a system. This metric is based on the notion of strongly connected components, abbreviated SCC, in a directed module dependency graph MDG=<M,E>, where M represents the nodes corresponding to the modules, and E represents the arcs between nodes—indicating pairwise dependencies between modules. An arc connecting two nodes indicates that the two modules corresponding to the nodes are either explicitly or implicitly dependent on each other. As mentioned with reference to the implicit dependency index 1155 (FIG. 11) discussed with reference to example 15, implicit dependencies come into play when a function in one module calls a function in another module. Implicit dependencies appear through shared global variables, such as when a function in one module writes into a file that is read by another module.

An SCC in the graph MDG is a maximal set of vertices (i.e., modules) in which there exists a path from all or substantially all vertices (in the SCC set) to all or substantially all other vertices in the same set. With this definition, the SCC has the property of being able to capture multiple cycles. Thus an SCC of 1 indicates the maximum number of cycles, in that nodes (modules) are connected. As the number of cyclic dependencies decrease, the SCC increases, with the maximum value being the number of modules being measured. This is because an SCC has the property that if the module dependency graph (MDG) contains no cycles, then the number of strongly connected components (SCC) is exactly equal to the number of nodes (modules) in the graph. In such a case, for every SCC, |SCC|=1.

A cyclic dependency metric can now be formed by comparing the sum of the cardinalities of SCC's with cardinality of the module dependency graph itself, as shown below:

$$\text{Cyclic}(\mathcal{M}) = \frac{\text{number of } SCC \text{ in } \mathcal{M}}{|\mathcal{M}|}$$

This metric is aligned with the principle "minimization of cyclic dependencies among modules." The value of Cyclic (M) equals 1 for a system having no cycles, with the value of a system where every module is connected to every other module being 1 divided by the number of modules.

The Layer Organization Index

The layer organization index 1353 (abbreviated LOI) measures how well the layers only call modules from layers at the same level or below them. A layer can be thought of as a horizontal partitioning of a system. There are, generally, two types of layering. The first type of layering is "closed." Here, a function in layer $L_i$ can only make calls to the functions in the immediately lower layer $L_{i+1}$. The second type of layering is "open." With it, a function in layer $L_i$ can make calls to functions in any lower layer.

Calculating the layer organization index 1353 can be performed as follows. Suppose that L denotes an assignment of a set of modules M to a set of layers $\{L_1 \ldots L_p\}$, where $L_1$ is the first layer, $L_2$ the second, etc., in which modules have been organized. Thus, (m) is the layer where m resides. The notation $\overline{L_i}$ indicates that calls from possible layers are considered except for the layer $L_i$.

$$K_{ext}^{\overline{L_i}}(m)$$

denotes the number of external calls made to a module m (residing in layer $L_i$) from modules residing in layers other than $L_i$. Let $K_{ext}^{L_{i-1}}(m)$ be the number of external calls made to a module m (residing in layer $L_i$) from the modules in the immediate upper layer $L_{i-1}$.

The Layer Organization Index (LOI) 1353 for the layer $L_i$ is defined as the number of calls to modules in the layer $L_i$ from the immediate upper layer divided by total number of calls to the modules in the layer, excluding inter-layer calls.

This can be written as:

$$LOI(L_i) = \frac{\sum_{\forall m \in L_i} K_{est}^{L_i-1}(m)}{\sum_{\forall m \in L_i} K_{est}^{L_i}(m)}$$

The LOI of the topmost layer, $L_1$, is considered to be 0.

The above metric will now be extended to the entire system. When measuring the system level metric, the cycles that exist among the modules and the cycles that exist across layers are explicitly addressed. Often, peer modules collaborate heavily among themselves to perform a complex business workflow. Such collaboration can result in cycles. Such cycles among peer modules are generally acceptable when, and only when, all such modules are in the same layer. It is not acceptable, but rather, is highly undesirable for such modules to engage in cyclic dependencies across a layer, violating the layering principle.

The LOI metric presented next is forgiving of cyclic dependencies within a given layer, but penalizes any cyclic dependencies across layers. Let us assume that the system consists of q number of strongly connected components (SCCs) where number of modules in an SCC is ≥1, i.e., |SCC|≥1, which indicates that cyclic dependencies exist between modules in different layers. When the module graph is acyclic, q=|M|; that is, every module has its own independent SCC. Conversely, when the module graph is completely cyclic, q=1, as only a single SCC is needed, as it contains every module.

Next, let $L(SCC_i)$ be the set of layers which have dependencies in $SCC_i$. That is, a module in a Layer L is a node in $SCC_i$. This can be written $L(SCC_i)=\{L(m)|m \in SCC_i\}$. As discussed earlier, cyclic dependencies can exist within modules of the same layer, that is, $|L(SCC_i)|=1$; but the opposite case, where cycles are formed by modules in multiple layers, i.e., $|L(SCC_i)|>1$, is heavily discouraged. The following index calculation, the Desirability Property Formula, returns an index which measures the amount of cycles formed by modules in multiple layers, where p is the number of layers in the system, and where M>1 is the total number of modules in the system organized in p layers.

$$1 - \frac{\sum_{i=1}^{q}(|SCC_i|-1)^{|\mathcal{L}(SCC_i)|}}{(M-1)^p}$$

This formula has the following characteristics:
When the module dependency graph is acyclic, $|(SCC_i)|=1$ for each i, and q=the total number of modules, such that, after summation of the formula, above, the divisor equals 0, which yields the best result, 1.
At the other extreme, when the module dependency graph is completely cyclic, such that all M modules distributed in p layers exist in one SCC. In such a case, $(|SCC_i|-1)^{|\mathcal{L}(SCC_i)|}=(M-1)^p$, with q=1. Thus, the formula equals 0, the worst possible result. It should be noted that the normalization of the formula done here is an exemplary embodiment, with possible best and worst results falling into different ranges.
Also observe that the value of the formula decreases as more layers participate in each cycle, as the value $SCC_i$ is raised exponentially by the number of layers in its cycle.

With these observations the system level LOI 1353 can be defined as follows:

$$LOI(S) = \left(\frac{1}{p-1}\sum_{i=2}^{p} LOI(L_i)\right) * \left(1 - \frac{\sum_{i=1}^{q}(|SCC_i|-1)^{|\mathcal{L}(SCC_i)|}}{(M-1)^p}\right)$$
$$= 0 \text{ if } p <= 2$$

Observe that the system level LOI 1353 is impacted both by inter-layer calls, and by the number of layers within each SCC, that is, how many layers participate in each cycle.

As an alternative formulation, the Desirability Property Formula can be calculated as follows:

$$1 - \frac{\sum_{i=1}^{q}(|SCC_i|-1) \times |\mathcal{L}(SCC_i)|}{(M-1) \times p}$$

Also, as another alternate formulation, the system level LOI 1353 can be weighted, such that $w_1$ and $w_2$ are any two user-defined numbers whose values add up to 1. This gives the following formula:

$$LOI(S) = w_1 * \left(\frac{1}{p-1}\sum_{i=2}^{p} LOI(L_i)\right) + w_2 * \left(1 - \frac{\sum_{i=1}^{q}(|SCC_i|-1)^{|\mathcal{L}(SCC_i)|}}{(M-1) \times p}\right)$$
$$= 0 \text{ if } p \leq 2.$$

This metric models, and attempts to maximize, the unidirectionality of control flow in layered architectures and also strongly penalizes cycles across multiple layers. Therefore the metric LOI 1353 conforms to the acyclic dependency principle.

Module Interaction Stability Index

The module interaction stability index 1357 (abbreviated MISI) is designed to measure the degree to which modules in lower layers are more stable than modules in upper layers.

Software of any serious complexity is often ordered, at a minimum, into layers. In such architectures, the modules in the lower layers should be more stable than the modules in the upper layers, such that the most changes made to the overall software should be, ideally, in the upper layers, with the fewest changes in the lowest layers. This means, among other things, that changes to the upper layers should not impact the lower layers.

However, measuring such characteristics is challenging, as it is difficult to anticipate when and to what degree a given module will be changed, as such changes often depend on unpredictable external situations such as market pressure and customer requests. Therefore, the module interaction stability index 1357 measures, not the degree to which modules change, but rather, the degree to which a change in a given module will affect the surrounding modules.

Following the notation already developed within this example, let $L:M \rightarrow \{L1 \ldots Lp\}$ be the assignment of the modules to different layers and (m) be the layer where module m resides. In the stack of layers, let $L_1$ and $L_p$ be the uppermost and lowermost layers, respectively. The layers are now rank-ordered, with the ≤operator defined as:

$$L_i \le L_p \text{ and } L_i \le L_j \text{ iff } 1 \le i, j \le p \ \& \ i \le j$$

For a given module m, let fanin(m) be the set of modules that depend on m, and let fanout(m) be the set of modules that m depends on. This notion of dependencies is discussed with relation to the implicit dependency index 1155 (FIG. 11) mentioned with reference to example 15. The instability I(m) of a module m is defined as:

$$I(m) = \frac{|fanout(m)|}{|fanin(m)| + |fanout(m)|}$$

A stable module, defined as SD(m), is defined as a module that m depends on, that has a lower instability I than m, and that resides in either the same layer or a lower layer than m. This can be expressed as follows:

Let SD(m) ⊂ fanout(m) be the set of stable modules with respect to m, defined as $$SD(m) = \{m_i \in \text{fanout}(m) | I(m) > I(m_i) \& L(m) \le L(m_i)\}$$

for a module m can now be defined as the stability of m, SD(m), divided by the fanout of m. This is expressed:

$$MISI(m) = \frac{|SD(m)|}{|fanout(m)|}$$
$$= 1 \text{ when } fanout(m)$$
$$= \emptyset$$

The system MISI 1357 is the average of the MISI for modules within the system, as follows:

$$MISI(S) = \frac{1}{M} \sum_{i=1}^{M} MISI(m_i)$$

For a well-modularized system, modules should depend on modules that are more stable and that reside in lower layers. Hence, $|SD(m)| \approx |fanout(m)|$ and $MISI(m) \to 1$. If a system has a high MISI index 1357 then any changes or extensions made to the system will affect only a small number of modules in the upper layers of the system.

In the definition if MISI, above, the formula for stability is based on the fan-in and fan-out dependencies of modules. Alternatively, instability of a module can be based on the probability the module will be changed in the next release (or revision, etc.) of the software. This probability can be calculated based on the past module history. In such a case, the following equations can be used to determine the instability I(m) of a module m as shown.

Let Rev be the set of revisions $\{r_1, \ldots, r_q\}$ of the given software, and let Chg: M→Rev be the assignment of modules to the set of revisions in which the modules were changed. The instability I(m) of m can now be defined as:

$$I(m) = \frac{|Chg(m)|}{|Rev|}$$

With this definition of I(m), SD(m), and MISI(m) are defined as above. Furthermore, the system level MISI can be generalized like the previously-defined metrics.

As another alternative, MISI(S) can be calculated as a simple average (as shown above), a weighted average, a median value, etc.

This metric caters to the principle of module extendibility.

Testability Index

The testability index 1359 (also called the normalized testability-dependency metric, NTDM) determines the testability dependence of modules, that is, the degree to which modules rely on the input or output of other modules. A module that has few dependencies on other modules is easier to test. A testability dependence is created if the assessment of the correctness of the input-output relationships during the testing of a module depends on the correctness of the input-output relationships of another module. That is, if the testing of module $m_1$ requires another module $m_2$ to produce intermediate results that are then used in $m_1$, then there is a testability dependence between the two modules. The extent of such testability dependencies are measured with the normalized testability-dependency metric, as explained below.

Let dep($m_i$) be the number of modules on which a given module $m_i$ has a testability dependence. The testability-dependence count (TDC) is defined as the sum of the testability dependencies dep($m_i$) for substantially all modules in the system, written as:

$$TDC = \sum_{i=1}^{M} dep(m_i)$$

where M is the total number of modules in the system.

The NTDM metric index 1359 is the normalized ratio of TDC (the sum of the testability dependencies for all (or substantially all) modules) to the total number of modules, to wit:

$$NTDM = 1 - \frac{TDC}{M \times (M-1)}$$

Note that TDC varies from 0 to M*(M−1) depending on the testability dependencies between the modules. The upper limit is reached when a module has a testable dependency on every other module, (i.e., M−1), while the lower limit is reached when a module has no testable dependencies on other modules. The value of NTDM 1359 will be 1 when the modules are independently testable (i.e. when dep(m)=0), and 0 when every module is testably dependent on every other module.

The NTDM formulation shown above is based on the count of testability dependent modules. As an alterative formulation, the strength of the testability dependence can also be measured.

As above, let MDG be the module dependency graph where the nodes of the graph represent modules in the system and of the graph represent the pairwise dependence between the modules. Let path ($m_i$, $m_j$) no be the length of the shortest path from $m_i$ to $m_j$. As before, let dep($m_i$) be the set of modules that a given module $m_i$ is testably-dependent upon. An alternate definition of the Testability Dependency can be defined as:

$$TDC = \sum_{i=1}^{M} \sum_{j=1}^{|dep(m_i)|} \text{path}(m_i, m_j)$$

where M is the total number of modules in the system. The NTDM metric is defined as above.

This metric characterizes software according to the principle of maximization of the stand-alone testability of modules.

Example 18

Figure 14:
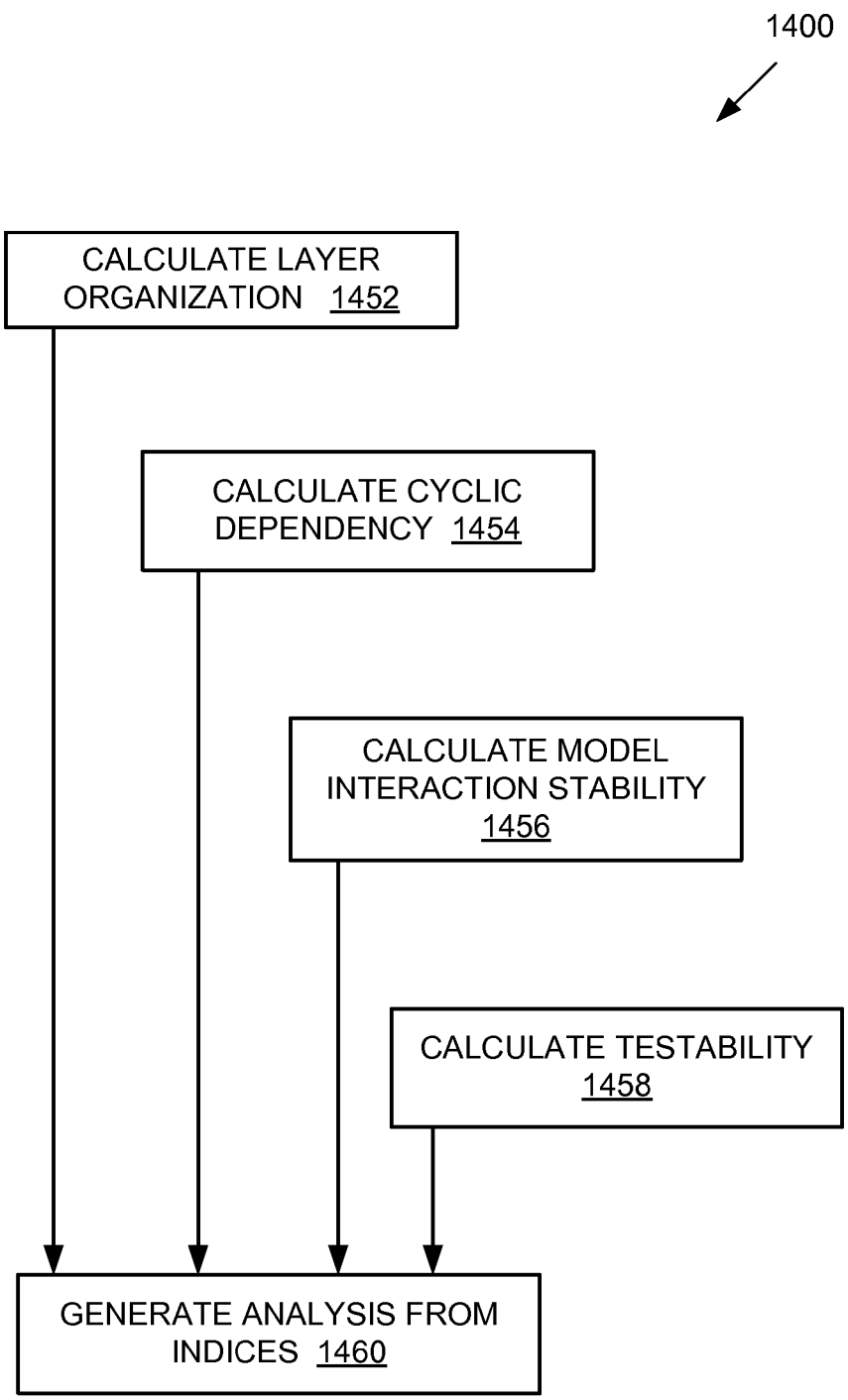
FIG. 14 is a flowchart of an exemplary method to evaluate modularization quality of source code using an architectural perspective.

Exemplary Method to Evaluate Modularization Quality of System Source Code from an Architectural Perspective FIG. 14 is a flowchart of an exemplary method 1400 to evaluate modularization quality of modules using an architectural perspective. The method can be performed, for example, by the architectural perspective modularity evaluator 1344 of FIG. 13. Each of the architectural performance modularization quality evaluations—1452, 1454, 1456, and 1458—can be performed separately, as shown, or can be performed sequentially, such that, for example, module interaction stability 1456 can be calculated first, followed by any of the other calculations 1452, 1454, and 1458; or the calculations can be performed in another order. An architectural modularity calculation can produce an index, such as any of the indices 1353, 1355, 1357, 1359 shown in FIG. 13, and discussed with reference to example 17. Each of the architectural modularity calculations will now be discussed in turn.

At 1452, a layer organization of given source code, such as the source code 1302 (FIG. 13), can be calculated. This can produce an index, such as the layer organization index 1353 of FIG. 13.

At 1454, cyclic dependency of given source code, such as the source code 1302 (FIG. 13), can be calculated. This can produce an index, such as the cyclic dependency index 1355 of FIG. 13.

At 1456, model interaction stability of given source code, such as the source code 1302 (FIG. 13), can be calculated. This can produce an index, such as the model interaction stability index 1357 of FIG. 13.

At 1458, testability of given source code, such as the source code 1302 (FIG. 13), can be calculated. This can produce an index, such as the testability index 1359 of FIG. 13.

At 1460, after one or more architectural modularity evaluations have been calculated, results can be generated from the one or more calculated indices.

Example 19

Figure 15:
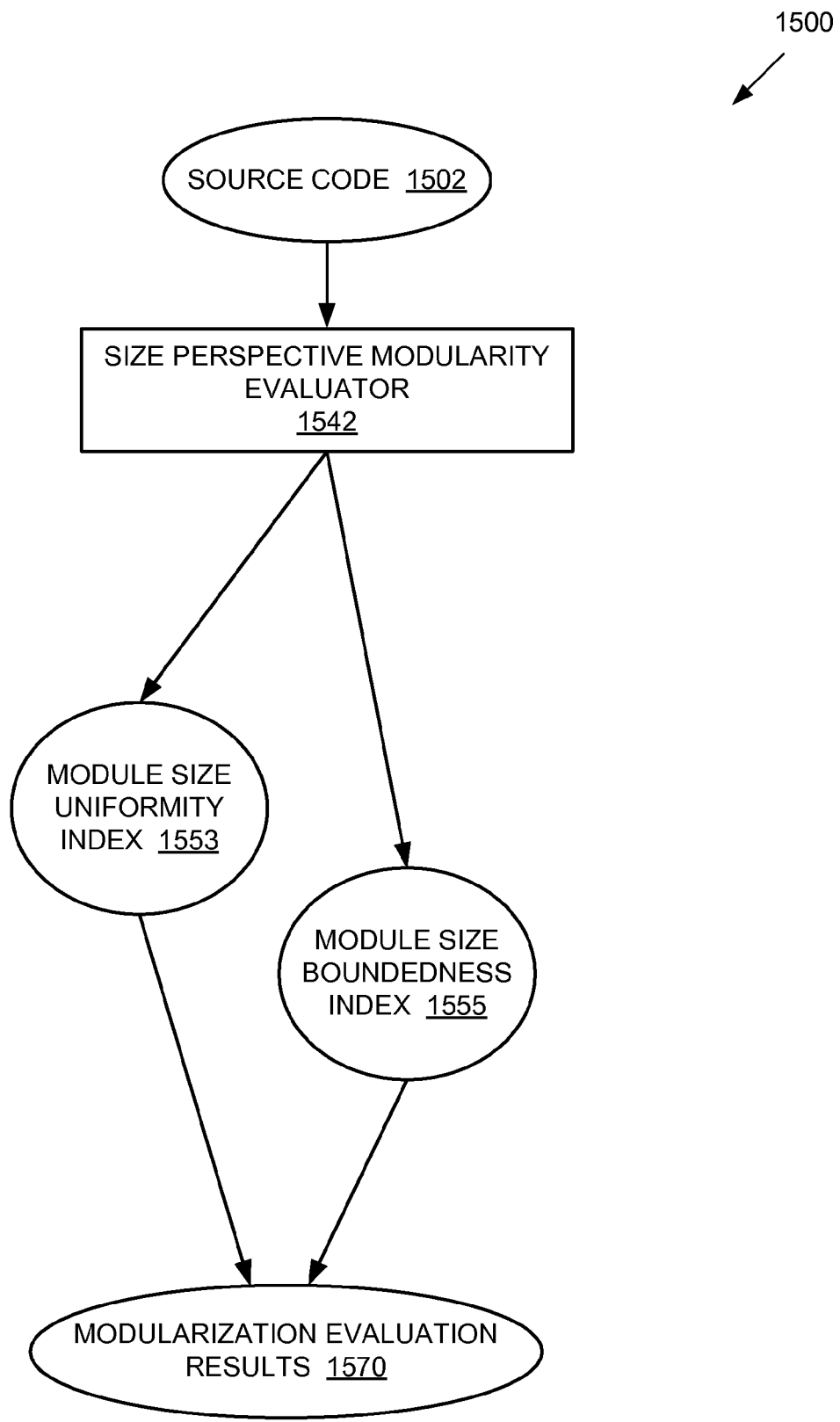
FIG. 15 is a block diagram of an exemplary system to evaluate modularization quality of source code using a size perspective.

Exemplary System to Evaluate Modularization Quality of System Source Code from a Size Perspective FIG. 15 is an exemplary system 1500 to evaluate modularization quality of modules using a size perspective. At 1502, a source code representation of a software system (or a portion thereof) is received. A size perspective modularity evaluator 1544, such as the size perspective modularity evaluator 758 (FIG. 7), can calculate any one, or a group of one or more of the following size indices: the module size uniformity index 1553, and the boundedness index 1555, each of which will be discussed in turn. Each of these indices can then be used as modularization quality evaluation results 1570.

Module Size Uniformity Index

The module size uniformity index 1553 (abbreviated MSUI) measures how similar in size each module is within a specified portion of source code. Within reason, modules generally should be roughly equal in size. A strong deviation from this uniform size constraint generally is indicative of poor modularization. The indices calculated using size perspective possess a bias towards making the modules as equal in size as possible, subject to other modularization constraints. The size constraint can be expressed in terms of the average size μ of the modules and the standard deviation a from the average associated with the module sizes. The module size uniformity index can be defined as the ratio of the absolute values of average size minus the standard deviation divided by the average size plus the standard deviation. This can be expressed as:

$$MSUI(S) = \frac{|\mu - \sigma|}{\mu + \sigma}$$

The closer this index is to 1, the greater uniformity of module sizes. As an aside, this formula assumes that the standard deviation and the average size value are not equal, which will lead to an incorrect 0 value of the metric, as the numerator of the ratio will equal zero. Calculation of this metric should take measures to check for this disallowed value.

As an alternate formulation, MSUI(S) can be calculated as:

$$MSUI(S) = \frac{w_1 * \mu}{w_1 * \mu + w_2 * \sigma}$$

Where $w_1$ and $w_2$ are user defined weights whose values are expected to vary between 0 and 1.

It is evident that MSUI 1553 increases as the standard deviation of the average module size decreases. This adheres to the module size principle, and aims to measure the maximum of module size uniformity, as discussed in example 3.

Module Size Boundedness Index

The module size boundedness index 1555 attempts to determine a correct size for a module. Even if modules are all approximately the same size, the size could, itself, either too small or too large. It is often recommended that, ideally, no module should significantly exceed some recommended particular size, generally expressed in terms of the number of lines of code. Assuming that this "magic number" is Γ, the average deviation in module length from this magic number is first calculated by $\delta_i = |Sz_i - \Gamma|$, where $Sz_i$ is the number of lines of module m. Further, let $\delta_{max} = \max_i\{\delta_i\}$ Ideally, $\forall_{1 \ldots M}, \delta_i = 0$, and a histogram of $\delta_i$ values will have a single bar of height M (the number of modules) at $\delta_i = 0$. However, in practice, a histogram of $\delta_i$'s could be spread over the range [0, $\delta_{max}$] of values.

The module size boundedness index is a measure as to what extent the deviations depart from the ideal.

A rationale based on the Lullback-Leiber (KL) divergence for measuring the "distance" between two probability distributions is used. If it could be assumed that every measured size deviation between 0 and max has a non-zero probability of occurrence, then it can be shown that the KL "distance" between the ideal and the actual distributions for the deviations would be $-\log(\text{prob}\{\delta=0\})$ where prob$\{\delta=0\}$ is proportional to the actual number of modules whose size deviations from the magic size are zero. This measure can be weighted, in some embodiments, by $\delta_{max}/\Gamma$ because as $\delta_{max}$ becomes a negligible fraction of $\Gamma$, it is unimportant how the deviations are distributed in the range $[0, \delta_{max}]$ as they are too small to care about. Therefore, the following formula can be used to measure the extent to which the distribution of the actual size deviations differs from the ideal distribution:

$$d = -\frac{\delta_{max}}{\Gamma} \times \log\left(\frac{|\{\delta_i; \delta_i < \tau\}|}{M}\right)$$
$$= 0 \text{ when } \delta_{max}$$
$$= 0$$

where the numerator in the argument to the logarithm, $|\{\delta_i: \delta_i<\tau\}|$, is the cardinality of the set of $\delta_i$'s whose values are less than a user-specified parameter $\tau$. In alternate embodiments, a value is assigned to t based on a percentage (or a multiple) of $\Gamma$. Except for the special case of d=0, shown above, the "distance" d is lower-bounded by a value close to 0, which corresponds to the case when the size of all modules except one (the one for which the deviation corresponds to $\delta_{max}$), are at the magic number. The value of d would be upper-bounded by some large number depending on the least number of modules whose size deviations can be expected to be within $\tau$.

In some embodiments, d is converted into a properly normalized metric using the following equation:

$$MSBI(S)=e^{-d}$$

It is evident from the module size uniformity index 1553 equation that module size uniformity increases as the standard deviation of the module sizes from the average module size decreases. This addresses the principle related to module size. Similarly, the MSBI equation, above measures the extent to which the module size bound as specified by $\Gamma$ is honored by the individual modules. This metric also addresses the principle "Observance of Module Size Bounds."

As an alternate module size boundedness index, the following formula can be used. Recall that a "magic number" can be defined at the ideal size of a module for a system, expressed in lines of code. Assuming that this "magic number" is $\Gamma$, the average deviation in module length from this magic number can first be calculated, as shown below:

$$\delta_{av} = \frac{1}{M} \sum_{i=1}^{M} |L_i - \Gamma|$$

In the above equation, $L_i$ is the number of lines of module m, and M is the total number of module in the system.

As a fraction of the largest of either the magic length, $\Gamma$, or of any of the module lengths, this deviation can be re-expressed as:

$$\delta_{fav} = \frac{\delta_{av}}{\max(L_i, \Gamma)}.$$

The metric may now be defined as:

$$MSBI(S)=1-\delta_{fav}$$

This alternate MSBI 1555 measures the extent to which the module size bound specified by $\Gamma$ has been honored during the design of individual modules. It also adheres to the module size principle, specifically, to the observance of the module size bounds, as discussed in example 3.

As another alternative MSBI 1555, a variation of the original formula can be used to calculate d. For example, $$d = -\frac{\delta_{max}}{X} \times \log\left(\frac{|\{\delta_i \cdot \delta_i < \tau\}|}{M}\right)$$

Where X can be any user-defined parameter, including $\Gamma$. MSBI(S) can also be generalized as MSBI(S)=$r^{-d}$ where r is any real number >1.

Example 20

Figure 16:
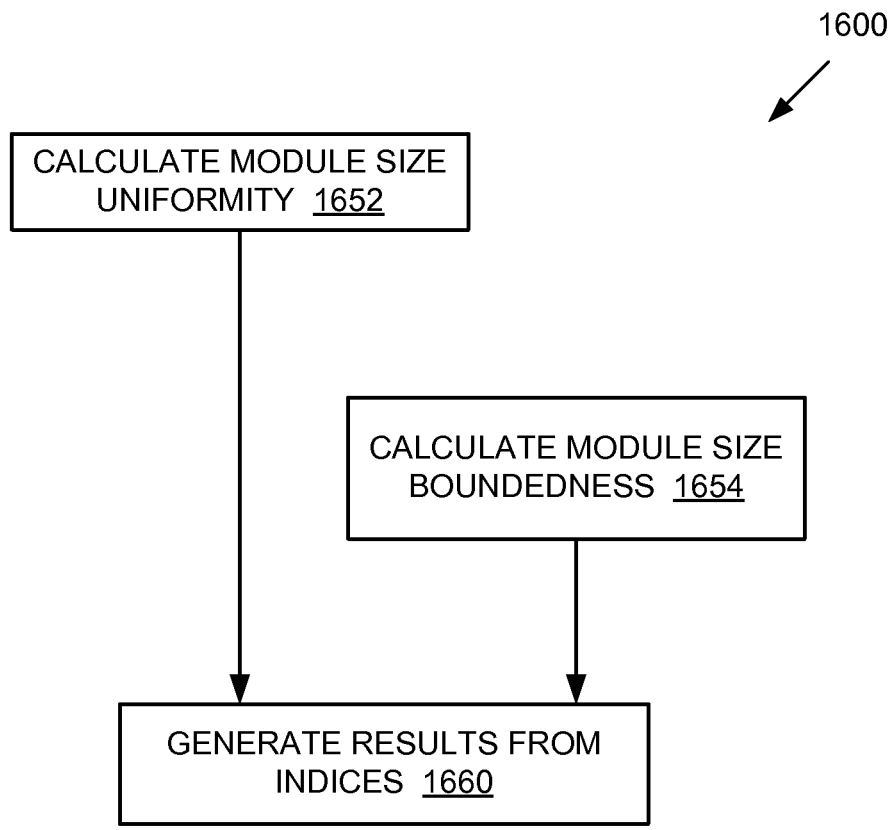
FIG. 16 is a flowchart of an exemplary method to evaluate modularization quality of source code using a size perspective.

Exemplary Method to Evaluate Modularization Quality of System Source Code from a Size Perspective FIG. 16 is a flowchart of an exemplary method 1600 to evaluate modularization quality of modules using a size perspective. The method can be performed, for example, by the size perspective modularity evaluator 1542 of FIG. 15. Both of the size performance modularization quality evaluations—1652 and 1654—can be performed separately, as shown, or can be performed sequentially, such that, for example, calculating module size boundedness 1654 can be evaluated first, followed by calculation of the module size uniformity 1652; or the evaluations can be performed in another order. A size modularity calculation can produce an index, such as one of the indices 1553, 1355, shown in FIG. 15, and discussed with reference to example 19. Each of the size modularity calculations will now be discussed in turn.

At 1652, module size uniformity of given source code, such as the source code 1502 (FIG. 15), can be calculated. This can produce an index, such as the module size uniformity index 1553 of FIG. 15.

At 1654, module size boundedness can be calculated. This can produce an index, such as the module size uniformity index 1554 of FIG. 15.

At 1660, after one or more size performance module evaluations have been calculated, results can be generated from the one or more calculated indices.

Example 21

Figure 17:
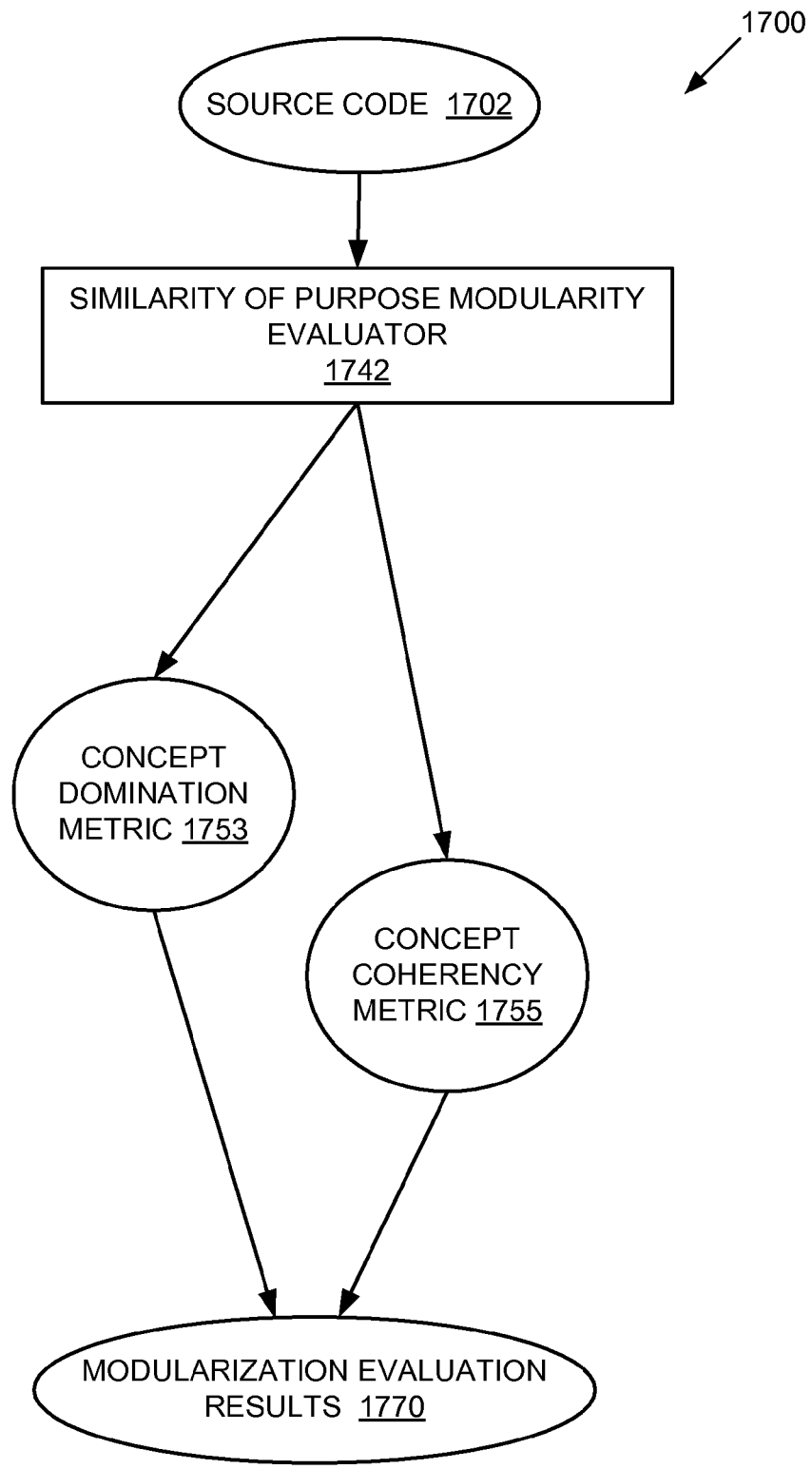
FIG. 17 is a block diagram of an exemplary system to evaluate modularization quality of source code using a similarity of purpose perspective.

Exemplary System to Evaluate Modularization Quality of System Source Code from a Similarity of Purpose Perspective FIG. 17 is an exemplary system 1700 to evaluate modularization quality of modules using a similarity of purpose perspective. At 1702 a source code representation of a software system (or a portion thereof) is received. A similarity of purpose perspective performance evaluator 1744, such as the similarity of purpose perspective performance evaluator 756 (FIG. 7), can calculate any one, or a group of one or more of, the following size performance indices: the concept domination metric 1753, and the coherency metric 1755.

The English language constructs used to build a program, such as words used in comments, variable names, function names, and so on, can be used to give clues to the purposes of functions, modules, layers, and other software groupings. These clues can be referred to as concepts. The metrics in this example exploit these concepts to determine if the software groupings (functions, modules, etc.) have a similar purpose.

To determine any of the metrics in this example, a concept set, that is, a set of words that may appear as keywords, and/or synonyms, and/or abbreviations of those words, can be made accessible. This concept set may be assembled by hand by a person familiar with the source code 1702, may be partially assembled by hand and partially automated, or may be assembled in another way.

Definitions that will be used for the indices described in this example are now described. Let $C=\{c_1, \ldots, c\}$ denote a set of N concepts for a given system S. Also let $F=\{f_1, \ldots, f_F\}$ indicate the set of functions distributed over M modules $\{m_1, \ldots, m_M\}$ The word "function" here indicates any software grouping with input-output functions, such that procedures, subprograms, etc., are included, as previously mentioned. For this example, the symbol $m_i$ indicates the set of functions that are in $m_1$. For functions, the number of occurrences of concepts, (which may include its synonyms, abbreviations, etc., and which may be found in the concept set) are searched in the function signature and the function body. The concept frequency $H_f(c)$ is denoted as the frequency of occurrences of the concept $c \in C$ for a given function $f \in F$.

As an illustration of the concept content of a body of software, the Apache httpd 2.0.53 is analyzed for the concept set {authentication, caching protocol, logging}. Table 1, below, shows the frequencies of these concepts and their synonyms in the software. In this example, $H_{allow\_cmd}$ (authentication)=3.

TABLE I

CONCEPT FREQUENCY TABLE

| Function | authentication | platform | caching | protocol | logging |
|---|---|---|---|---|---|
| allow_cmd | 3 | 0 | 0 | 0 | 0 |
| check_dir_access | 4 | 0 | 0 | 5 | 3 |
| create_access_dir_config | 3 | 0 | 0 | 0 | 0 |
| authenticatebasicuser | 21 | 0 | 0 | 3 | 6 |
| checkuseraccess | 29 | 0 | 0 | 5 | 6 |

The frequency distribution of these concepts, in an exemplary embodiment, is then normalized. A particular concept may occur more frequently than other concepts, across all (or substantially all) functions, typically a concept associated with the overall purpose of the software code 1702. To avoid such a concept skewing the overall distribution, substantially each concept frequency, in an exemplary embodiment, is normalized by its global maximum. As an example, let $H_{max}(c)=\max\{H_f(c), \forall f \in F\}$. Frequencies can be normalized as follows:

$$\hat{H}_f(c) = \frac{H_f(c)}{H^{max}(c)}.$$

The concept domination metric 1753, and/or the coherency metric 1755, after calculation, can then be used as modularization quality evaluation results 1770.

The Concept Domination Metric

The concept domination metric 1753 (abbreviated CDM) determines if the concepts in the module have a non-uniform probability distribution. If a module is highly purpose-focused, a probability distribution of the concepts in the module will be highly peaked at the concept corresponding to the purpose of the module. Therefore, the more non-uniform the probability distribution of the concepts in a module, the more likely that the module conforms to singularity of purpose. The CDM 1753 can give a measure of the non-uniformity of the probability distribution of the concepts. In the worst case, all concepts will be evenly distributed, which gives a CDM 1753 of zero, in an exemplary embodiment. Other CDMs 1753 produce a worst case with a different value. As an example, in an exemplary CDM, concepts (which may be words selected beforehand, abbreviations, portions of words, and so forth) are determined. This determination may comprise counting the occurrences of the concepts, estimating the occurrences, or may be done some other way. The number of (or a portion of) the concepts that occur in each (or some) of the modules is then determined.

As another example, to create an exemplary CDM, a normalized concept frequency is created. This can be created as follows: for a given module m, the frequency of occurrences of a concept $c_i$ can be obtained from the normalized concept frequency of functions that constitute a module. This can be expressed as:

$$\hat{H}_m(c_i) = \sum_{\forall f \in m} \hat{H}_f(c_i)$$

The concept $C_{max}^m$ is then found that maximizes $$\hat{H}_m(c_i)$$

for each module m, i.e., $$\hat{H}_m(c_{max}^m) = \max_{c_i} \hat{H}_m(c_i)$$

Next, the normalized frequency is converted into a discrete probability measure:

$$g_m(c_i) = \frac{\hat{H}_m(c_i)}{\sum_{j=1}^{N} \hat{H}_m(c_j)}$$

where N is the total number of concepts being measured.

The Kullback-Leibler divergence of a uniform probability distribution, is then measured from the probability distribution $g_m$, in an equation known as the divergence equation:

$$KL(g_m) = \log N + \sum_{i=1}^{N} g_m(c_i) \times \log(g_m(c_i))$$

where the logarithms are base 2.

The dispersion of the concepts in any given module m is defined relative to concepts whose normalized frequencies of occurrence are within a predefined threshold: $\theta$ of $g_m(c_{max}^m)$.

This permits the purpose of a module to be stated in terms of not just one dominating concept, but by a set of concepts that are more or less equally important. The following rule partitions the set X of concepts for a specific module m into two subsets, $C_m^1$ and $C_m^2$.

$$c_m^1 = \begin{cases} \{c_i \mid g_m(c_i) > \theta \cdot g_m(c_{max}^m)\}, & KL(g_m) > \Psi \\ \emptyset, & \text{otherwise} \end{cases}$$

$$c_m^2 = c - c_m^1$$

Note that the existence of $C_m^1$ is predicated on divergence, which may be KL-divergence, exceeding a certain threshold. If the KL-divergence does not exceed the threshold, the concept distribution is too uniform to allow for the partitioning of C into a subset $C_m^1$ of dominating concepts.

The following lemma establishes at least some desirable properties for the divergence and the concept subsets $C_m^1$ and $C_m^2$.

Lemma: When the total number of concepts satisfies $N=2^k$, the $KL(g_m)$ divergence of the divergence equation, above, is bounded by [0, k]. When a module contains only one concept, the $KL(g_m)$ distance becomes maximum, i.e., equal to k. Proof: Being non-negative, the divergence $KL(g_m)$ is bounded on the low side by 0. $KL(g_m)$ becomes zero when the discrete probability distribution $g_m$ is uniform. At the other extreme, when a module m contains only one concept c∈C, $g_m(c)=1$ and for all (or substantially all) other c'∈C, $g_m(c')=0$. In which case, $KL(g_m)=\log N+\log 1$; which is equal to k.

The dispersion $D_m$ for a module m, with respect to the concept $c_{max}^m$ and other almost equally frequently occurring concepts in $C_m^1$ is defined by:

$$D_m = \frac{\sum_{c_i \in C_m^1} g_m(c_i)}{\sum_{c_i \in C_m^1} g_m(c_i) + \sum_{c_i \in C_m^2} g_m(c_i)}$$

The value of $D_m$ will always be close to 1 when $C_m^1$ is of low cardinality and has the maximum concept frequency. Note that when $C_m^1$ is not zero, its cardinality is always low. Furthermore, then $C_m^1$ has maximum concept frequencies, the following equation holds:

$$\sum_{c_i \in C_m^1} g_m(c_i) \gg \sum_{c_i \in C_m^2} g_m(c_i)$$

This, in turn, results in $D_m$ approaching 1.

The concept domination metric (CDM) 1753 for a system can now be defined:

$$\mathcal{D} = \frac{1}{M} \sum_{m \in \mathcal{M}} \mathcal{D}_m$$

where M is the total number of modules.

As an alternate formulation of the CDM metric 1753, the dispersion Δm can be calculated using weights, where $w_1$ and $w_2$ are two numbers between 0 and 1 which sum to 1, using the formula shown below:

$$D_m = \frac{w_1 * \sum_{c_i \in C_m^1} g_m(c_i)}{w_1 * \sum_{c_i \in C_m^1} g_m(c_i) + w_2 * \sum_{c_i \in C_m^2} g_m(c_i)}$$

As another alternate formulation, D, the concept domination metric, can be calculated as either a weighted average or a median value, rather than the simple average shown above.

This CDM metric 1753 measures the extent to which modules in a software system are cohesive with respect to concepts (words, etc.) that contain the largest number of clues within modules. This metric corresponds to the principle "maximization of module coherence on the basis of similarity and singularity of purpose." As the CDM metric 1753 also measures the dispersion of concepts in that its value increases as the dispersion increases, the CDM metric 1753 also corresponds to the principle "minimization of purpose dispersion."

Concept Coherency Metric

The concept coherency metric 1755 measures mutual information existing between a concept and a module. If a concept is central to the services offered by a module, then the mutual information between the module and the concept should be high. Such mutual information becomes high when each is able to predict the likelihood of the other with some probability. If a concept is orthogonal to the services offered by a module, neither concept nor module can tell much about the likelihood of the occurrence of the other—the mutual information between the two will be close to zero.

To formulate the concept coherency metric 1755, let C be a random variable whose value can be any element in the set C of defined concepts, as discussed earlier in this example. Similarly, let M be a random variable that can take on any value from the set M of modules. The mutual information between the concepts and the modules is then given by:

$$I(C;M)=H(C)-H(C|M)$$

where H(C) denotes the entropy associated with concepts in the system, and H(C|M) denotes the conditional entropy of the concepts in terms of the modules. The entropy H(C) can be expressed by:

$$H(C) = -\sum_{c \in C} \rho(c) \log \rho(c)$$

where ρ(c) is the discrete probability function over the concepts, the probability function expressing the relative frequencies of concepts in the system. The conditional entropy is given by:

$$H(C|M) = -\sum_{m \in M} \rho(m) \sum_{c \in C} g_m(c) \log g_m(c)$$

where ρ(m) denotes the probability with which a particular module M is selected from the set M of modules. If this probability is assumed to be uniform, the expression for conditional entropy reduces to:

$$H(C|M) = -\sum_{c \in C} g_m(c) \log g_m(c)$$

The concept coherency metric 1755 (CCM) can now be defined as:

$$CCM = \frac{I(C; M)}{\log(|C|)}$$

The concept coherency metric 1755 can be interpreted as the normalized measure of the extent to which the occurrence can be predicted for a given module. The denominator, used for normalization, represents the best possible scenario, that is, where the conditional entropy H(C|M)=0; that is, the uncertainty with which the occurrence of a concept can be predicted for a given module is 0.

It may be further observed that, in the worst case, all of the software may be in a single module; that is, a monolithic system having |M|=1. Here, the I(C;M) becomes 0, as shown below:

$$I(C; M)|_{|M|=1} = H(C) - H(C|M)$$
$$= H(M) - H(M|C)$$
$$= -\sum_{m \in M} \rho(m) \log \rho(m) + \sum_{c \in C} \rho(c) \sum_{m \in M} \rho(m|c) \log(\rho(m|c))$$
$$= 0 \text{ (since } \rho(m) = 1 \text{ and } \rho(m|c) = 1)$$

Similarly to the concept domination metric 1753, the concept cohesion metric 1755 adopts an information-theoretic approach to measure the extent to which modules in a given system, consisting of source code (such as the source code 1702), are cohesive with respect to the main concepts embodied in the modules. Like the concept domination metric 1753, this metric 1755 also corresponds to the principle "maximization of module coherence on the basis of similarity and singularity of purpose" as discussed with reference to example 3.

Example 22

Figure 18:
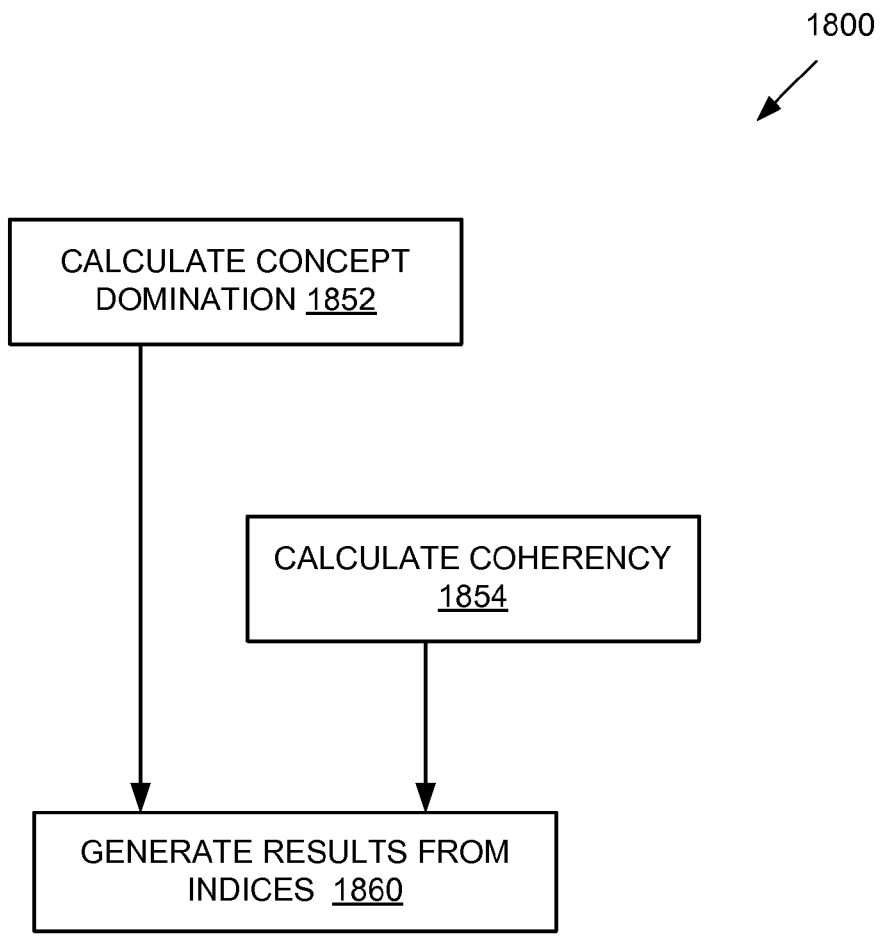
FIG. 18 is a flowchart of an exemplary method to evaluate modularization quality of source code using a similarity of purpose perspective.

Exemplary Method to Evaluate Modularization Quality of System Source Code from a Similarity of Purpose Perspective FIG. 18 is a flowchart of an exemplary method 1800 to evaluate modularization quality of modules using a similarity of purpose perspective. The method can be performed, for example, by the similarity of purpose perspective modularity evaluator 1742 of FIG. 17. Both of the similarity of purpose modularization quality evaluations—calculating the concept domination 1852 and calculating coherency 1854—can be performed separately, as shown, or can be performed sequentially, such that, for example, calculating concept domination 1852 can be evaluated first, followed by calculating coherency 1854; or the evaluations can be performed in another order. A similarity of purpose calculation can produce one or more of the following indices: concept domination metric 1753 and coherency metric 1755, shown in FIG. 17, and discussed with reference to example 21. Both of the similarity of purpose metrics calculations will now be discussed in turn.

At 1852, concept domination of given source code, such as the source code 1702 (FIG. 17), can be calculated. This can produce an index, such as the concept domination metric 1753 of FIG. 17.

At 1854, coherency of given source code, such as the source code 1702 (FIG. 17), can be calculated. This can produce an index, such as the concept domination metric 1753 (FIG. 17) and/or the coherency metric 1755 (FIG. 17).

At 1860, after one or more similarity of purpose modularity evaluations have been calculated, results can be generated from the one or more calculated indices.

Example 23

Figure 19:
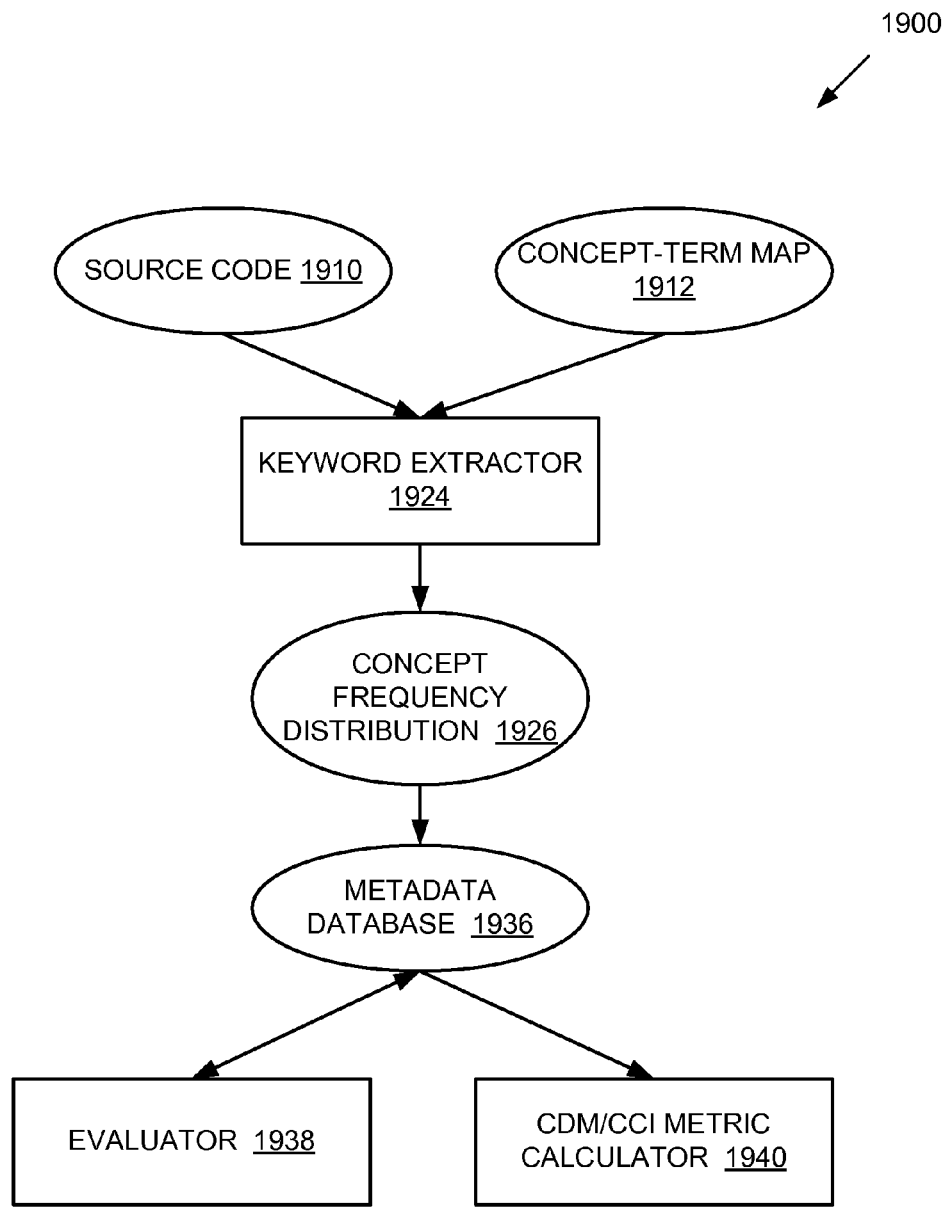
FIG. 19 is a block diagram of an exemplary system to extract concepts that may be used to calculate a similarity of purpose perspective.

Exemplary System to Extract Concepts for Use in Similarity of Purpose Perspectives FIG. 19 is an exemplary system 1900 to extract concepts for use in Similarity of Purpose perspectives. Concept sets, discussed with reference to example 21, can be used by the similarity of purpose evaluator 1742 of FIG. 17. To evaluate some metrics, such as the concept domination metric 1753 (FIG. 17) and the coherency metric 1753 (FIG. 17) domain concepts are extracted from source code and a frequency distribution is then created.

At 1910, source code is received. This source code may be the source code 110 of FIG. 1. At 1912, a concept-term map is received. This concept term map 1912 may be a concept set as discussed with reference to example 19. For example, it may be an input file containing a set of business concept names and the associated terms, keywords, and abbreviations, that can be used to identify a business concept. This concept term map may be created manually, automatically, or by some combination of the two.

A keyword extractor 1924 then extracts concept terms received from the concept-term map 1912 from the source code 1910, producing a concept frequency distribution 1926. The keyword extractor 1924 may input the keywords from the concept-term map 1912 as regular expressions and then may compute a concept frequency distribution for functions by counting the occurrences of the keywords in the function signature, return types, and data structures used by the function. Function calls need not be considered in the counting process as they can skew the concept distribution frequencies. For example, suppose that a customer-update functions $f_{customer}$ calls an account-handling function $f_{account}$ several times. If the concept account is looked for in the function call $f_{account}$ (called by the customer $f_{customer}$), several occurrences of the concept account will be found, without the concept otherwise being mentioned in the function. If the number of occurrences is sufficiently high account might appear (incorrectly) as the dominating concept in $f_{customer}$.

This concept frequency distribution 1926 can, in an exemplary embodiment, be stored in a metadata database 1936. A metric calculator 1940, such as the similarity of purpose metric calculator 1742 can then use, at least, the concept frequency distribution 1926, with other inputs, to produce, at a minimum, the concept domination metric 1953 and the coherency metric 1955. Similarly, an evaluator 1938 may be used to aid in the calculations of the concept domination metric 1753 (FIG. 17) and/or the coherency metric 1755 (FIG. 17) or other indices as described in the examples herein.

Example 24

Figure 20:
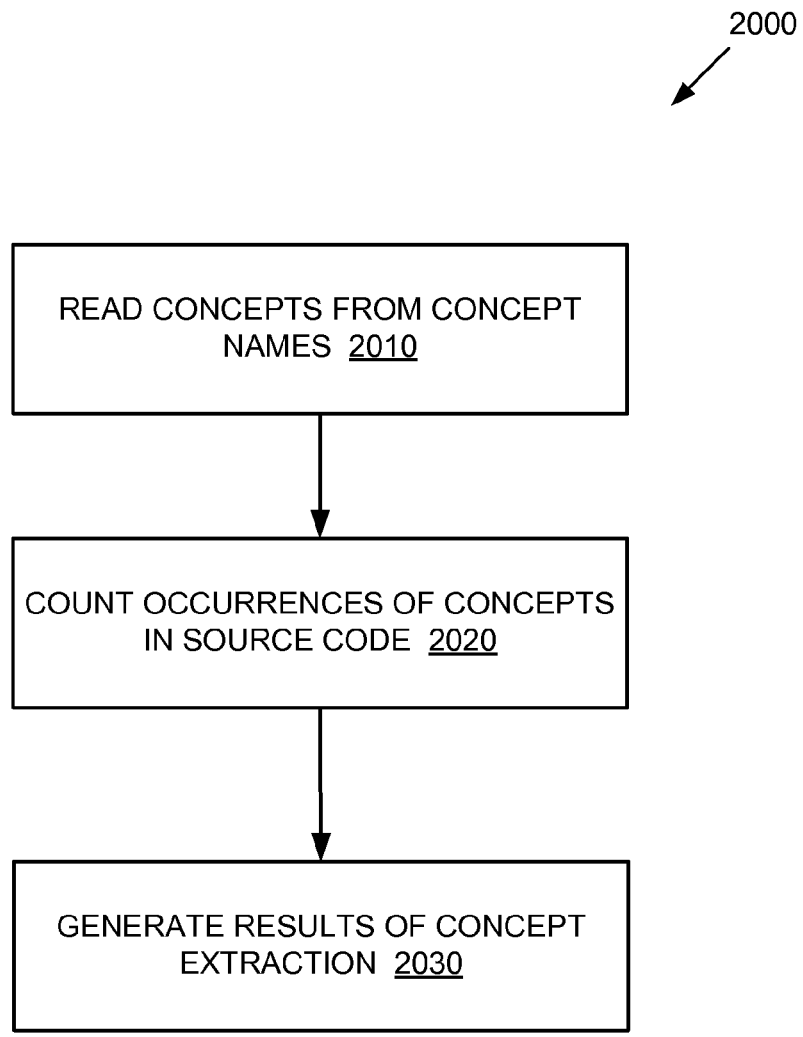
FIG. 20 is a flowchart of an exemplary method to extract concepts that may be used to calculate a similarity of purpose perspective.

Exemplary Method to Extract Concepts for Use in Similarity of Purpose Perspectives FIG. 20 is an exemplary flowchart 2000 to extract concepts for use in module perspectives. The method can be performed, for example, by the concept extraction system 1900 of FIG. 19. At 2010, concepts are read from a list of concept names. These concept names may be generated by hand by someone familiar with the source code to which the concepts refer, such as the source code 1910 of FIG. 19, may be generated automatically or may be generated using a combination of methods.

At 2020, occurrences of the concepts are counted in the source code. At 2030, results of the concept extraction—the concept counts—are generated. The concept count results may be a listing of how may of the concepts appear within various functions, modules, layers, etc; may be an analysis of the concept counts, and so forth.

Example 25

Exemplary Source Code Modification History

Figure 21:
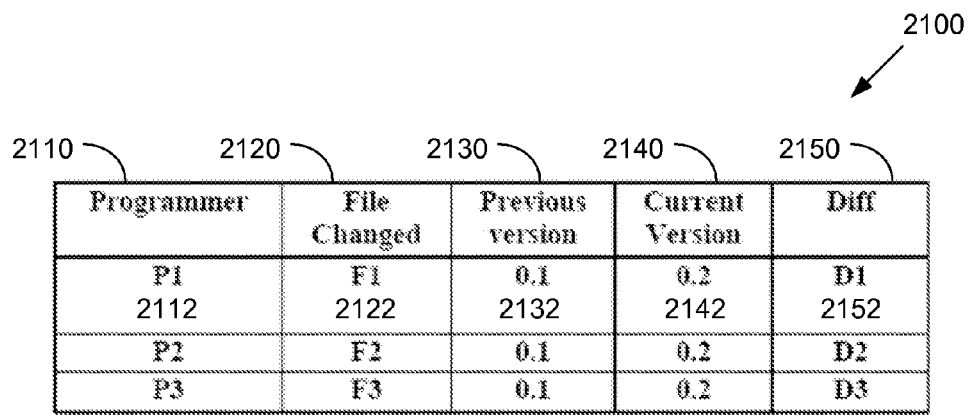
FIG. 21 is a diagram of an exemplary source code modification history.

FIG. 21 illustrates an exemplary source code modification history 2100. This modification history may be used with any of the examples herein. The data stored therein can be arranged with the following information: name of the programmer 2110, file which has been changed 2120, date of creation of the file (not shown), previous version of the file 2130, current version of the file 2140, and delta changes (diff) in the file with respect to the previous version of the file 2150. Delta changes, for example, may be the actual differences between the two versions, or may be a file which stores the differences between the two versions. Such information can be obtained, for example, by commercially available version control systems.

For instance, programmer PI 2112 may have modified a file F1 2122 whose version is 0.1 2132. Modifications are stored in D1 2152 with new version of file being 0.2 2142. The modifications can be those modifications that are generally tracked in version control software. The following modifications are typically stored: modification in file details, modification in function details, modification in global variable details, modification in data structure details, modification in function dependency, modification in dependency between global variables and functions, and changes in dependency between data structures and functions.

Example 26

Exemplary System to Determine Programmer History

Figure 22:
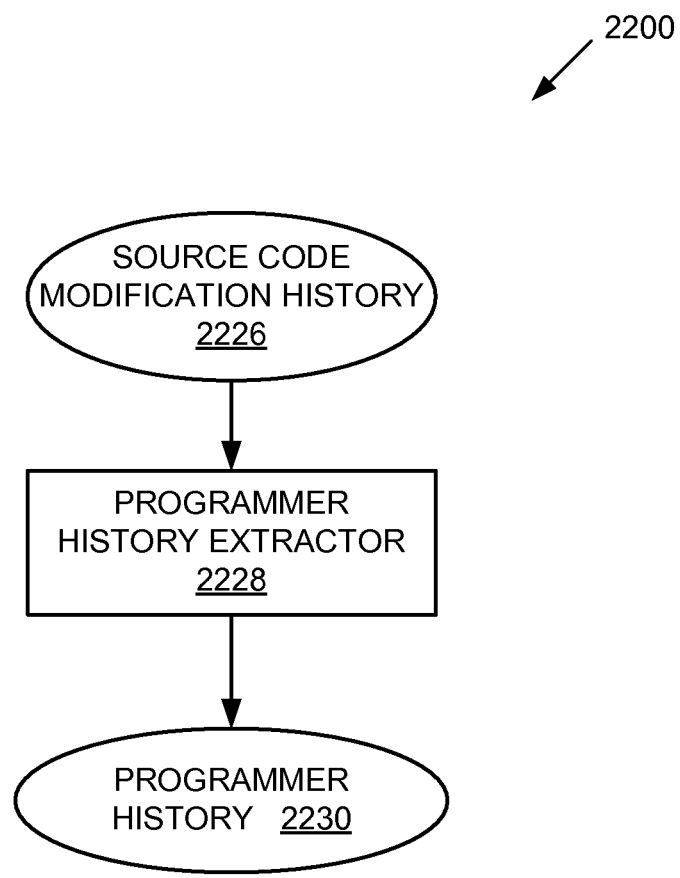
FIG. 22 is a block diagram of an exemplary system to determine programmer history that may be used to determine programmer modularity preservation.

FIG. 22 is an exemplary system 2200 to determine programmer history that may then be used to determine programmer modularity preservation. A source code modification history 2226 is received. The source code modification history 2226 may be the modification of source code which will be tested for adherence to modularization standards, such as source code 110 of FIG. 100. This modification history may have recorded at least some of the changes made to source code by one or more programmers, and may track such changes by version of the source code, such as the source code modification history 2100 of FIG. 21. A programmer history extractor 2228 may then extract the set of changes—the history—that one or more programmers have created as they worked on the source code 110 (FIG. 100). The programmer history extractor may then output a programmer history 2230.

In one embodiment of the present technique, the programmer code modification history extractor 2228 parses the source code modification history data (source code modification history 2100 of FIG. 21) and stores the programmer, file and version information and the exact changes in a secondary storage such as the "code modification history store." In another embodiment, the secondary storage can be a conventional relational database. The programmer code modification history extractor 2228 can extract at least some portion of the following information (or other information) from the modification history data: name of the programmer, name of the file (source code) the programmer has modified, the version of the file and date of creation, the nature of the change in the file with respect to its previous version.

In one embodiment, the changes with respect to the previous version that can be retrieved include: the functions that have been added/modified/deleted, the data structures/global variables that have been added/modified/deleted, which function dependencies, global variable-function dependencies, data structure-function dependencies have been added/modified/deleted. In one embodiment, the above information can be stored various database tables.

Example 27

Exemplary Method to Determine Programmer History

Figure 23:
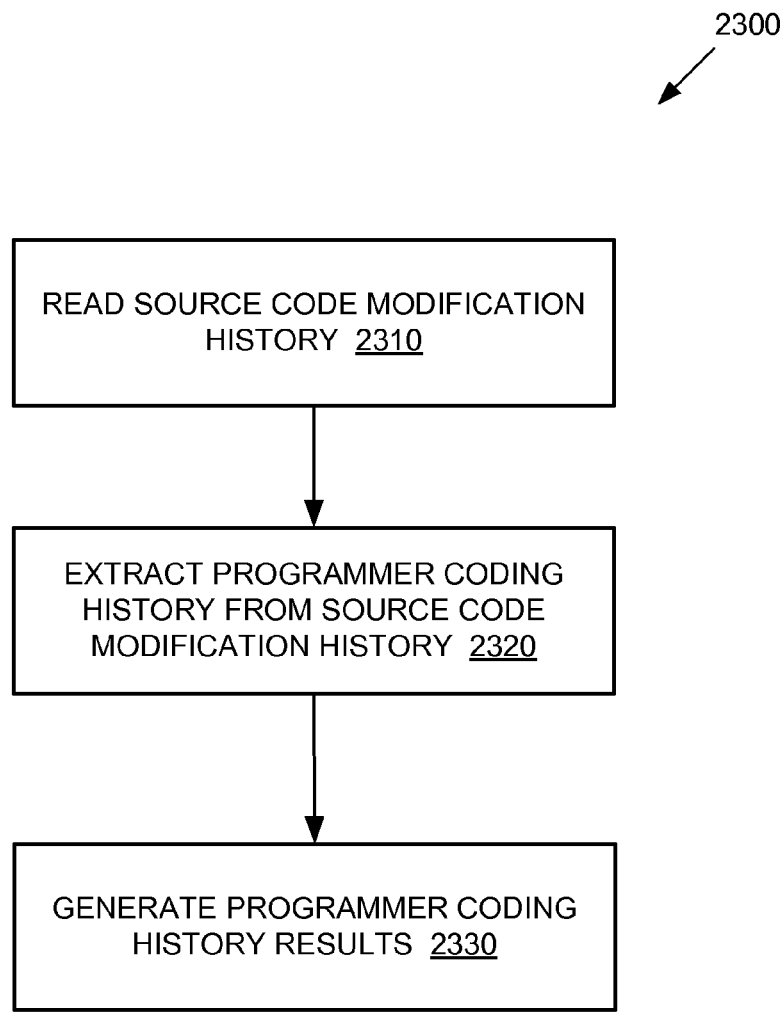
FIG. 23 is a flowchart of an exemplary method to determine programmer history that may be used to determine programmer modularity preservation.

FIG. 23 is a flowchart of an exemplary method 2300 to determine programmer history. The method can be performed, for example, by the programmer history system 2200 of FIG. 22.

At 2310, the source code modification history is received. At 2320, the programmer coding history is extracted from the source code modification history. At 2330, the programmer coding history results are generated using, at least in part the programmer coding history 2320.

Example 28

Exemplary System to Determine Programmer Modularization Preservation

Figure 24:
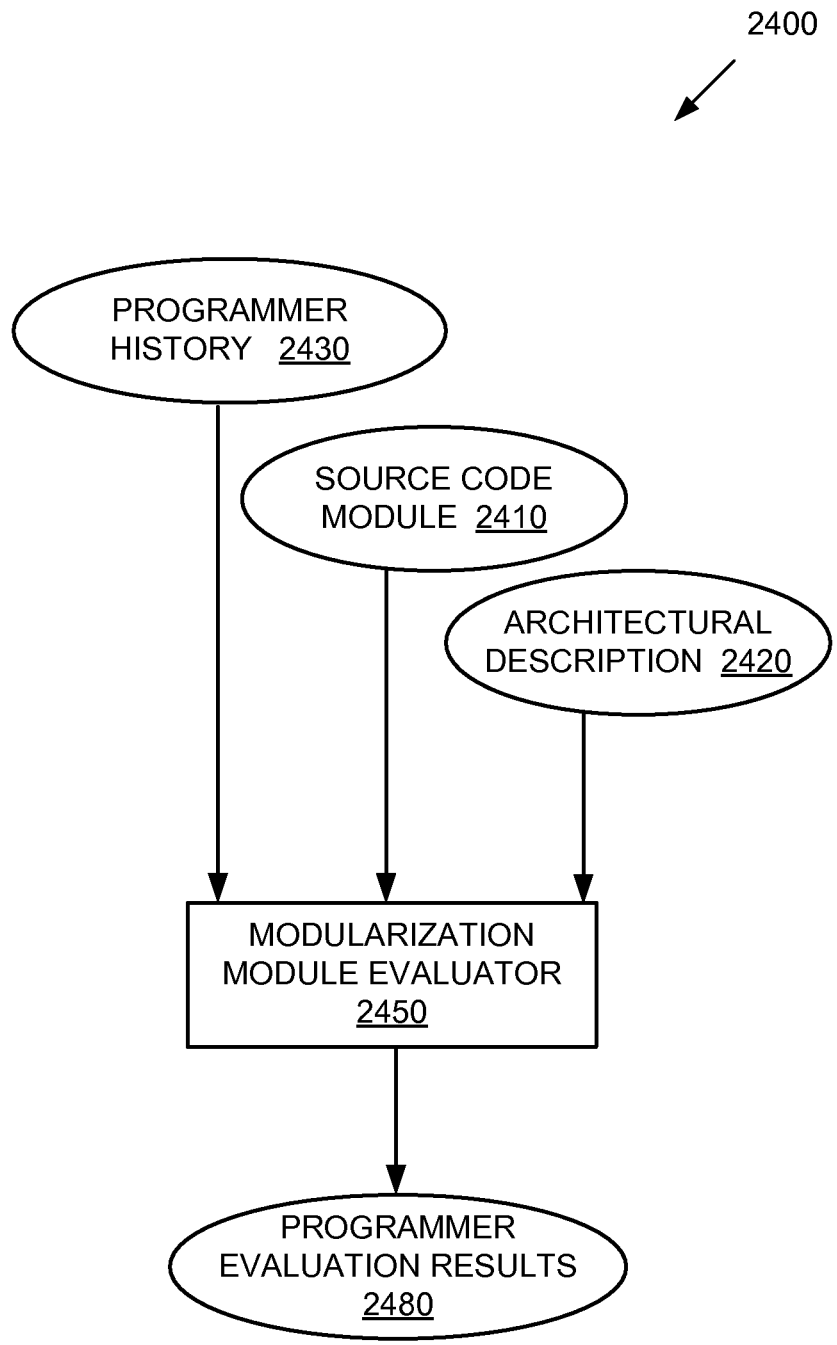
FIG. 24 is a block diagram of an alternate embodiment of an exemplary system to determine programmer history that may be used to determine programmer modularity preservation.

FIG. 24 shows an exemplary system 2400 for producing a programmer evaluation based on degree of modularization preserved or degraded by the programmer. Source code 2410 (which may be source code 310 of FIG. 3), an architectural description of the source code 2420 (which may be an architectural description 320 of FIG. 3), and a programmer history of source code modification over a period of time 2430 (which may be an programmer history 2230 of FIG. 22) are both used as inputs into the modularization evaluator 2450 to produce modularization quality evaluation results 2480.

Example 29

Figure 25:
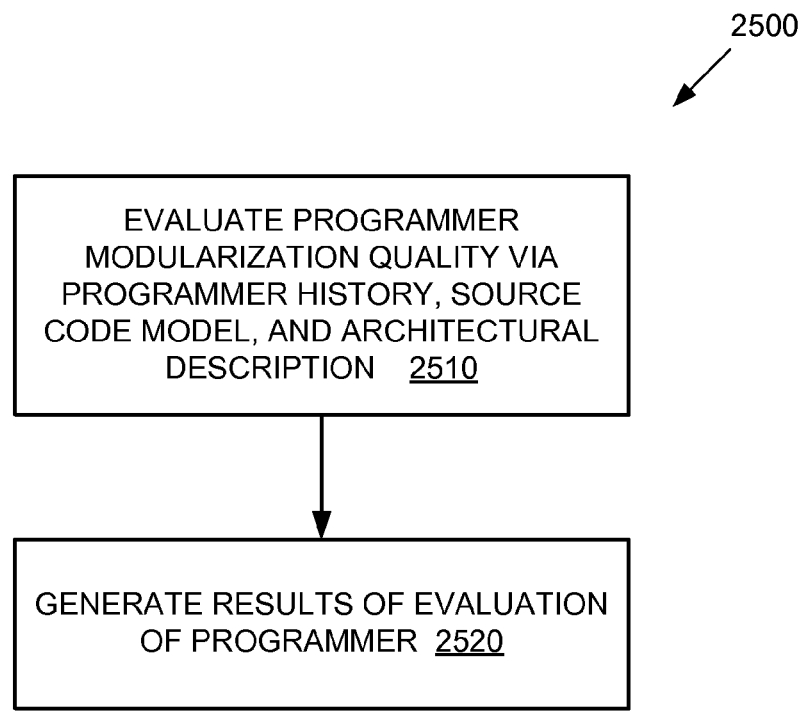
FIG. 25 is a flowchart of an alternate embodiment of an exemplary method to determine programmer history that may be used to determine programmer modularity preservation.

Exemplary Method to Determine the Degree of Modularization Preservation by a Programmer FIG. 25 shows an exemplary method 2500 for using a modularization evaluator in conjunction with source code, programmer history, and an architectural description of the source code to determine modularization results. The method can be performed, for example, by the system 2400 of FIG.

24. At 2510, programmer modularization quality is evaluated. Such an evaluation may be done using, for example, source code, such as source code 2410 of FIG. 24, an architectural description, such as the architectural description 2420 of FIG. 24, and a programmer history, such as the programmer history 2430 of FIG. 24. At 2520, results of programmer modularization quality is generated.

Example 30

Figure 26:
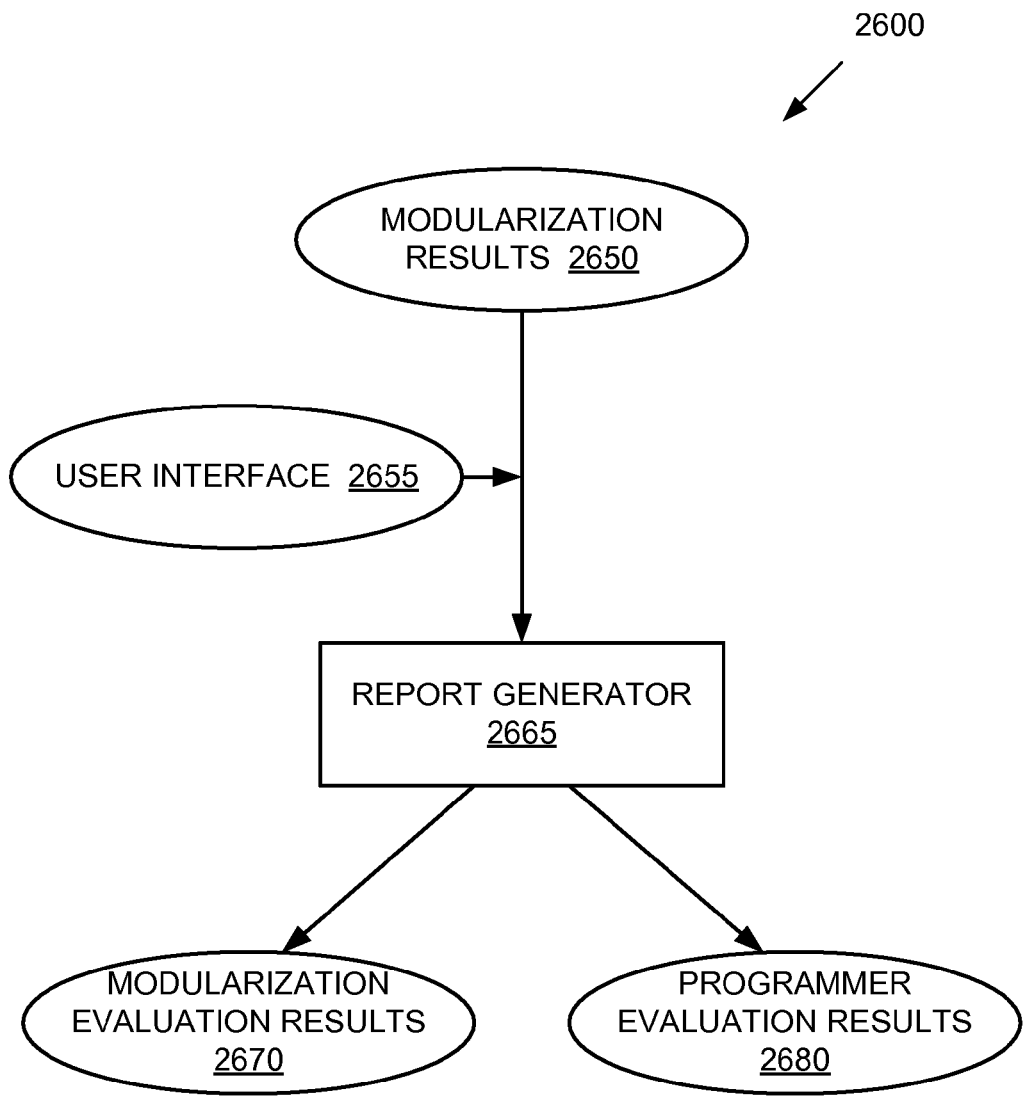
FIG. 26 is a block diagram of an exemplary system to use a report generator to generate modularization quality evaluation results and programmer modularization preservation results.

Exemplary System to Generate Modularization Quality Evaluation Results and Degree of Modularization Preservation by Programmers Results FIG. 26 is a block diagram of a system 2600 to use a report generator to generate software modularization quality evaluation results and results containing the degree of modularization preservation (or modularization violation) by programmers (e.g., by respective programmers). Modularization results 2650 are received. These modularization results may be modularization quality evaluation results 110, (FIG. 1) which themselves may be, in whole, or in part, programmer evaluation results 2480. A user interface 2655 can be used to provide information about the nature of a report that will be generated. This user interface 2655 can be a standard user interface such as is known to those of skill in the art, or may be a user interface especially tailored for software modularization quality measurement. A report generator 2665 can then be used to produce modularization quality evaluation results 2670 and/or programmer evaluation results 2680.

Example 31

Figure 27:
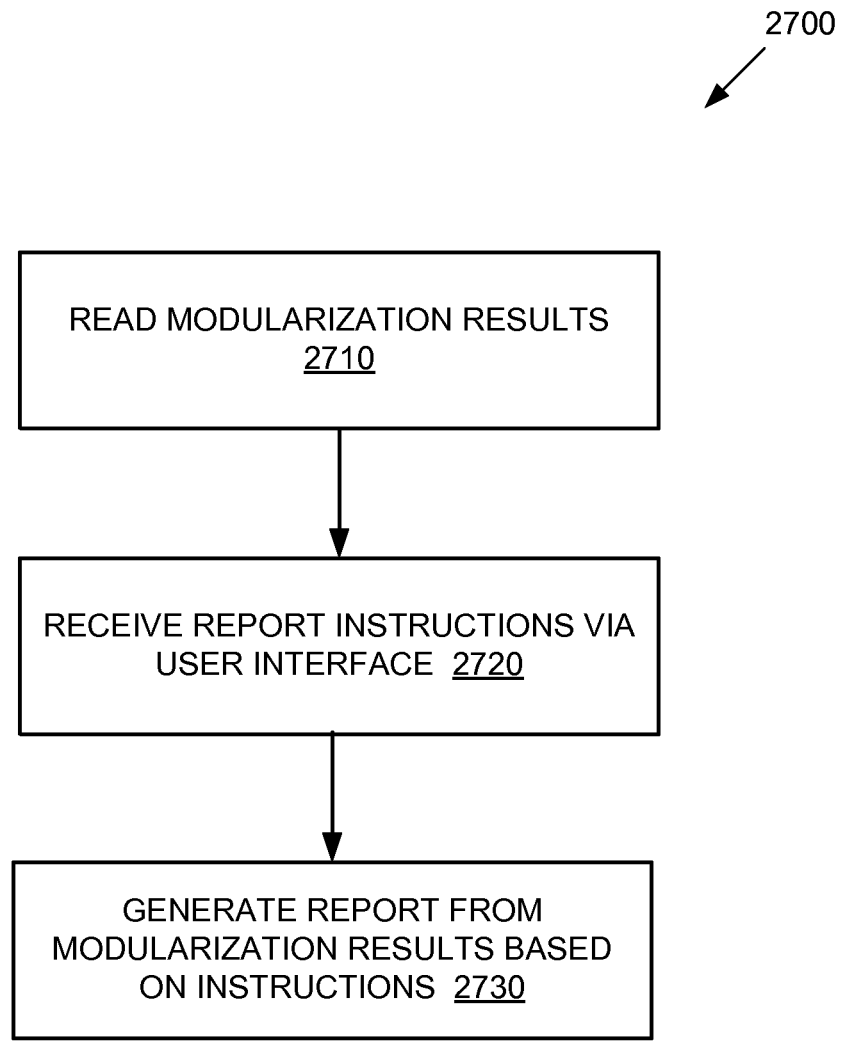
FIG. 27 is a flowchart of an exemplary method to use a report generator to generate modularization quality evaluation results and programmer modularization preservation results.

Exemplary Method to Generate Modularization Quality Evaluation Results and Programmer Modularization Preservation Results FIG. 27 shows an exemplary method 2700 to generate modularization quality evaluation results and programmer modularization preservation results. It can be performed, for example, by the system 2600 of FIG. 26. At 2710, modularization results are read. At 2720, report instructions are received via a user interface, such as the user interface 2655 of FIG. 26. At 2730, one or more reports are generated from the modularization results based on instructions received from the user interface, default instructions, etc.

Example 32

Exemplary System to Generate Modularization Quality Evaluation Results

Figure 28:
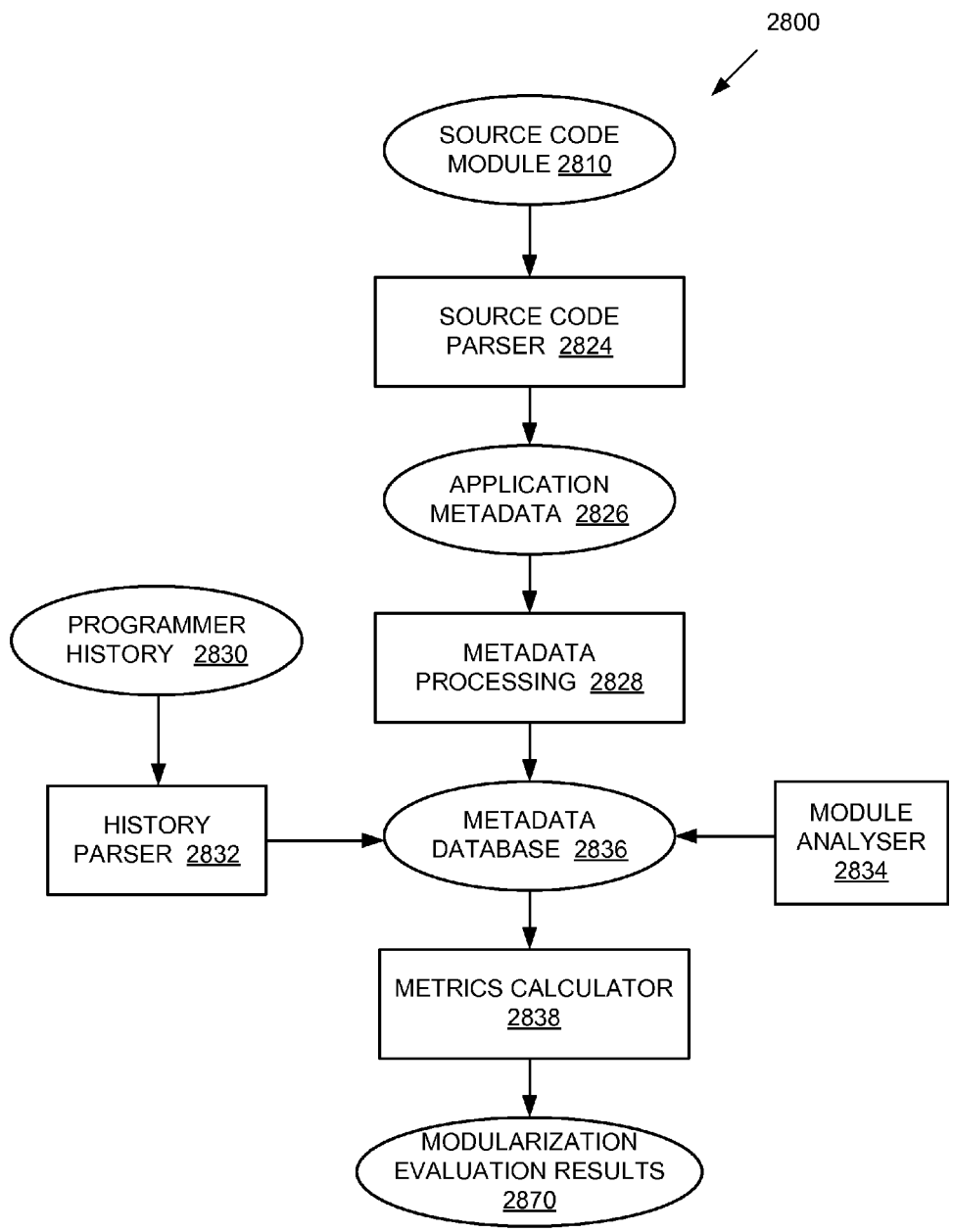
FIG. 28 is a block diagram of an exemplary system to generate modularization quality evaluation results.

FIG. 28 is a block diagram of an alternate embodiment system 2800 to generate modularization results. A source code module 2810, such as the source code 110 of FIG. 1, is used by a source code parser 2824 to produce application metadata 2826. This applications metadata 2826 is then used by a metadata processing component 2828 which, among other functions, writes the applications metadata 2826 into a metadata database 2836.

A programmer history 2830, such as the programmer history 2230 of FIG. 22, is used by a history parser 2832, which reads the parsed programmer history (not shown) into the metadata database 2836. A module analyzer 2834 is also present, which, in an exemplary embodiment, accepts as input an architectural description of the source code 320 (FIG. 3), outputs a module analysis (not shown) and stores it in the metadata database 2836. A metrics calculator 2838, which may be a modularization evaluator 150 (FIG. 1), then uses information stored in the metadata database 2836, to produce modularization quality evaluation results 2870.

Example 33

Exemplary Method to Generate Modularization Quality Evaluation Results

Figure 29:
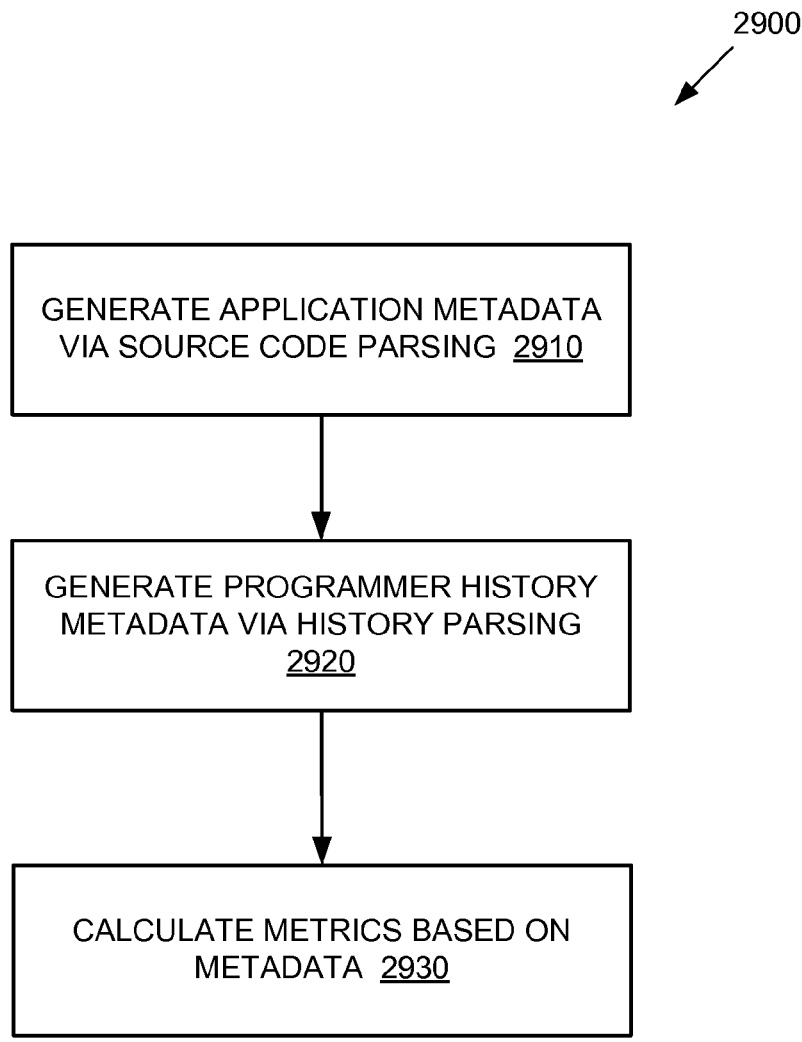
FIG. 29 is a flowchart of an exemplary method to generate modularization quality evaluation results.

FIG. 29 is a flowchart of an exemplary method 2900 to generate modularization quality evaluation results. This method can be performed by the system 2800 of FIG. 28. At 2910, application metadata is generated via source code parsing. At 2920, programmer history metadata is generated via history parsing. At 2930, metrics are calculated based on the metadata generated at 2910.

Example 34

Exemplary System to Generate Modularization Quality Evaluation Results

Figure 30:
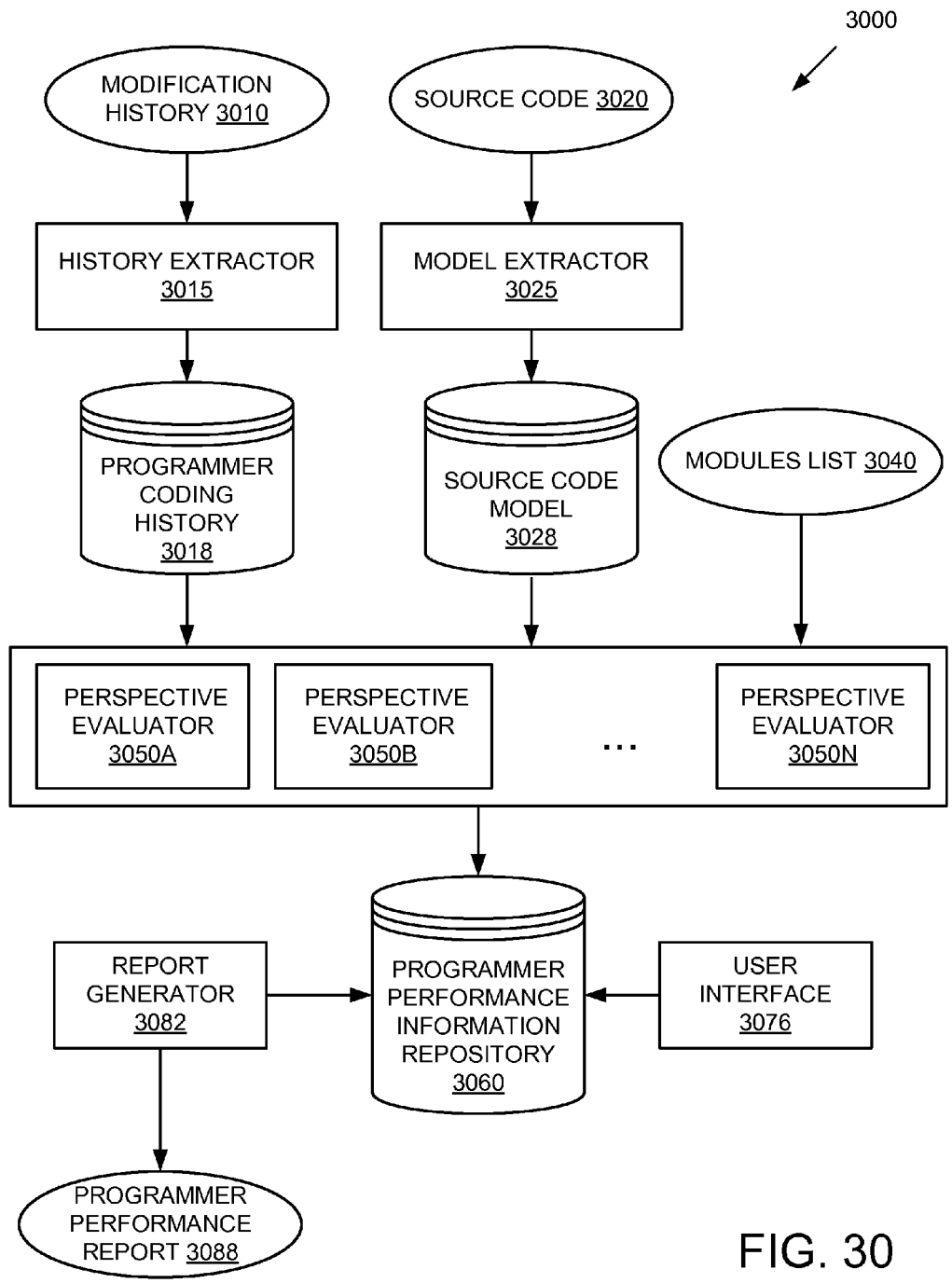
FIG. 30 is a block diagram of an exemplary alternative embodiment system to generate modularization quality evaluation results.

FIG. 30 is a block diagram of an alternate embodiment of a system 3000 to generate modularization quality evaluation results. A history extractor 3015 uses a modification history 3010 to extract a programmer coding history 3018, which then may be stored in a programmer coding history database, which may be a stand-alone database or may be a portion of a larger database. The programmer coding history 3018 may be a programmer coding history 2100 (FIG. 21), or a different sort of programmer coding history.

A model extractor 3025 takes as input source code 3020, which may be source code 110 of FIG. 1. The model extractor 3025 then extracts a source code model 3028 which then may be stored in a source code database, which may be a stand-alone database, or may be a portion of a larger database. A modules list 3040, which may be an architectural description 320 (FIG. 3), may be used by the module extractor 3025 to produce the source code model 3028.

A series of perspective evaluators, 3050A, 3050B . . . 3050N, may then take as input the programming coder history 3018, the source code model 3028, and the modules list 3040 to evaluate the quality of modularization of the software, producing modularization metrics. Examples of such metrics include but are not limited to: structural metrics, (described with reference to examples 15 and 16), architectural metrics (described with reference to examples 15 and 16), size-based metrics (described with reference to examples 17 and 18), and similarity of purpose metrics (described with reference to examples 19 and 20).

In at least one embodiment, at least one of these metrics is calculated using a "before and after" technique. For example, prior to a code change by one or more programmers, and subsequent (e.g., immediately subsequent) to the code change. The definition of "code change" is meant to be very flexible, and embraces any sort of change or changes that are desired to be measured. Calculation of the metrics can be triggered based on a threshold amount of time that has passed (i.e., every week, month, quarter, etc.) or based on a threshold number of lines of code written, and so forth.

In such a case, the change in the modularization metric values indicates whether the programmer's change decreased the modularity of the system, increased the modularity of the system or maintained the modularity unchanged.

The metrics generated can then be stored in a programmer performance information repository 3060. Changes in metric values can be aggregated to arrive at the overall effect of the change, which, in turn, can represent the performance of the programmer for that given change.

A user interface 3076 can be used to specify report parameters for a report generator 3082. The report generator 3082 can pull information from, for example, the user interface 3076 and the programmer performance information repository 3060 to generate a programmer performance report 3088.

The programmer performance report may indicate a series of modularization metrics for one or more programmers. The change in the modularization metric values can indicate whether the programmer's change decreased the modularity of the system, increased the modularity of the system or maintained the modularity unchanged.

In another embodiment, a final performance score for respective programmers is calculated based on the performance for each, or a set of, individual changes, number of changes made and consistency of performance. In another embodiment, based on the modularity metric scores, programmers who have caused deterioration (low scores) of the system are identified. In another embodiment, for identified low-scoring programmers, the source-code changes made by them are analyzed and the type of changes which caused maximum damage is derived.

In another embodiment, analysis on the source code changes made by poor scoring programmers is performed to determine the modularity principles that were not followed. In another embodiment, the programmer performance report 3088 is generated based on the metric values for the final version of the system for programmers. In another embodiment of the present technique, refactoring solutions for improving the modularity of the system are presented.

Example 35

Exemplary Method to Generate Modularization Quality Evaluation Results

Figure 31:
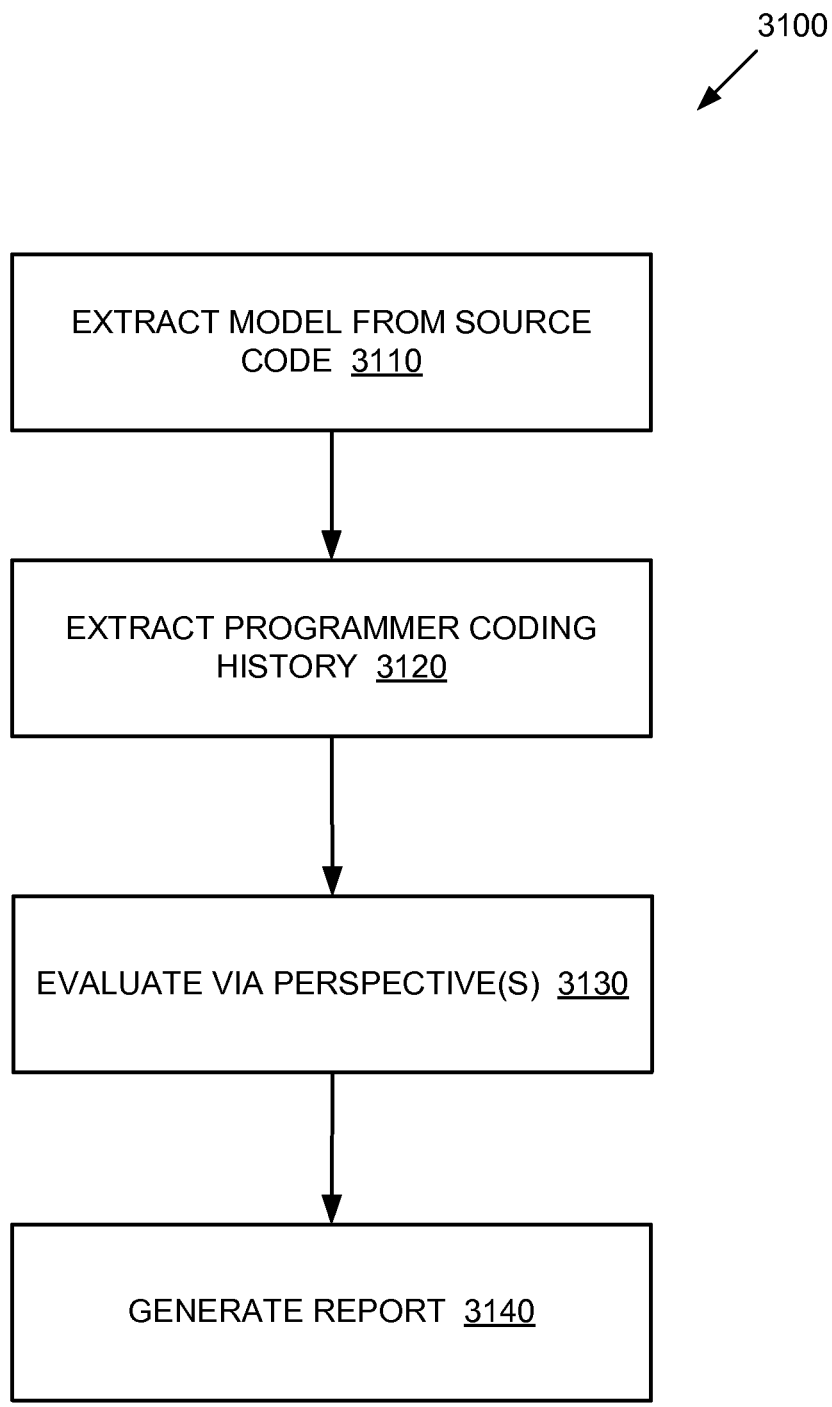
FIG. 31 is a flowchart of an exemplary alternative embodiment method to generate modularization quality evaluation results.

FIG. 31 is a flowchart of an exemplary method 3100 to generate modularization quality evaluation results. This method can be performed by the system 3000 of FIG. 30. At 3110, a model is extracted from the source code. At 3120, programmer coding history is extracted. The programmer coding history may be extracted from a modification history, such as the modification history 3010 of FIG. 30. At 3130, the programmer coding history and the model are evaluated via modularization perspectives. These modularization perspectives may be one or more of any of the perspectives discussed in the examples herein. At 3140, a report is generated which displays at least a portion of the results of the perspective evaluation.

Example 36

Figure 32:
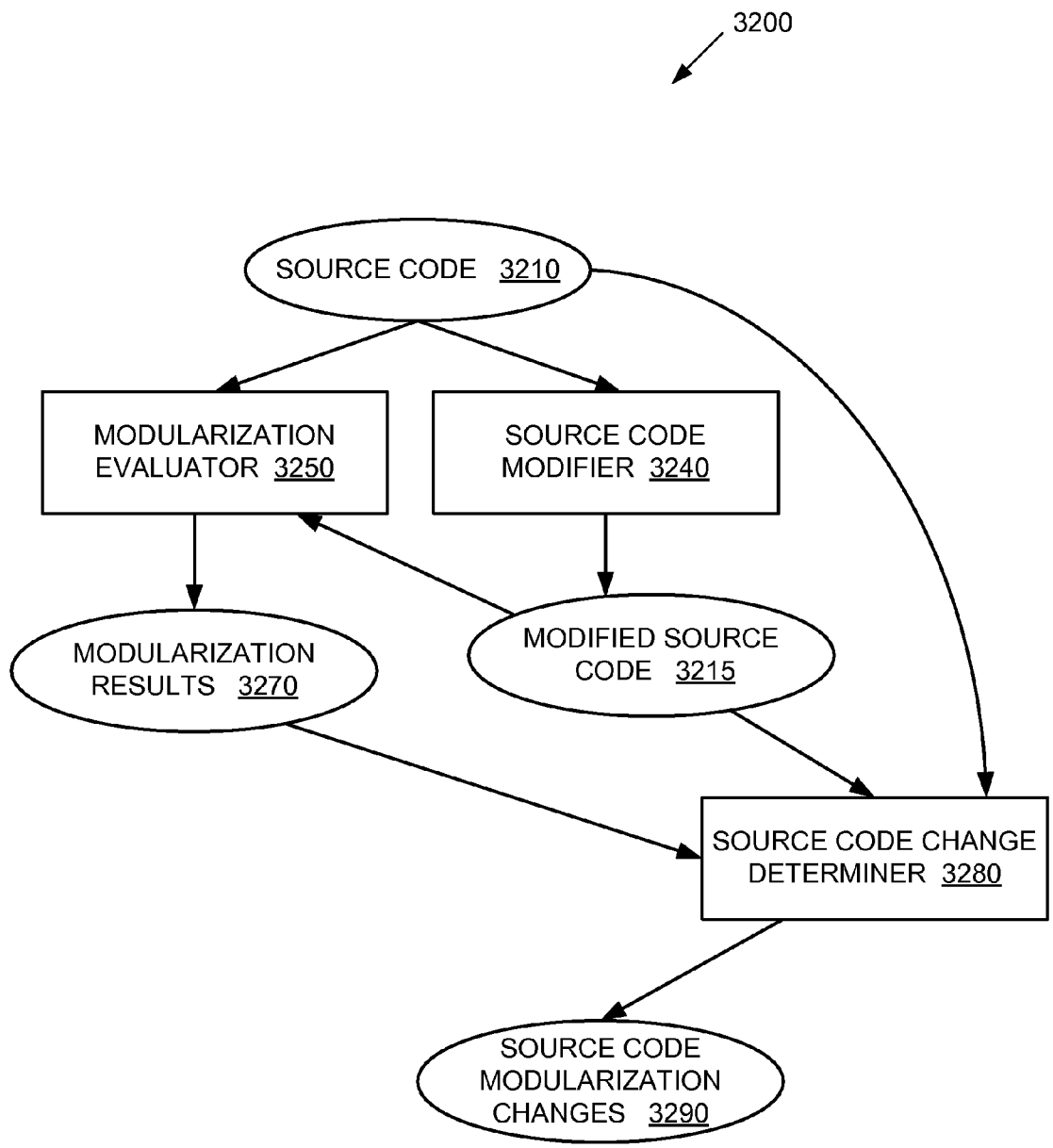
FIG. 32 is a block diagram of an exemplary system to determine which changes in source code produced a modularity change.

Exemplary System to Determine which Changes in Source Code Produced a Modularity Change FIG. 32 is a block diagram of a system 3200 to determine which changes in source code produced a modularity change. Source code 3210 (such as the source code 110 of FIG. 1 is processed by a modularization evaluator 3250 (such as the modularization evaluator 150 of FIG. 1 to determine modularization results 3270 (such as the modularization results 170 of FIG. 1 which correspond to how well (or poorly) the software code is modularized. The modularization evaluator 3250 can employ any of the modularization evaluators described herein. The source code 3210 is also processed by a source code modifier 3240, which allows changes to be made to the source code 3210. This creates modified source code 3215, which is also processed by the modularization evaluator 3250 to determine a separate set of modularization results 3270.

A source code change determiner 3280, which may be a commercially available version control software, then determines the difference between the source code 3210 and the changed source code 3215, to produce source code modularization changes 3290, which may be source code modularization results. By looking at the modularization results 3270 generated by the source code 3210 and the different modularization results generated from the changed source code 3215, in some embodiments, the source code change determiner 3280 can then determine which changes led to the differences in the modularization results 3270.

Examples of changes that lead to difference in modularization include but are not limited to: addition or deletion of functions, introduction of unwanted dependencies between functions in different modules, a function using a global element used by a function in another module, failure to use the API properly, ad-hoc function calls, calling functions in a higher layer from a lower layer, and so on.

Example 37

Exemplary Modularization Quality Report Overview

An exemplary report format that provides a diagnostic report related to the modularity of a system is described here; an example report for the system "Slim Tool" is shown in example 38. The report may have three parts, described below.

Part A gives a system level overview of the metrics which will be reported on.

Part B gives a more detailed description of each metric with respect to the Structural, Information, Size and Architecture viewpoints, in some embodiments. In an exemplary embodiment, if the user clicks any one of the metric links (e.g. MII—Module Interaction Index link), a detailed report for that particular metric is shown. An exemplary report for the MII metric has been shown in Example 39.

Part C gives analysis of modules from various design principles, for example, categorizing modules depending on whether or not they obey one of the design principle taught herein. For instance, under the design principle "All inter-module interactions should only be through API functions", there are various categories of modules which violate and obey the design principle.

Individual modules may also have reports. Example 41 shows an exemplary model analysis report containing a detailed analysis with respect to a given module and functions inside the module. The sections shown in this report are easily extendible for other type of metrics as and when they are introduced.

Example 38

Exemplary System Level Metric Report

Figure 33:
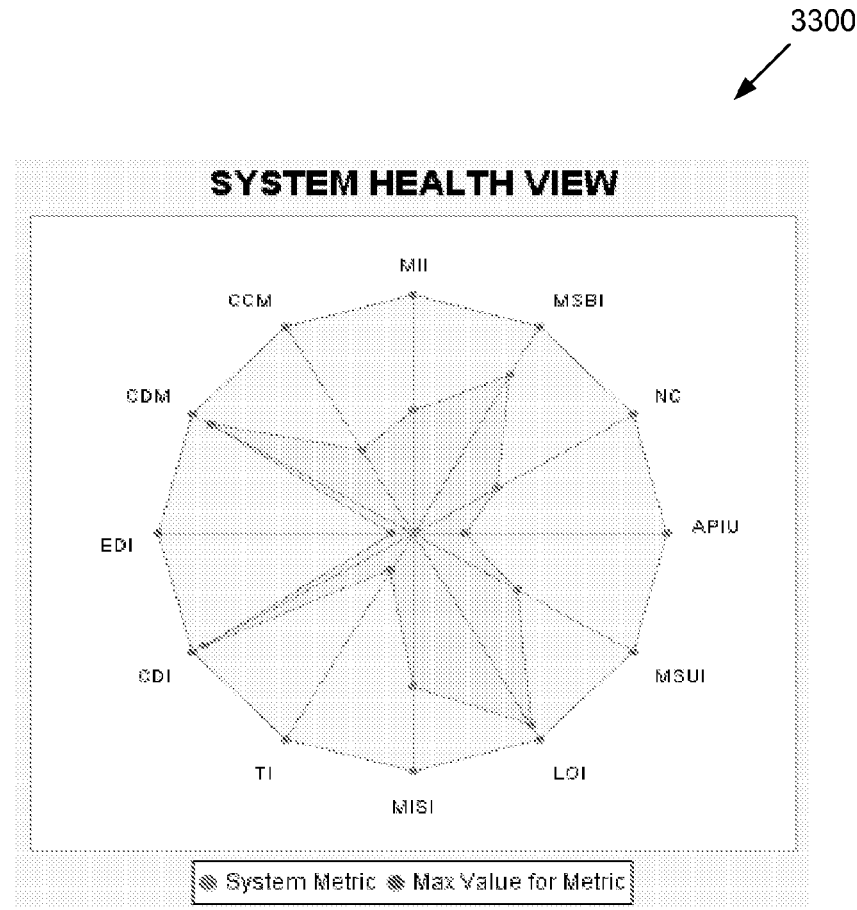
FIG. 33 is a diagram of an exemplary report graph which gives a graphical view of the degree of modularity of a system.

A sample system metric report is shown below. The system metric may have a system health overview chart which charts a selection of the system metric values that have been produced for a system using embodiments taught herein. For example, FIG. 33 shows a System Health View Chart 3300 that can be used to give an overall view of how well a system has been modularized.

System Metrics

| S. No | Metric Name | Metric Value |
|---|---|---|
| 1 | MII | 0.7 |
| 2 | NC | 0.878 |
| 3 | APIU | 0.513 |
| 4 | IDI | 0.643 |
| 5 | MSUI | 0.712 |
| 6 | MSBI | 0.363 |
| 7 | CDI | 0.875 |
| 8 | LOI | 0.657 |
| 9 | MISI | 0.725 |
| 10 | NTDM | 0.56 |
| 11 | CCM | 0.45 |
| 12 | CDM | 0.55 |

A) Structural Viewpoint

These metrics measure the function call traffic through the API functions of modules in relation to the overall function call traffic 1. MII—Module Interaction Index This metric can calculate how effectively a module's API functions have been used by the other modules in the system.

Example index values used for this report are shown below.

| | |
|---|---|
| MII->1 | This is the ideal case where all intermodule calls are routed only through API functions |
| MII->0 | This is not a desirable case and indicates that all external calls are made to the non-API functions of a module |
| MII = NA | Modules to which no external calls are made (typically driver modules) - the MII value is not applicable |

2. NC—Non-API Function Closeness Index

This metric is based on the principle that the non-API functions of a module should not be exposed to the other modules. This metric measures the extent to which non-API functions are being accessed by the other modules.

Example index values used for this report are shown below.

| | |
|---|---|
| NC->1 | This is the ideal case where no intermodule calls are routed through non-APIs |
| NC->0 | This indicates that there are no non-API (functions that internal) functions in the module |
| NC = NA | This indicates that no external calls are made to the module. |

3. APIU—API Function Usage

This index can determine what fraction of the API functions exposed by a module is being used by other modules. The intent of this index is to discourage the formation of large monolithic modules offering disparate services and encourage modules that offer specific functionalities. Any module A that depends on a module B should utilize some portion of the functionality offered by module B. Multiple modules should not depend on module B for varied functionality unless Module B is a utility module.

Example index values used for this report are shown below.

| | |
|---|---|
| APIU->1 | This is the ideal case where all the API functions of the module are utilized by other Modules |
| APIU->0 | This indicates that there are no API functions in the module and all the calls are made to non-API functions. |
| APIU = NA | This indicates that this module is not accessed by other modules |

4. IDI—Implicit Dependency Index

This index can measure the number of implicit dependencies that are created when the given module writes into global variables, with assumption being that any global variable that is written into may be accessed by another module. This index discourages the use of global variables for transfer of data across modules. Ideally, inter-module interaction should be through function calls (preferably through API functions).

Example index values used for this report are shown below.

| | |
|---|---|
| IDI->1 | All intermodule interaction is only through API functions. |
| IDI->0 | All intermodule interaction is only through implicit dependencies |
| IDI = NA | There are no function calls made from this module and this module does not create any implicit dependencies |

B) Size Viewpoint

This class of metrics attempts to measure how modular the system is in terms of the individual module's sizes. These metrics need not be applicable at Module level. The computed values are at system level.

1. MSUI—Module Size Uniformity Index

This index can measure the extent to which all the module sizes are similar.

Example index values used for this report are shown below.

| | |
|---|---|
| MSUI->1 | All modules are of similar size |
| MSUI->0 | There is a very high deviation in module sizes |

2. MSBI—Module Size Boundedness Index

This can index measure how similar the module sizes are with respect to a magic (optimal) size which can be provided by a subject matter expert.

Example index values used for this report are shown below.

| | |
|---|---|
| MSBI->1 | All module sizes are the same as the magic size |
| MSBI->0 | All module sizes are very different from the magic size |

C) Architectural Viewpoint

These metrics measure the extent of organization of the modules into higher level structures, especially the horizontal layered structures. The assumption behind these metrics is that not all of the modules exist in the same level of utility and that there exists some hierarchy.

1. CDI—Cyclic Dependency Index

This index measures the number of cyclic dependencies that exist across modules within a system. Modules A, B and C are said to be in a cycle when A depends on B, B depends on C and C depends on A. This metric need not be applicable at Module level.

Example index values used for this report are shown below.

| | |
|---|---|
| CDI->1 | There are no cyclic dependencies across modules in the system |
| CDI->0 | All the modules of the system are cyclically dependent |

2. LOI—Layer Organization Index

A module is assumed to be well layered when calls that are made to modules in a given layer are made from modules in the layer immediately above them. This index can measure the extent to which this principles in followed. This metric need not be applicable at Module level.

Example index values used for this report are shown below.

| | |
|---|---|
| LOI->1 | All the external calls to modules in any layer are made only from modules in the immediate upper layer. |
| LOI->0 | None of the external calls to modules in any layer are made from modules in the immediate upper layer. |

3. MISI—Module Interaction Stability index

This index can measure the stability of intermodule dependencies. Assuming that large software systems are organized into horizontal layers, a desirable property of this architecture may be that the modules in the lower layer be more stable in relation to the modules in the upper layers. Thus, changes made to the overall software should be concentrated to the upper layers. Also, to the extent possible, the changes should not impact the lower layers. This metric is based on the assumption that each module should depend on other modules that are in the same or lower layers. The value of this metric may indicate the changeability of the system.

Example index values used for this report are shown below.

| | |
|---|---|
| MISI->1 | This indicates that the module depends only on modules that are more stable than itself and hence is easily changeable. |
| MISI->0 | This indicates that the module depends only on modules that are more unstable than itself and hence is not an easily changeable system. |
| MISI = NA | This indicates that the module is not dependent on other modules. |

4. NTDM—Testability Index

Testability dependence can be created if the assessment of the correctness of the input-output relationships during the testing of a module depends on the correctness of the input-output relationship of another module. That is, if the testing of module m1 requires another module m2 to produce intermediate results that then are used in module m1, there is a testability-dependence between the two modules. This metric is based on the principle that every module should be dependent for testability on as few modules as possible.

Example index values used for this report are shown below.

| | |
|---|---|
| NTDM->1 | The module is testability dependent on no other module |
| NTDM->0 | The module is testability dependent on all of the other system modules |

D) Similarity of Purpose Viewpoint

These metrics can be based on the assumption that the purpose of any module is to provide a specific service and clues as to what that service is, is provided by the variable names, function names etc. that are used in the code. These keywords themselves are only a manifestation of the concept which is representative of the service that the module tries to provide.

Example index values used for this report are shown below.

1. CDM—Concept Domination Metric

This index measures the dominant concepts in a module. In a modularized system, ideally, each module should have only one dominant concept. A high number of dominant concepts in a module can indicate that the module provides different types of services.

Example index values used for this report are shown below.

| | |
|---|---|
| CDM->1 | Only one concept is dominant in the module |
| CDM->0 | All concepts are dominant in the module. |

2. CCM—Concept Coherency Metric

This metric is based on the notion that if a concept is central to the services offered by a module, then the mutual information between the module and the concept should be high. Mutual information between a concept and a module becomes high when each is able to predict the likelihood of the occurrence of the other with a high probability. This metric need not be measured at module level.

Example index values used for this report are shown below.

| | |
|---|---|
| CCM->1 | Each concept is unique to a module |
| CCM->0 | The concepts are distributed across all modules. |

Adherence to Modularity Principles

The various dimensions along which the quality of the software is improved by the encapsulation provided by modularization include understandability, testability, changeability, analyzability, and maintainability. Listed below are the Design Principles which when adhered to can ensure good modularization. These principles have been derived based on Research Literature as well as experience. For each of the below mentioned principles we list the modules that grossly violate the principles and provide details about the same, so that corresponding changes can be made so as to improve the modularity of the system.

All Inter-module interactions should only be through API functions

Modules that expose a large percentage of their non-API functions to other modules are:
  modules/module2
  modules/module3

Modules that have a high percentage of implicit dependencies (through global variables) with other modules are:
  modules/module1

Any Module A that depends on a Module B should utilize all or most of the API functions of Module B Modules with a large percentage of unutilized API functions are:
  modules/module4
  modules/module5

Modules that do not provide a complete service (No other module utilizes ALL of the API functions of the given module) are:
  modules/module2
  modules/module3

Modules that provide disparate services (API functions are utilized by a majority of the other system modules) are:

modules/module1
Module should more or less be of uniform size (this uniform size is a magic size that is decided upon by a domain expert)
Module size is much larger than the average module size:
 modules/module 1
Module size is much smaller than the average module size:
 modules/module2
 modules/module5
Module size is much larger than the magic module size:
 modules/module 1
Module size is much smaller than the magic module size:
 modules/module2
 modules/module5
Modules should not be cyclically dependent (Cyclic dependencies occur when there is a sequence of function calls between modules that starts and ends at the same module). Modules that are in a cycle and make back calls to upper layers are:
 modules/module2
 modules/module3
Module should be independently testable
Modules that are testability dependent on most of the other system modules are:
 modules/module1
 modules/module3
Module dependencies should be unidirectional. Modules should only depend on modules in the immediate lower layers.
Modules that call other modules in upper layers are:
 modules/module4
 modules/module5
Modules that call other modules in lower layers that are not the immediate lower layer:
 modules/module1
 modules/module3
Modules should be dependent only on other modules that more stable than them (Typically modules in a lower level of call hierarchy should be more stable) Modules with the most unstable dependencies are:
 modules/module2
 modules/module4
Each module should provide a distinct service.
The service that is provided by a module can be determined by considering the concepts that the module encapsulates. A (business) concept is the functionality or the idea that a module encapsulates; e.g. in a banking application the concepts would be loans, interest, term deposits etc. It is often recommended that a module be centered around one/two concepts. For example, a module may implement the concept "loan." It is not necessary that a concept is implemented by only one module. For instance, various services around the business concept "loan" can be implemented by several modules. But, it is not recommended that one module implements many concepts. That is, one should not implement a module that implements "loan", "credit card" and "calendar."
Modules which have no concepts are:
 modules/module2
 modules/module3
Modules which have no dominant concepts are:
 modules/module2
 modules/module3
Modules that have a high dominance of a majority of concepts are:
 modules/module2
 modules/module3
Concepts that are not dominant in most of the modules are:
 Concept3
 Concept4
Concepts that are dominant in most of the modules are:
 Concept5
 Concept6

Example 39

Exemplary Module-Level Metric Report Format for a Given Metric

Figure 34:
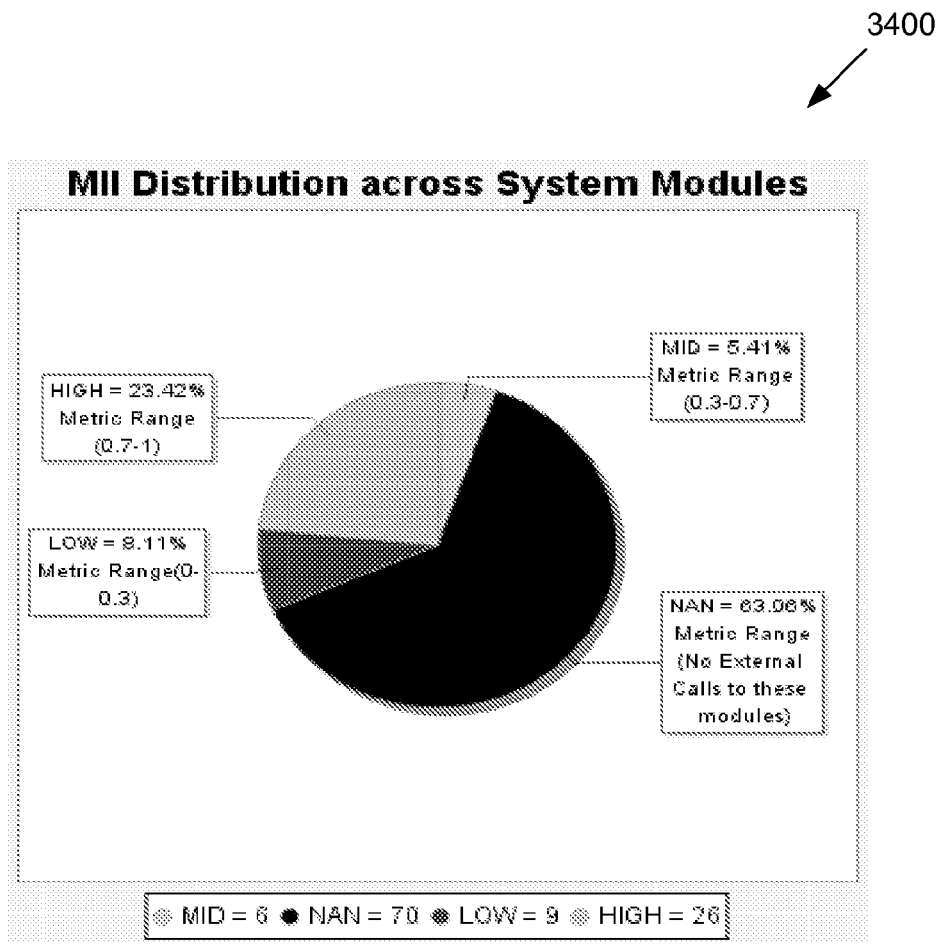
FIG. 34 is a diagram of an exemplary chart which shows the module interaction index value distribution across a given set of modules.

An exemplary metric report for a system with five modules reporting on the Model Interaction Index (MII) is shown below. The MII is discussed in greater detail with reference to example 15. The MII value in use here has been normalized such that the value ranges from 0 (worst) to 1 (best). A chart 3400 which shows MII distribution across system modules is shown with reference to FIG. 34. Even though not shown, similar charts for other indexes, such as the non-API Function Closedness Index, the API Function Usage Index, the Implicit Dependency Index, can also be included.

Module Level Metric Values for MII Metric

| S.NO | Module Name | MII Value |
|---|---|---|
| 1 | modules/module1 | NA |
| 2 | modules/module2 | 0.1 |
| 3 | modules/module3 | 0.2 |
| 4 | modules/module4 | 0.6 |
| 5 | modules/module5 | 0.98 |

Example 40

Exemplary Modularity Detail Report Format

An exemplary detailed report for a system level metric is shown below: Module-level diagnosis need not be provided for all metrics. For example, Size based metrics, Layering, Cyclic Dependencies, Domain Concept distribution in the system are reported only at the module level within these reports.

Details of Module Sizes in the System

Figure 35:
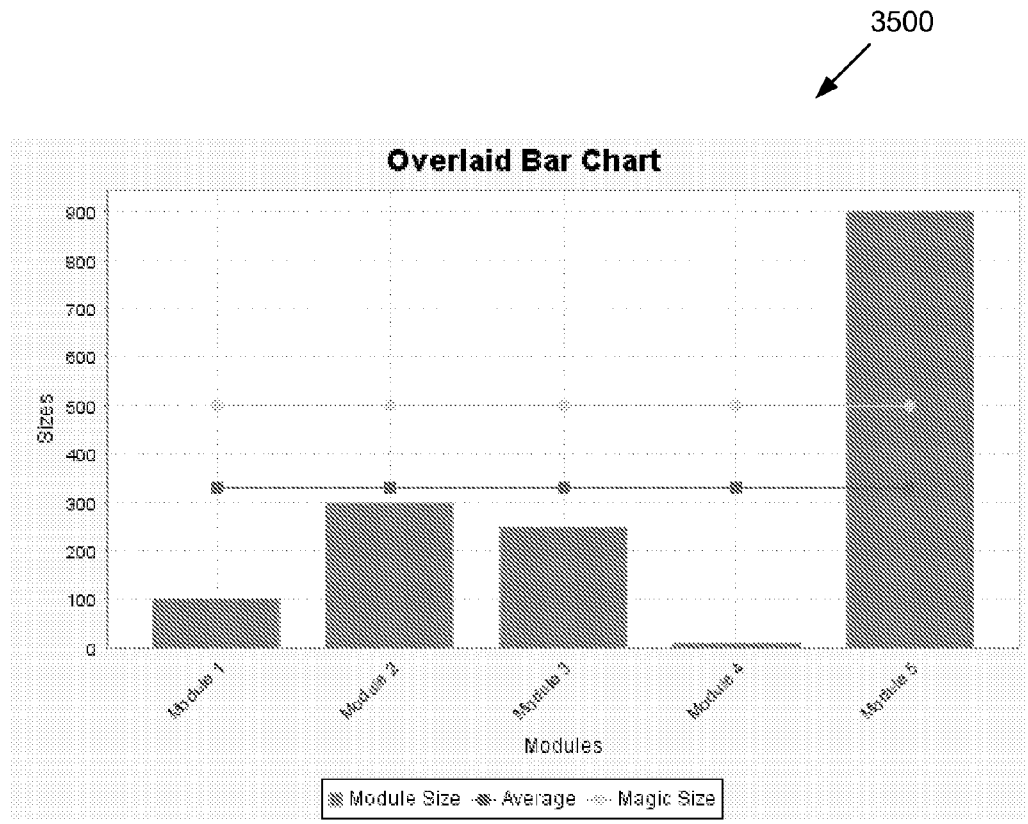
FIG. 35 is a diagram of an exemplary chart which shows actual module size, average module size and "magic module size" for a given set of modules.

With reference to FIG. 35, a Module size chart 3500 displays actual module sizes for a given set of modules in KLOC (Thousands of lines of code—not including blank/comment lines), the average size, and the Magic size of modules as received from, for example, a domain expert. Very large or very small modules tend to be prone to a larger number of errors and hence often require higher maintenance. Good modules should more or less be of similar size and should not be particularly deviant from the magic module size. The chart below gives the actual number of lines of code (in KLOC) for a selected set of modules.

| Module Name | Module Size(KLOC) |
|---|---|
| module 1 | 500 |
| module 2 | . . . |

Module Layering

The table below indicates the layers to which a module belongs and the Layer organization index (LOI) of a particular layer. "No. of back calls from layer" are the number of module dependencies that layer has with modules in upper layers. "No. of skip calls from layer" measure the number of calls that are made to layers below which are not the immediately adjacent layers.

| Layer Name | Module Name | No. of back calls from layer | No. of skip calls from layer |
|---|---|---|---|
| Layer 1 | Module 1, Module 2, Module 3 | 13 | 21 |
| Layer 2 | . . . | 11 | 17 |

Cyclic Dependencies Across System Modules

The "Cyclic Dependencies" table shows the number of cycles in the system and the participating modules in each of the cycles. Cyclic dependencies occur when there is a sequence of function calls between modules that starts and ends at the same module. The largest cycle is reported for each module. Cycles within cycles are not reported. If there are four modules M1, M2, M3 and M4, and M1 has a function call to M2, M2 has a function call to M3, M3 calls M4 and M4 has a function call back to M1, then M1, M2, M3 and M4 are in a cycle, which would most likely be reported. However, the cycles within this cycle would not be reported, such as a cycle consisting of M1, M2 and M3.

Cycles whose modules are in different layers are assumed to be instances of bad modularization.

| Cycle Name | Module Name | Cycle across layers |
|---|---|---|
| Cycle 1 | Module 1, Module 2, Module 3 | Yes |
| Cycle 2 | . . . | . . . |

Concept Distribution in the System

Figure 36:
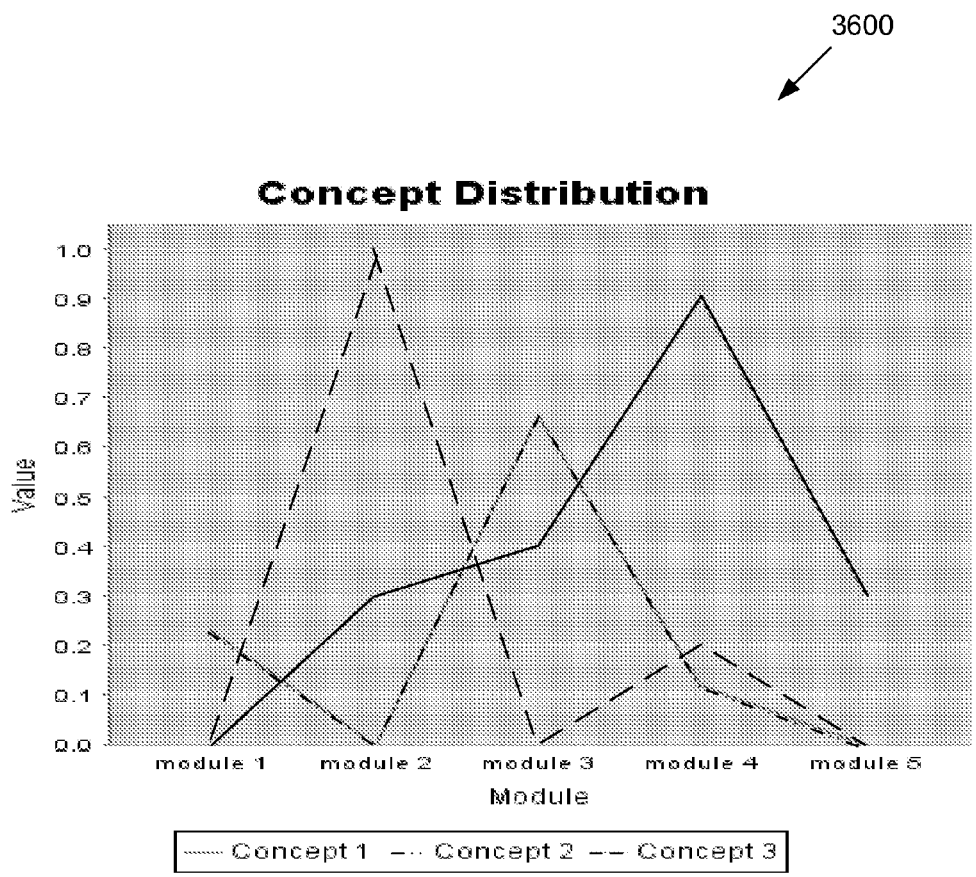
FIG. 36 is a diagram of an exemplary chart which shows concept distribution for a given set of concepts across a given set of modules.

FIG. 36 shows a diagram of an exemplary chart 3600 which shows concept distribution for a given set of concepts across a given set of modules. The chart displays the occurrence of each (or some) concepts in each (or some) modules. Ideally, concepts should be uniquely distributed across modules. The charts below show more specific information about the concepts with relation to the modules.

Concepts that are not Dominant in any Module

| Concept Name | Module Name | Dominance Measure |
|---|---|---|
| Concept 1 | Module 1 | 0.21 |
| Concept 2 | . . . | . . . |

Concepts that are Dominant in Most Modules

| Concept Name | Module Name | Dominance Measure |
|---|---|---|
| Concept 3 | Module 1 | 0.76 |
| Concept 2 | . . . | . . . |

Example 41

Exemplary Modularity Detail Report Format for a Given Module

An exemplary modularity detail report is shown below for an exemplary module, module3. The report has, among other features, a detailed analysis for a given module and for the functions inside the module. The report refers to "functions", but the term should be understood to mean any named block of code that performs a task, such that it encompasses functions, procedures, methods, and the like.

Modularity Details for Module Modules/Module3 Report

Details of Types of Functions in the Module

The functions implemented in the module have been classified as API (these should be the only functions that expose the functionality of the module to other modules), INTERNAL (these functions are typically not accessed by other modules), BAD (these are the non-API functions of the module that are accessed by other modules) and DEAD (These may be functions that are neither accessed by nor access other modules)

| Classification | Number of Functions |
|---|---|
| API | 6 |
| INTERNAL | 12 |
| DEAD | 60 |
| BAD | 4 |

Details of BAD Functions in the Module

BAD functions are the non-API functions of the given Module that are utilized by the other Modules. In an ideal case, the non API function of a Module should not be exposed to the rest of the system.

| Bad Function name | Bad File Name | Calling Module | Calling function | Calling file |
|---|---|---|---|---|
| bad function1 | bad file1 | calling module1 | calling function1 | calling file1 |
| bad function2 | bad file2 | calling module2 | calling function2 | calling file2 |
| . . . | . . . | . . . | . . . | . . . |

Details of API Function Usage by Other Modules

API functions that are exposed by a module should be utilized by other modules. Any module A that utilizes any API function of another module B should utilize most of the API functions of that module B since this indicates that module B offers a coherent service. If multiple modules were to access module B for several APIs, this may indicate that module B is not cohesive in the service that it provides and that it is either a badly designed module or a utility module.

Figure 37:
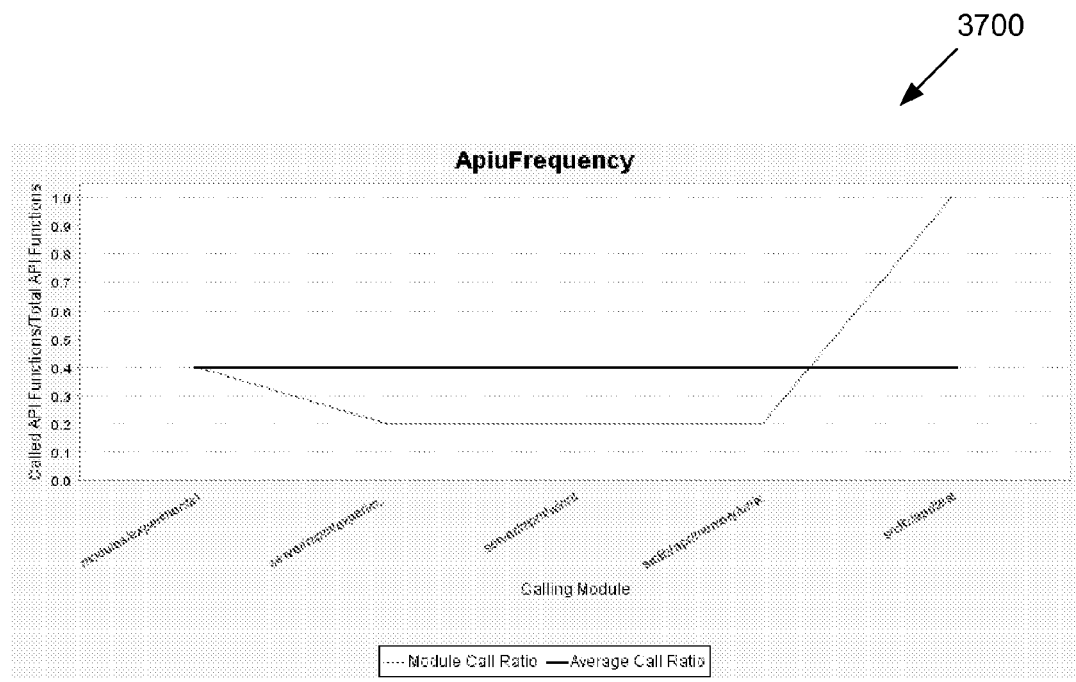
FIG. 37 is a diagram of an exemplary chart which shows the module call ratio per module and the average call ratio for a given set of modules.

FIG. 37 is a diagram 3700 shown an exemplary chart which shows the module call ratio per module and the average call ratio for a given set of modules.

The table below has more detailed information concerning the API functions called, which files calls the functions, which modules the functions are called from, and so on.

| API function | API file | Calling module | Calling function | Calling file |
|---|---|---|---|---|
| api function1 | dir1/apifile1 | module3 | function3 | dir3/calling file3 |
| api function1 | dir1/apifile1 | module4 | function4 | dir4/calling file4 |
| api function2 | dir2/apifile2 | not utilized | not utilized | not utilized |

Global Variables that are Written to by the Module.
Only the API functions of a module should be accessible to the other modules of a system. However, modules may use global variables to exchange data across modules. This is not a desirable design principle. Listed below are the global variables that are written to by this module:

| Function name | File Name | Global variable |
|---|---|---|
| ... | ... | ... |
| ... | ... | ... |

Module Size Details
The module size is measured in KLOC (thousand lines of code, excluding blank lines and commented lines). The Magic Size is a size considered acceptable for a given module. As mentioned, this Magic Size may be preset by an expert or may be derived by other means. Module Size—8 KLOC, Average size—9 KLOC, Magic Size—10 KLOC Details of Calls Made to Modules that are not in the Immediate Lower Layer
In a layered architecture, any module in a given layer is expected to make calls only to the modules in the layer immediately below it. The table below displays the cases where calls are made to the layer above as well as to modules that are not in the immediate lower layer.
This module is in layer 2

| Calling function | Calling file | Called layer | Called module | Called function | Called file |
|---|---|---|---|---|---|
| ... | ... | ... | ... | ... | ... |
| ... | ... | ... | ... | ... | ... |

Unstable Dependencies
In a layered architecture the modules in the lower layers are, in an ideal system, more stable than the modules in the higher layers. The more stable a module, the more work is required to make a change to the module. A module with many incoming dependencies is very stable because it requires a great deal of work to reconcile any changes with all the dependent modules. A module dependency is unstable if the module is dependent on any other module that is more unstable than the module itself. The table below displays these unstable dependencies
Instability Index for the module is 0.45

| Depends on Module | InStability index |
|---|---|
| ... | ... |
| ... | ... |

Figure 38:
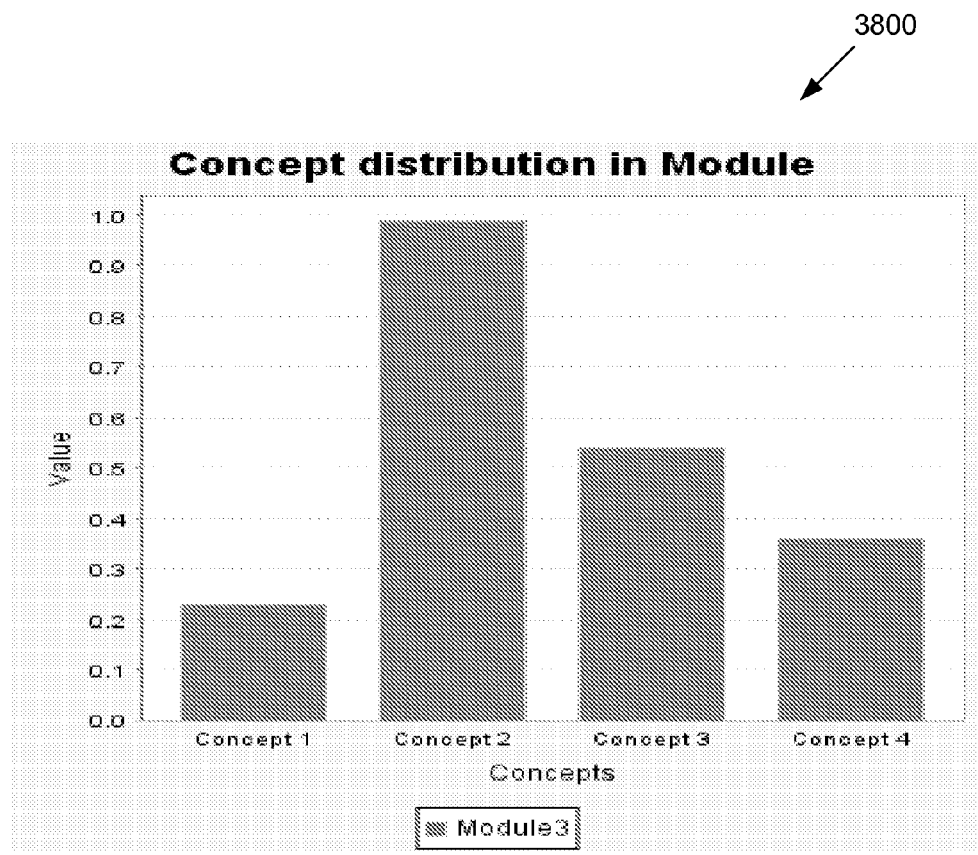
FIG. 38 is a diagram of an exemplary chart which shows the concept distribution for a given module.

Cyclically Dependent Modules
Modules in cycle 1—Module 1, Module 2, Module 3
Testability Dependence
A module A is testability dependent on another module B changes to module B require that module A also be tested. Typically modules in higher layers have more testable dependencies than modules in lower layers. The list below displays the modules on which the given module is testability dependent, and therefore impacted.
Module A is dependent on—Module B, Module C
Details of Concept Distribution in Module
FIG. 38 shows an exemplary chart 3800 which displays the distribution of various system concepts in the given module. In an ideal case only one (or few) concepts should be dominant in a given module as this would indicate that the module is related, generally, to one concept. If a module has several concepts with near-equal values then this may indicate that the module is poorly designed. As an exception, utility modules are expected to be related to more than one concept. Furthermore, any concept that is dominant in a module A should not also be a dominant concept in module B.

Example 42

Figure 39:
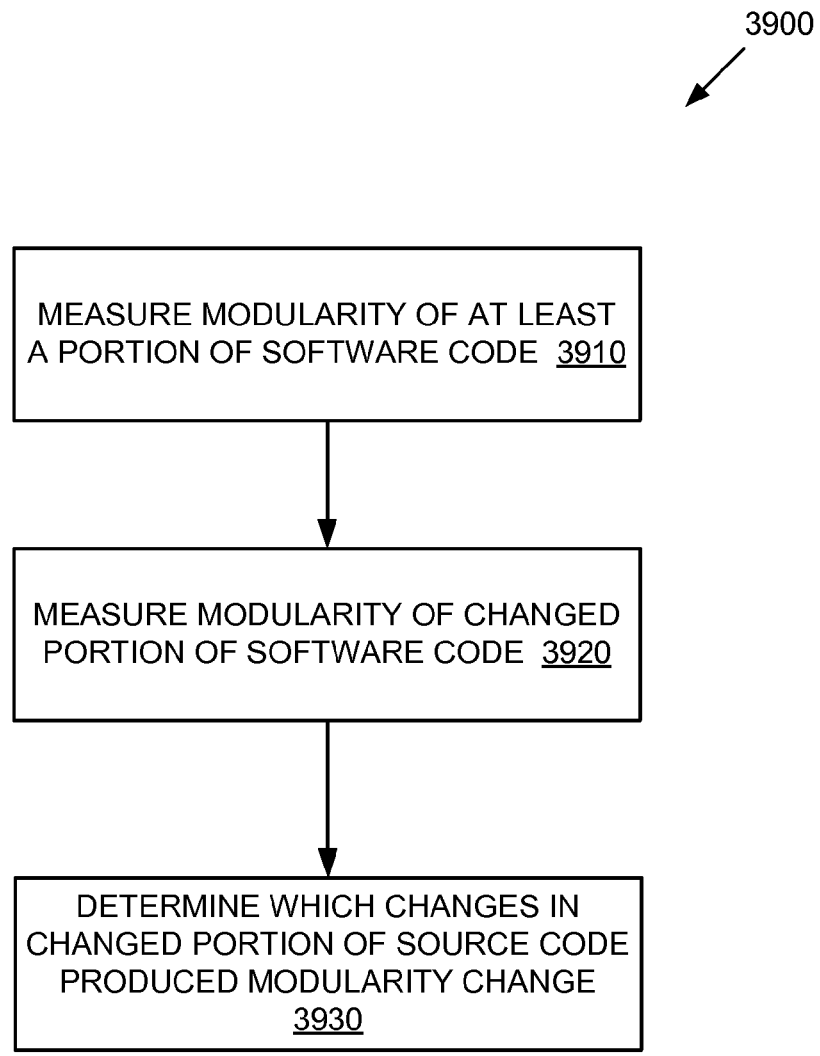
FIG. 39 is a flowchart of an exemplary method to determine which changes in source code produced a modularity change.

Exemplary Method to Determine which Changes in Source Code Produced a Modularity Change FIG. 39 is a flowchart of a method 3900 to determine which changes in source code produced a modularity change. The method can be performed, for example, by the system 3200 of FIG. 32. At 3910, the modularity of a least a portion of source code (such as source code 3210) is measured. At 3920, modularity of a changed portion of the source code is measured. At 3930, which changes in the changed portion of the source code produced the modularity change.

Example 43

Exemplary System to Determine Programmer Evaluation Results

Figure 40:
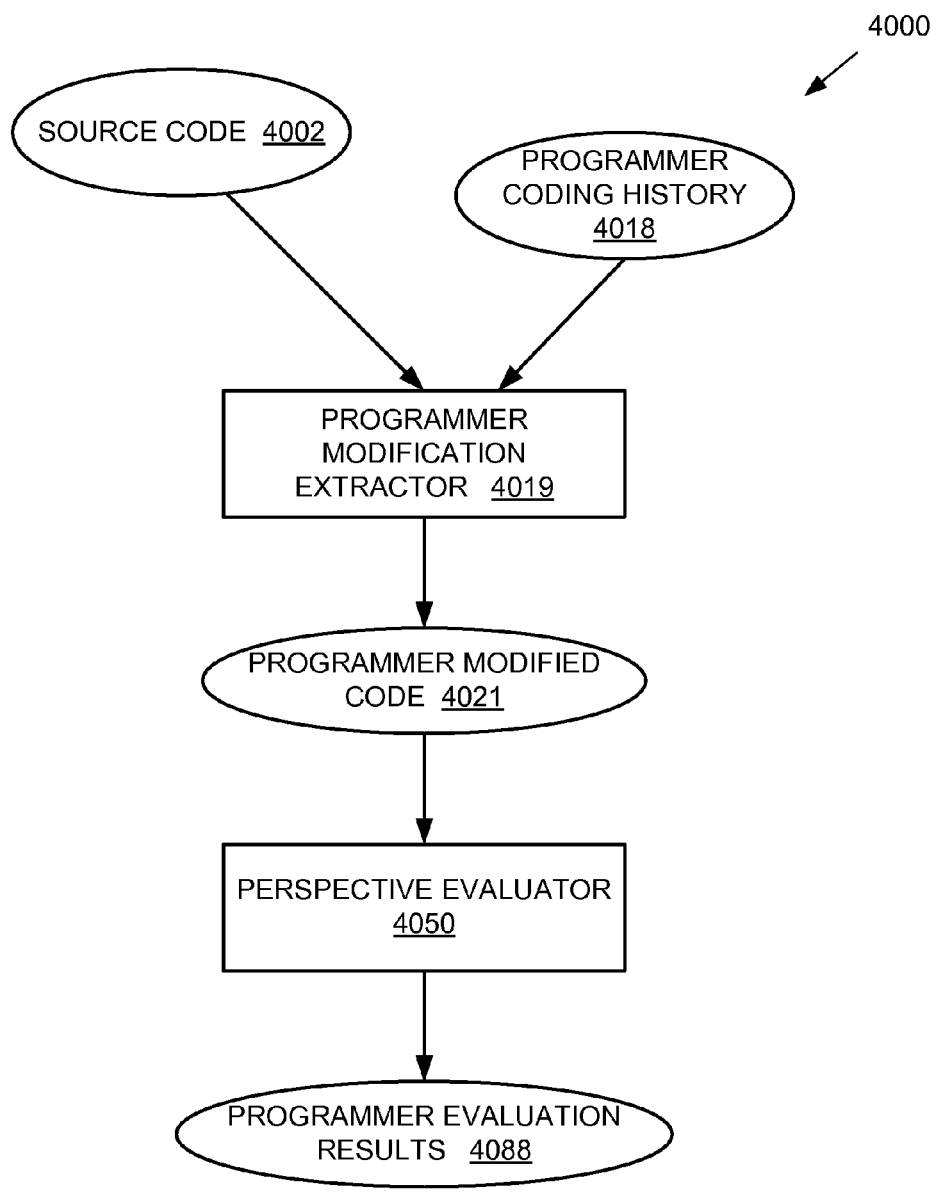
FIG. 40 is a block diagram of an exemplary system to determine programmer evaluation results.

FIG. 40 is a block diagram of an exemplary system 4000 to determine programmer evaluation results. Source code 4002, such as the source code 3020 (FIG. 30) and a programmer coding history 4018, such as the programmer coding history 3018 (FIG. 30) are input into a programmer modification extractor 4019 to produce programmer modified code 4021, which is code that has been changed by the programmer. This may also include portions of the code not changed by the programmer which can be used as a baseline for determining any resultant programmer evaluation results 4088.

The programmer modified code 4021 is then used by a perspective evaluator 4050 (which may be any of the perspective evaluators 3050A . . . 3050N (FIG. 30), and which may return one or more of the modularization indices (or metrics) discussed herein. This index (or indices) may then be used a portion or as the entire programmer evaluation results 4088, such as the programmer evaluation results 3088 (FIG. 30)

In an exemplary embodiment, the change in at least one the metric value indicates whether the programmer's change decreased the modularity of the system, increased the modularity of the system or maintained unchanged. Change in each of the metric values can be aggregated to arrive at the overall effect of the change (or changes) to the system made by the programmer which, in turn, represents the performance of the programmer for that given change or set of changes.

In another embodiment, a final performance score for a programmer is calculated based on the performance for each individual change, number of changes made and consistency of performance.

Example 44

Exemplary Method to Determine Programmer Evaluation Results

Figure 41:
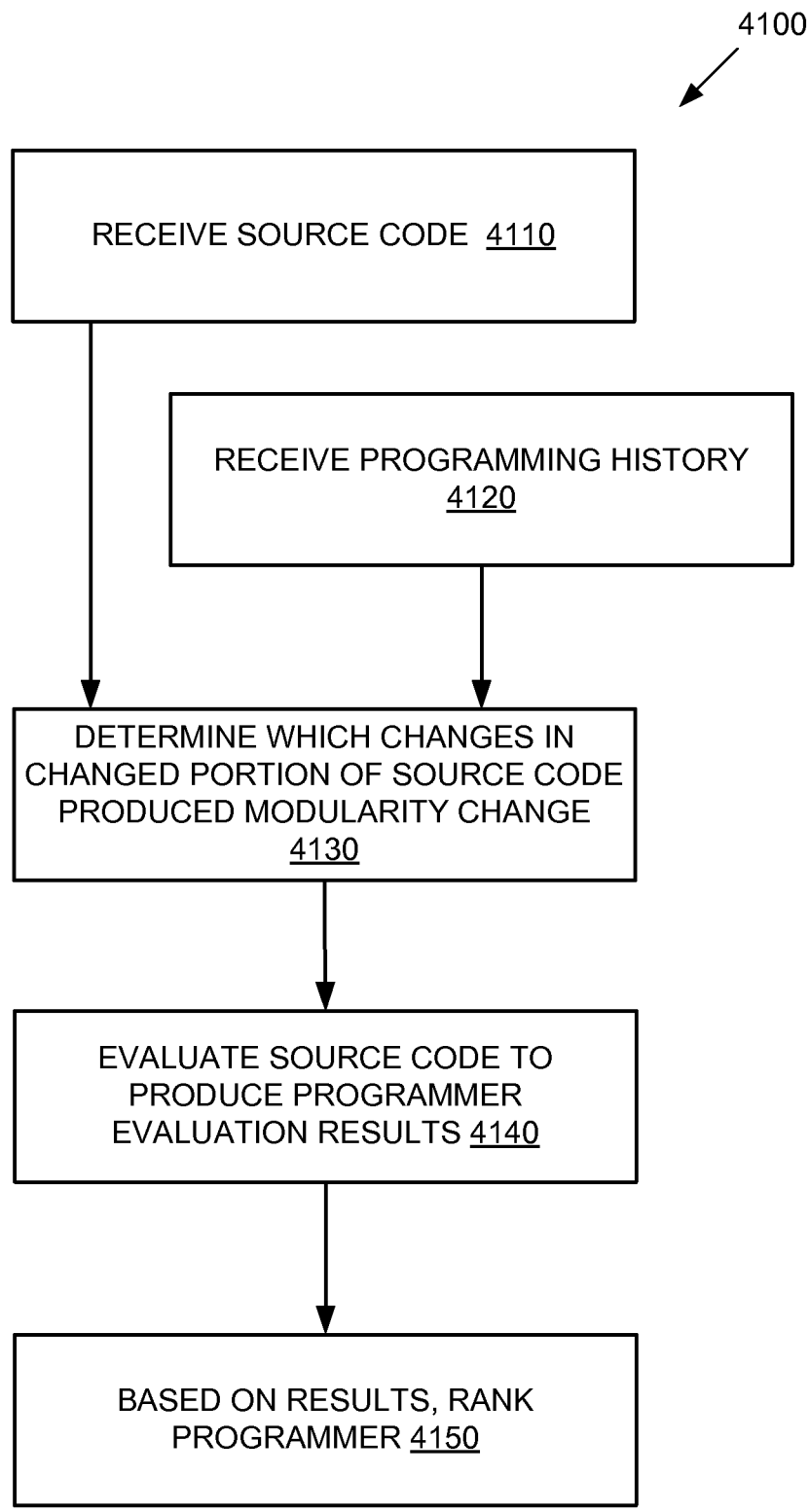
FIG. 41 is a flowchart of an exemplary method to determine programmer evaluation results.

FIG. 41 is a flowchart of an exemplary method 4100 to determine programmer evaluation results. The method 4100 can be performed, for example, by the system 4000 of FIG. 40. At 4110, source code (such as the source code 4002 of FIG. 40) is received. At 4120, a programming history such as the programmer coding history 3018 (FIG. 30) of a single programmer or multiple programmers is received. At 4130, the programmer coding history and the source code are used to determine which portion(s) of the source code has been modified by the programmer. In some embodiments, the programmer coding history is embedded with the source code; in other embodiments, the programmer coding history is saved as a separate document.

At 4140, the portion(s) of the source code that has been modified by the programmer is evaluated using at least one modularization metric. These modularization metrics may be any of the perspective evaluators 3050A . . . N, any of the modularization metrics discussed in any of the examples, and so on. This may generate programmer evaluation results, such as the programmer evaluation results 4188 (FIG. 41).

At 4150, which is optional, the programmer is ranked based on the programmer evaluation results against other programmers. This evaluation may be with other programmers working on the same source code, programmers working on other source code in the same system, programmers working on different systems, and so forth.

Once programmer evaluation results are known, corrective action can be taken to improve the overall quality of service of the maintenance by providing specific feedback to the programmers who have caused significant degradation of the software. As the specific portions of the software which were changed have been identified, the changes that the programmer made that caused the degradation in modularization can be identified and fixed. Thus, programmers will be much less likely to perform such activities in the future which cause modularity degradation. This, in turn, will keep the software more modular and maintainable.

Example 45

Figure 42:
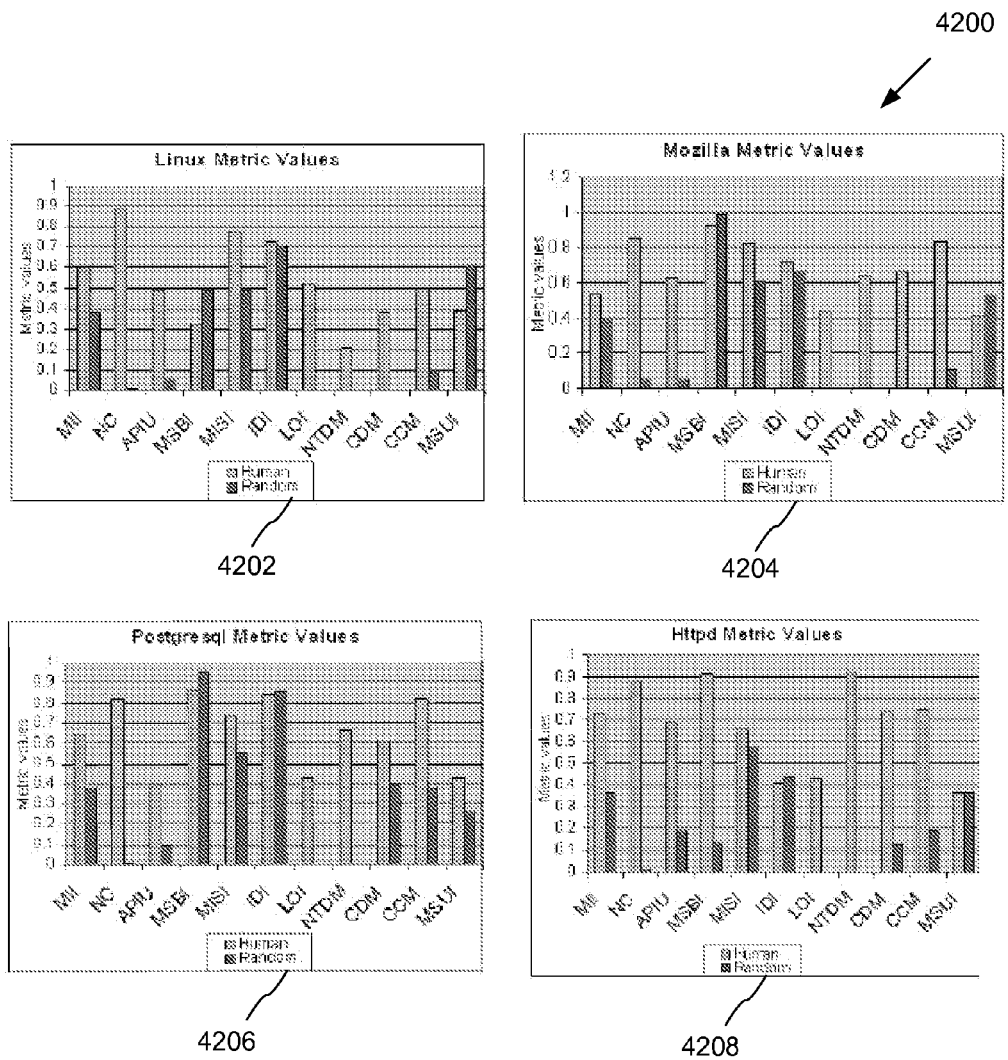
FIG. 42 is a diagram of exemplary modularization results demonstrating the difference between human and random modularization.

Exemplary Experimental Results Demonstrating the Difference Between Human and Random Modularization FIG. 42 displays four graphs which demonstrate exemplary experimental results demonstrating the difference between human and random modularization.

This randomization very roughly simulated what can happen over time as a large system is maintained—new features are added, and the software generally evolves to meet changing hardware and functional requirements.

For four systems, Linux (shown in 4202), Mozilla (shown in 4204), Postgresql (shown in 4206), and Apache (shown in 4208), each system is analyzed using the metrics described herein twice. First, the system with its modularization intact as originally designed by humans is analyzed. Second, the original modular structure of the software is destroyed by randomly assigning functions and files to modules, breaking the internal coherence of the module—the random modularization as shown in FIG. 42. Then, the broken systems are analyzed using the same metrics.

The graphs, 4202, 4204, 4206, and 4208, show the result of this analysis. As can be seen, the metrics, other than the size-based metrics, take a turn for the worse with random modularization. However, the size-based metrics, especially the MSUI metric, do not show large variation when moving from the human-supplied to the randomized modularization. The reason for this is not difficult to understand. Since the randomization mechanism is based on a uniform random number generator, the functions are more-or-less equally distributed across modules, resulting in a small standard deviation in module size.

The IDI metric also does not show major variation between human and random variation. Recall that the IDI of a module is the ratio of external function call count to the inter-module dependency count, using both functions and global variables. The randomization process randomly assigns functions to modules. However, the function-global variable dependency, obtained by static analysis of the source code, is not changed by the randomization process. As a result, the inter-module dependency count (through the unchanged global variables) is unchanged, for the large part. Furthermore, the random assignment of functions to modules, in many cases, does not have significant impact on the total count of external function calls.

These observations regarding the relative values of the various metrics speaks to the fact quality of modularization is best understood through a variety of metrics.

Example 46

Figure 43:
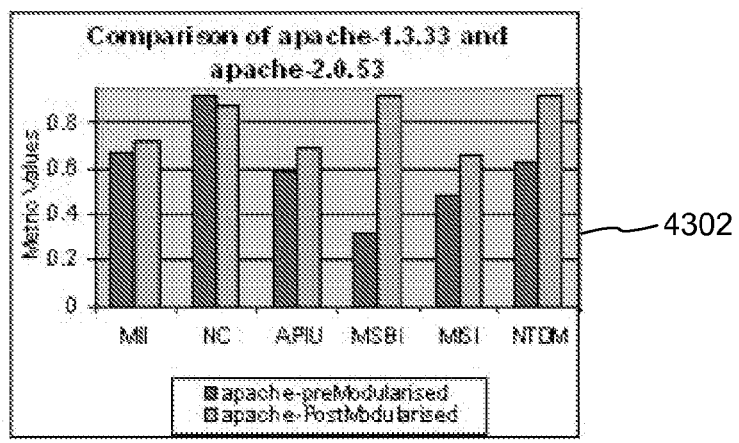
FIG. 43 is a diagram of exemplary modularization results demonstrating the difference between modularization of different versions of the same software.
Figure 43:
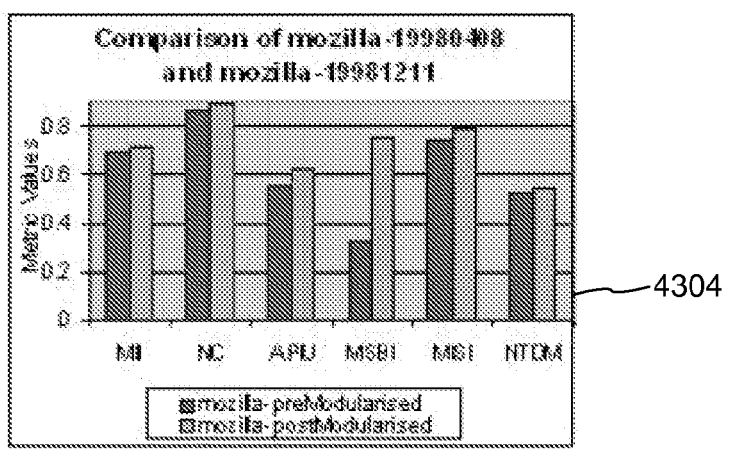

Exemplary Modularization Results Demonstrating the Difference Between Modularization of Different Versions of the Same Software FIG. 43 shows two graphs which display exemplary modularization results demonstrating the difference between modularization of different versions of the same software. The graph 4302 shows a comparison of modularization results between two different Apache versions: apache-1.3.33 and apache-2.0.53. As can be seen the Apache 2.0 system is more modular than the 1.3 system.

The graph 4304 shows a comparison of modularization results between two different Mozilla versions: mozilla-19980408 and mozilla-19981211. Previously-published reports indicate that mozilla-19981211 is better modularized than mozilla-19980408, borne out by this analysis.

Example 47

Figure 44:
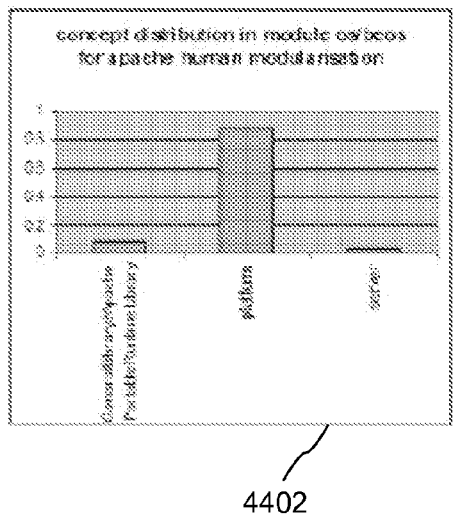
FIG. 44 is a diagram of exemplary concept frequency distribution for both human modularization and random modularization of two commercial software systems.
Figure 44:
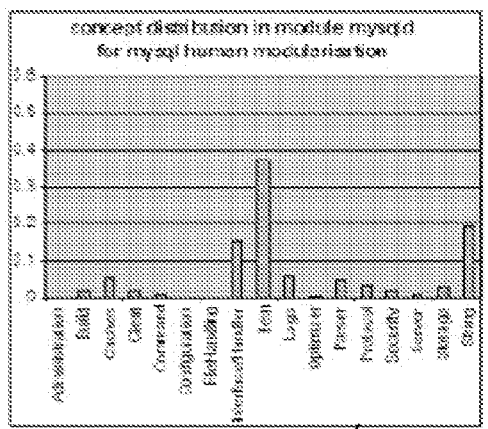
Figure 44:
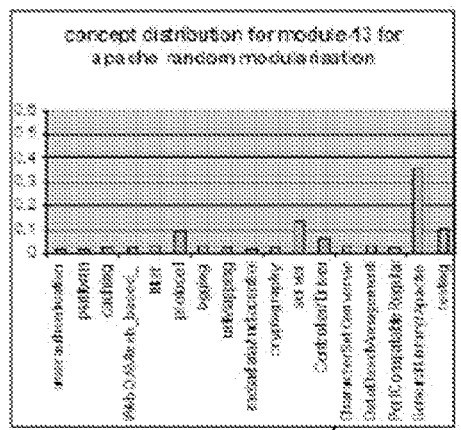
Figure 44:
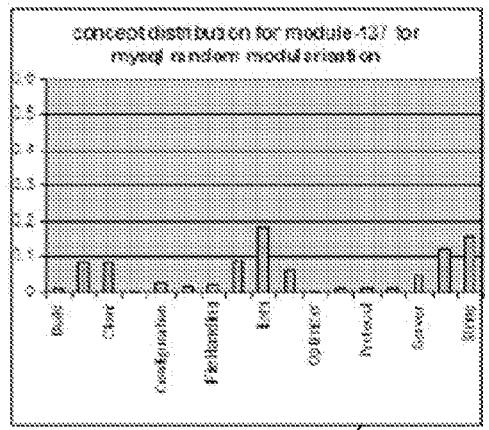

Exemplary Concept Frequency Distribution for Both Human Modularization and Random Modularization Across a Module of Two Commercial Software Systems FIG. 44 shows concept frequency distribution graphs for both human modularization and random modularization of two commercial software systems. The graph 4402 shows the concept distribution in the module os/beos that exists the Apache system; graph 4406 charts concept distribution for a module in the randomized version of the Apache software; module-13. Graph 4404 shows the concept distribution for the module mysqld in the actual mysql system. Graph 4408 shows the concept distribution for a random module (module-137) after the mysql system had been randomly modularized.

To analyze how concepts might be dispersed and concentrated across modules in a system, the frequency distribution for the concepts were examined. If a module had roughly equal occurrences of multiple concepts it is difficult if not impossible to determine a dominating concept for the module, and, thus difficult to attribute a similarity of purpose for the module. As shown at 4402, the module os/beos is dominated by the concept platform On the contrary, both randomly modularized systems show no such concept domination—as is to be expected, as functions assigned randomly to a module would have few dominating concepts.

Example 48

Figure 45:
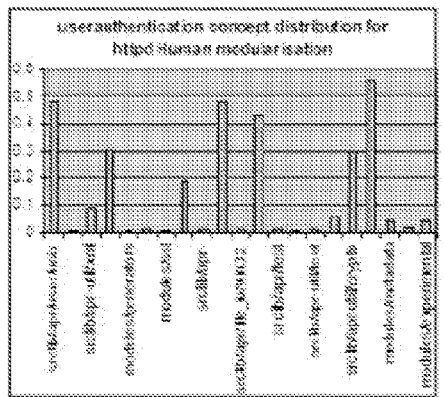
FIG. 45 is a diagram of exemplary concept frequency distribution for both human modularization and random modularization across multiple modules of two commercial software systems.
Figure 45:
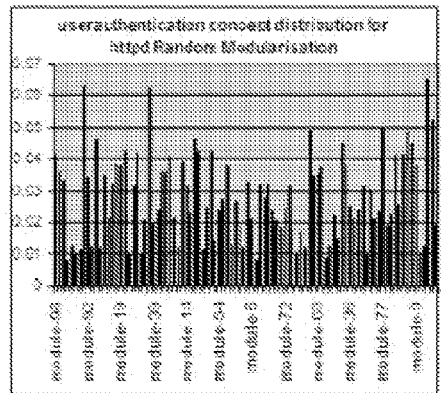
Figure 45:
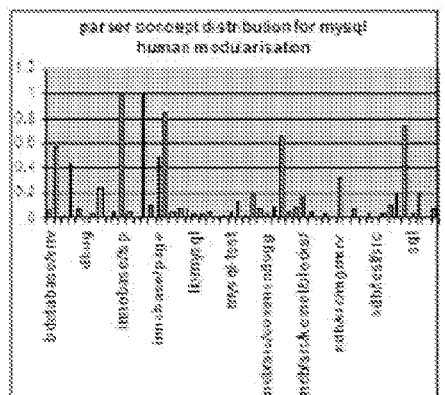
Figure 45:
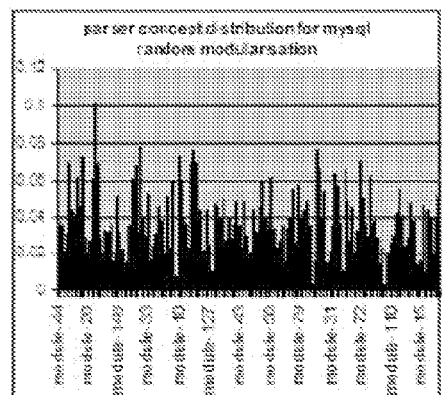

Exemplary Concept Frequency Distribution for Both Human Modularization and Random Modularization Across Multiple Modules of Two Commercial Software Systems FIG. 45 is a diagram of exemplary concept frequency distribution for both human modularization and random modularization across multiple modules of two commercial software systems. The graph 4502 shows the frequency that the concept "userauthentication" occurred in multiple modules of the source code for httpd. The graph 4504 shows the frequency concept "userauthentication" occurred in multiple modules of the source code for httpd, after the modules had been randomized. As can be seen, the concept "userauthentication" occurs in just a small number of modules in the human-modularized version 4502, but occurs in almost all modules in the random modularization 4504.

The graph 4506 shows the frequency that the concept "parser" occurred in multiple modules of the source code for mysql. The graph 4508 shows the frequency concept "parser" occurred in multiple modules of the source code for mysql, after the modules had been randomized. Similar to the results for httpd, above, as can be seen, the concept "parser" occurs in just a small number of modules in the human-modularized version 4506, but occurs in almost all modules in the random modularization 4508.

Example 49

Exemplary Programmer Performance Snapshot

Figure 46:
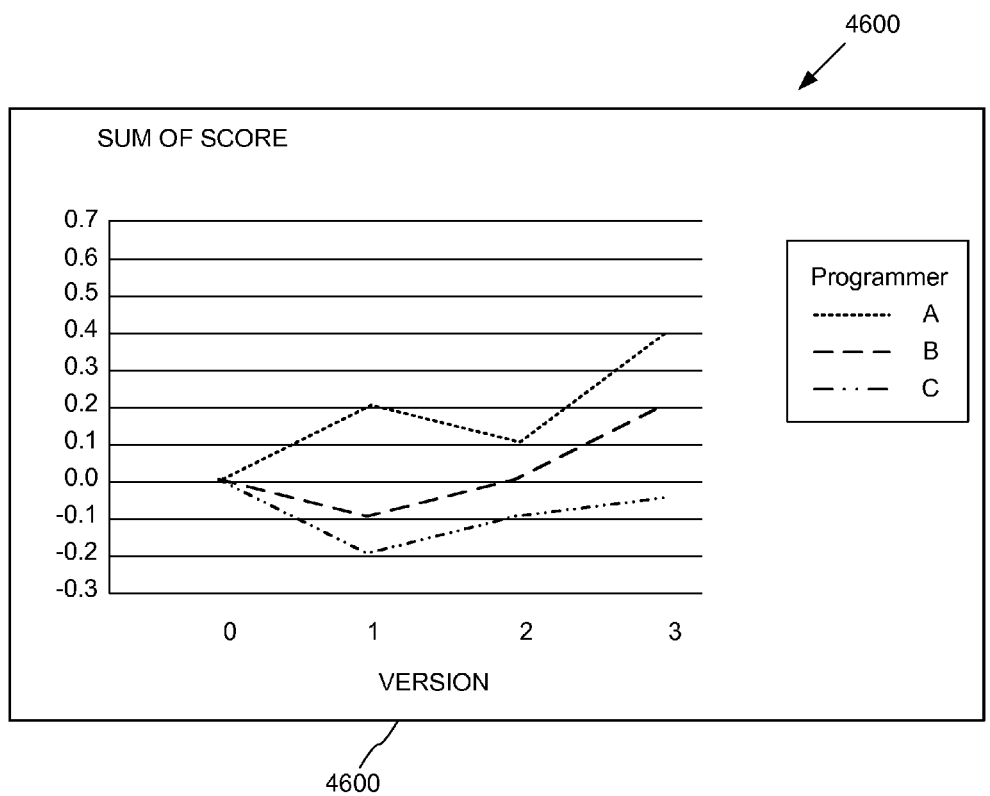
FIG. 46 is an exemplary programmer performance snapshot for a sample system.

FIG. 46 is an exemplary programmer performance snapshot 4600 for a sample system. The performance snapshot 4600 can be generated, for example, by the report generator 3082 (FIG. 30). This performance snapshot shows, for one or more respective programmers, a single score, which may be an averaged sum, a weighted average sum, etc., of modularization metrics determined to be the result of changes in the code caused by the respective programmer.

Example 50

Exemplary Programmer Comparison Snapshot

Figure 47:
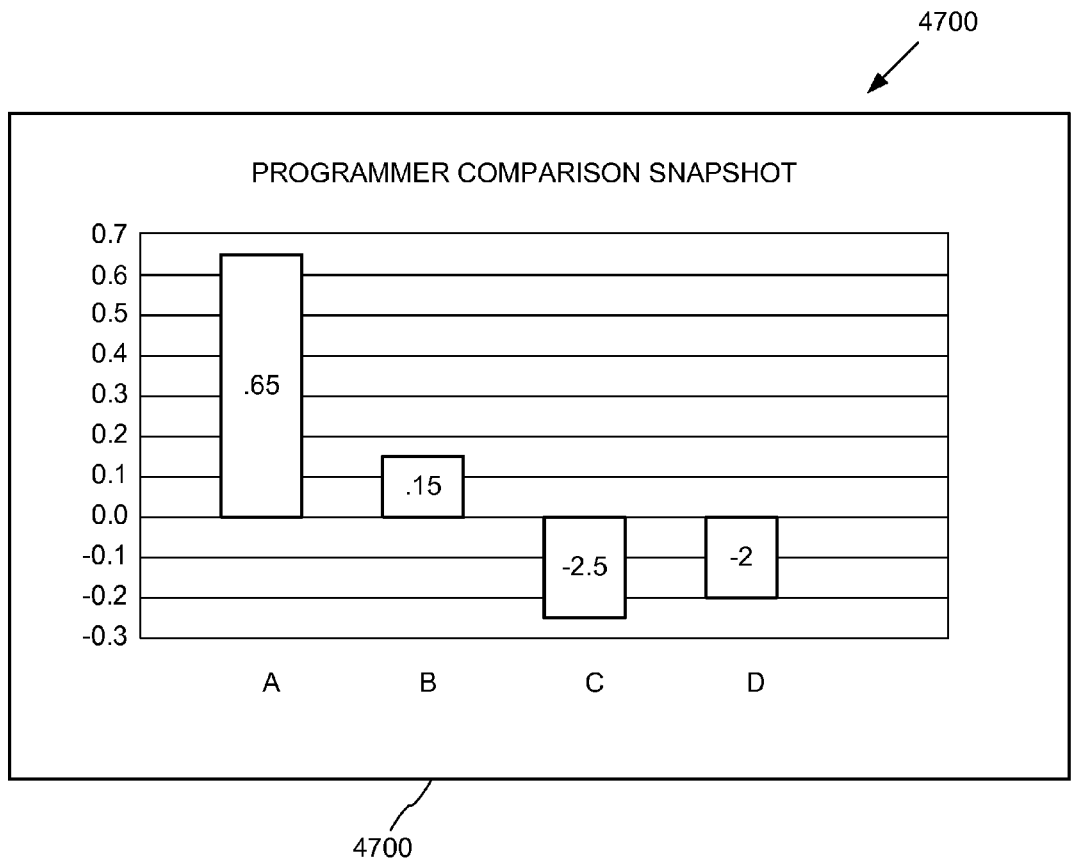
FIG. 47 is an exemplary programmer comparison snapshot for a sample system.

FIG. 47 is an exemplary programmer performance snapshot 4700 for a sample system. The comparison snapshot 4700 can be generated, for example, by the report generator 3082 (FIG. 30). This performance comparison snapshot shows, for multiple programmers, the relative degree to which each caused changes, for good or bad, to software system modularization. This allows ranking of programmers based on the skill with which they preserve software system modularization.

Example 51

Exemplary Experimental Results Using Methods Taught Herein

Figure 49:
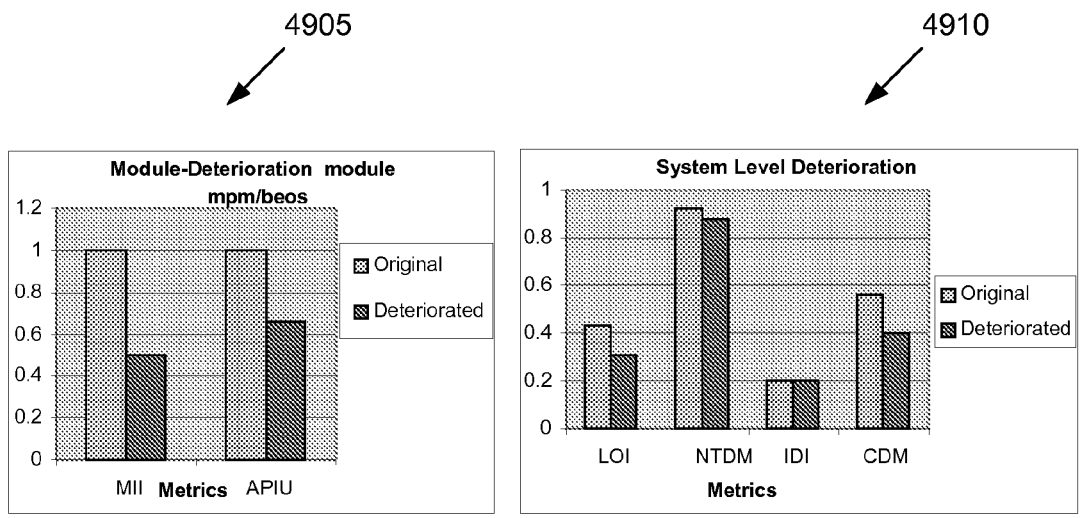
FIG. 49 is a diagram which shows module and system level deterioration due to changes in source code.
Figure 50:
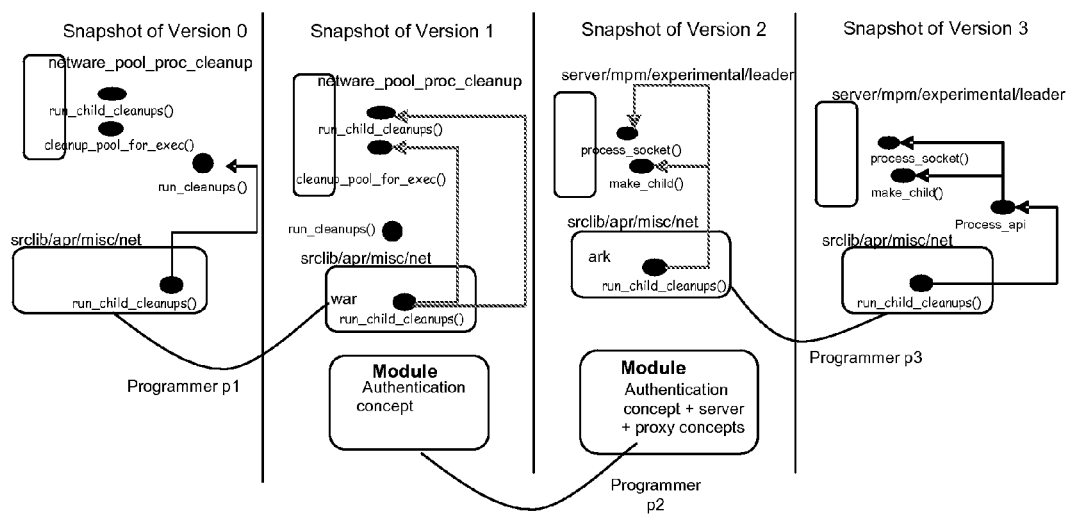
FIG. 50 is a series of snapshots of a software system showing changes made by programmers.
Figure 51:
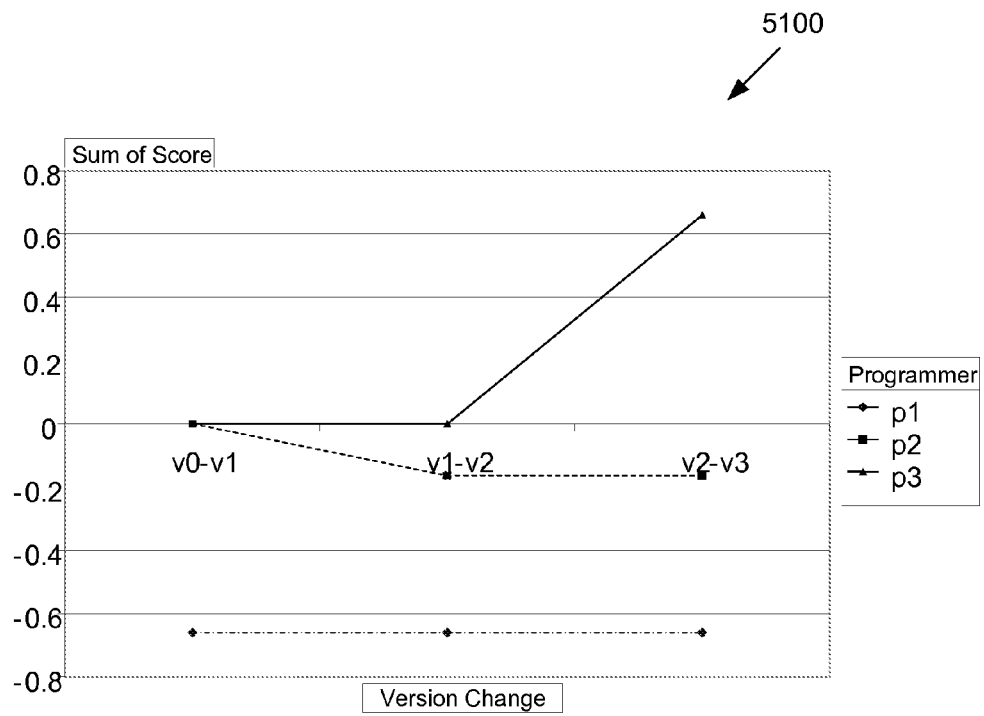
FIG. 51 is a performance snapshot of the system of FIG. 50 shown changes in modularity caused by programmer modifications.

This example documents experiments performed using methods taught herein. The open-source application Apache httpd web-server was used for the experiments documented herein. To evaluate the maintenance scenario shown in FIGS. 48 and 49 the source code was modified to add additional functions and to modify the function calling patterns. To analyze the capability of the tool to evaluate programmer, multiple versions of the system were created, as shown in FIGS. 50 and 51. Each version then had its source code altered. In both cases, neither the inherent structure of the modules was not changed; nor was the overall architecture of system.

Figure 48:
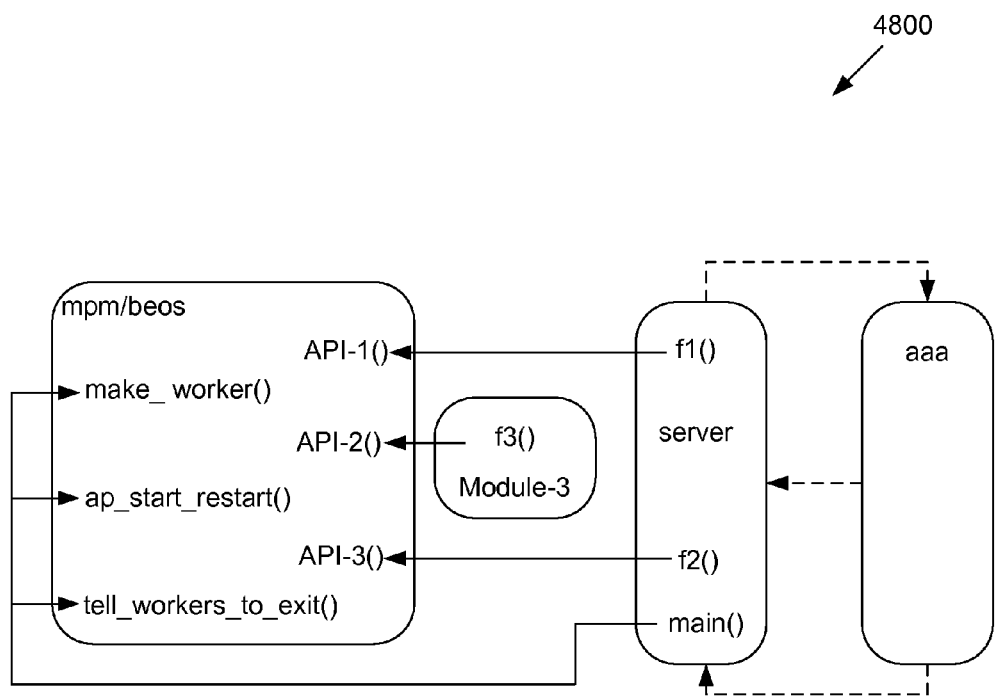
FIG. 48 is a diagram which shows changes in source code used to illustrate maintenance-caused module deterioration.

FIG. 48 shows the changes in source code made to sample module mpm/beos in httpd-2.0.53. The original module interaction between other models in the system (http and server) is streamlined, with all calls being made through api functions. During maintenance, a common mistake programmers make is to invoke an internal function of one module from a different module. To analyze this, function calls from module server were added to internal functions of mpm/beos. The following new function calls were added:

```
Main( ) => make_worker( )
Main( ) => ap_start_restart( )
main( ) => tell_workers_to_exit( )
```

The type of deterioration that is introduced into the system through these changes is quantified using MII (module interaction index, shown at 1153 in FIG. 11) and APIU (API function usage index, shown at 1159 in FIG. 11) metrics. A comparison of the MII and APIU values before and after deterioration is shown below, and in FIG. 49 at 4905.
Original: MII(Server/mpm/beos)=1
  APIU(Server/mpm/beos)=1
Post-Deterioration: MII(Server/mpm/beos)=0.5
  APIU(Server/mpm/beos)=0.66
Similarly, the chart at 4910 shows the system level deterioration in modularization as shown by decrease in the LOI (layer organization index, shown at 1333), NTDM (testability index, shown at 1359 in FIG. 13), IDI (implicit dependency index, shown at 1155 in FIG. 11), and CDM (Concept domination metric, shown at 1755 in FIG. 17).

To analyze the characteristics of layer organization index, specifically with respect to the code deterioration, consider the httpd-2.0.53 system module dependencies. An analysis of the module dependencies between modules of httpd-2.0.53 reveal that there exists a set of modules that are mutually dependent on each other. These modules are listed below.

```
server
server/mpm/beos
server/mpm/experimental/leader
server/mpm/mpmt_os2
server/mpm/prefork
server/mpm/winnt
```

One of the modularity deterioration patterns is the addition of a new module dependency that creates a set of mutually dependent modules or that increases the number of modules that are mutually dependent. This code deterioration is created by adding a new dependency of module srclib/apr/ threadproc/netware on module server/mpm/beos. i.e.: srclib/apr/threadproc/netware→server/mpm/beos This type of deterioration is quantified using the metrics: LOI and NTDM. A comparison of the metric values before and after modification is as shown below and in FIG. 49.

|                   |                      |
| ----------------- | -------------------- |
| Original:         | system LOI: 0.429    |
|                   | system NTDM: 0.9254  |
| post deterioration: | system LOI: 0.308  |
|                   | system NTDM: 0.8806  |

According to the principle of module interaction, interaction between modules should be explicit (i.e. through function calls) and not through global variables (i.e. Implicit). To simulate a deterioration of modularity by violating this principle new implicit dependencies between modules server and aaa have been added. The deterioration is quantified using the Implicit Dependency Index (IDI) metric. A comparison of the metric values before and after the deterioration is shown below, and in FIG. 49.
Pre deterioration System IDI=0.201432530120482
Post deterioration System IDI=0.199

Module aaa handles authentication, and only authentication, in httpd. The deterioration in modularity of aaa is simulated by mixing in disparate concepts: 'server', and 'proxy'. This is achieved by randomly adding 50 functions from module server and 30 functions from module proxy to module aaa.

This type of modularity deterioration is measured using the CDM metric. A comparison of pre and post deterioration metric values are as follows and shown in FIG. 49.

|                   |                       |
| ----------------- | --------------------- |
| Original          | CDM: 0.56121333395175 |
| Post deterioration | CDM: 0.397525672555241 |

Example 52

Exemplary Programmer Evaluation Experimental Result

FIG. 50 is a diagram that tracks the actions of three programmers over four different versions of source code. For each change by the programmer, the metric values prior to the change and after the change are calculated. The 'score' of a programmer is calculated as the difference between the post-metric value and the pre-metric value.
Experiment Details: Version 0-Version1

Version 0 depicts the original snapshot of modules srclib/apr/memory/unix, server/mpm/experimental/leader and their interactions.

The module srclib/apr/memory/unix has two internal functions run_child_cleanups and cleanup pool_for_exec. Programmer 1 adds a new function dependency from module srclib/apr/misc/netware to these two internal functions, thereby violating the module interaction principle.

The change in MII metric values from version 0 to version 1 as a result of the code change by programmer 1 is as follows:
Pre MII(srclib/apr/memory/unix)=1;
Post MII(srclib/apr/memory/unix)=0.33;
Experiment Details: Version 1-Version2

Programmer p2 adds some of the server and proxy functionality in module 'aaa,' an authentication module. This change violates the similarity of purpose principle. The change in CDM metric value from version1 to version2 is as follows:
CDM pre: 0.5612
CDM Post: 0.397
Experiment Details: Version 2-Version3

In the module server/mpm/experimental/leader, interaction with other modules violated the MII principle in version 2. The functions process_socket( ) and make_child( ) were invoked by srclib/apr/misc/network even though they were internal functions within a different module.

In version3, as part of the refactoring exercise, programmer 3 introduced a new api function process_api that exposed the functionality of the two internal functions to the external modules, with process-api directly calling those two internal functions. The change in the MII metric from version 2 to version 3 was as follows:
Pre MII(server/mpm/experimental/leader)=0.33
Post MII(server/mpm/experimental/leader)=1
Experiment Details: Programmer Evaluation.

FIG. 51 shows the overall change in system-wide modularity between versions for programmers 1, 2, and 3.

Example 53

Exemplary Computing Environment

Figure 52:
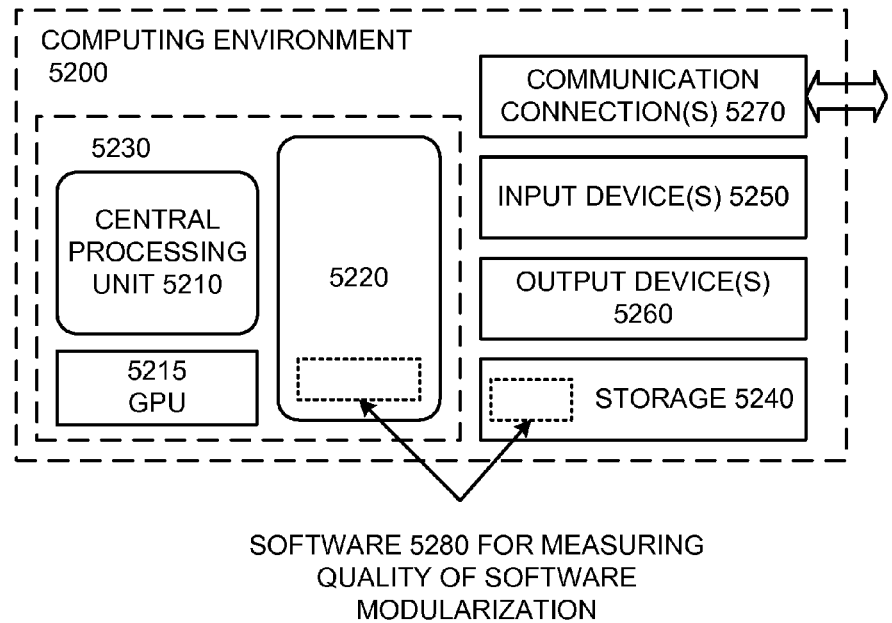
FIG. 52 is a block diagram illustrating an exemplary computing environment for implementing the software modularization quality metrics as taught herein.

FIG. 52 and the following discussion are intended to provide a brief, general description of an exemplary computing environment in which the disclosed technology may be implemented. Although not required, the disclosed technology including the modularization evaluator (150 of FIG. 1) was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 52 illustrates a generalized example of a suitable computing environment 5200 in which described embodiments may be implemented. The computing environment 5200 is not intended to suggest any limitation as to scope of use or functionality of the technology, as the present technology may be implemented in diverse general-purpose or special-purpose computing environments.

With reference to FIG. 52, the computing environment 5200 includes at least one central processing unit 5210 and memory 5220. In FIG. 52, this most basic configuration 5230 is included within a dashed line. The central processing unit 5210 executes computer-executable instructions and may be a real or a virtual processor. In a multi-processing system, multiple processing units execute computer-executable instructions to increase processing power and as such, multiple processors can be running simultaneously. The computing environment 5200 may also include a graphics processing unit (GPU) 5215, which assists in creating or speeding up graphics processing and display. Memory 5220 may be volatile memory (e.g., registers, cache, RAM), non-volatile memory (e.g., ROM, EEPROM, flash memory, etc.), or some combination of the two. The memory 5220 stores software 5280 implementing the described methods for measuring quality of software modularization. A computing environment may have additional features. For example, the computing environment 5200 includes storage 5240, one or more input devices 5250, one or more output devices 5260, and one or more communication connections 5270. An interconnection mechanism (not shown) such as a bus, a controller, or a network, interconnects the components of the computing environment 5200. Typically, operating system software (not shown) provides an operating environment for other software executing in the computing environment 5200, and coordinates activities of the components of the computing environment 5200.

The storage 5240 may be removable or non-removable, and includes magnetic disks, magnetic tapes or cassettes, CD-ROMs, CD-RWs, DVDs, or any other medium which can be used to store information and which can be accessed within the computing environment 5200. The storage 5240 stores instructions for the software 5280 implementing methods for measuring quality of software modularization.

The input device(s) 5250 may be a touch input device, such as a keyboard, mouse, pen, or trackball, a voice input device, a scanning device, or another device, that provides input to the computing environment 5200. For audio, the input device(s) 5250 may be a sound card or similar device that accepts audio input in analog or digital form, or a CD-ROM reader that provides audio samples to the computing environment 5200. The output device(s) 5260 may be a display, printer, speaker, CD-writer, or another device that provides output from the computing environment 5200.

The communication connection(s) 5270 enable communication over a communication medium to another computing entity. The communication medium conveys information such as computer-executable instructions, compressed graphics information, or other data in a modulated data signal.

Computer-readable media are any available media that can be accessed within a computing environment 5200. By way of example, and not limitation, with the computing environment 5200, computer-readable media include memory 5220, storage 5240, communication media (not shown), and combinations of any of the above.

Example 54

Methods in Computer-Readable Media

Any of the methods described herein can be performed via one or more computer-readable media (e.g., storage media) having computer-executable instructions for performing such methods.

Example 55

Exemplary Alternatives

The technologies of any example described herein can be combined with the technologies of any one or more other examples described herein.

In view of the many possible embodiments to which the principles of the disclosed technology may be applied, it should be recognized that the illustrated embodiments are only examples of the technology and should not be taken as limiting the scope of the following claims. We, therefore, claim as our invention all that comes within the scope and spirit of these claims.

We claim:

1. A computer-implemented system for evaluating programmer performance comprising:
   at least one processor; and
   memory, the memory comprising:
   a programmer history of at least one programmer;
   a model extractor configured to extract a source code model from source code; and
   a performance evaluator configured to produce a programmer performance evaluation using the programmer history and the source code model, wherein the production of the programmer performance evaluation comprises calculating a cyclic dependency index at least by dividing a number of strongly connected components in a directed module dependency graph by a number of nodes in the directed module dependency graph, the directed module dependency graph comprising arcs indicating module dependencies and nodes corresponding to modules;
   wherein the production of the programmer performance evaluation further comprises determining a change in a metric produced from the source code model from the source code and calculating a metric from a source code model from the source code after the source code is changed.

2. The computer-implemented system of claim 1 further comprising a report generator configured to produce a programmer performance report based on the programmer performance evaluation.

3. The computer-implemented system of claim 1 wherein the source code is divided into at least two modules and wherein the performance evaluator is configured to evaluate programmer performance for a plurality of the modules.

4. The computer-implemented system of claim 3 wherein the modules are divided into functions and wherein the performance evaluator is configured to evaluate programmer performance for a plurality of the functions.

5. The computer-implemented system of claim 1 wherein the performance evaluation comprises at least one normalized metric.

6. The computer-implemented system of claim 1 further comprising a modification history database and a history extractor, the history extractor operationally able to extract the programmer history of at least one programmer from the modification history database.

7. The computer-implemented system of claim 6 wherein the history extractor is operationally able to extract programmer history of at least two programmers from the modification history database and wherein the performance evaluator is operationally able to rank the two programmers based on their respective programmer performance evaluations.

8. The computer-implemented system of claim 1 wherein the performance evaluator further comprises at least one of:
   a coupling-based structural metric module operationally able to calculate a metric which measures function-call traffic through an API of at least one module of the source code;
   a size-based metric module operationally able to measure uniformity of module sizes in relation to total size of the source code;
   an architectural metric module operationally able to measure organization of source code modules into hierarchical partitions; or a similarity of purpose metric module operationally able to measure similarity of purpose of groupings within the source code.

9. The computer-implemented system of claim 1 wherein the performance evaluator further comprises a measurement of how well the source code adheres to modularity principles, the principles comprising at least one of: inter-module interactions should be through API functions principle, uniform size of module principle, non-cyclically dependence of module principle, modules should be independent testability of modules principle, unidirectional dependency of module principle, immediate lower layers dependence of modules principle, and distinct service of each module principle.

10. A computer enabled method for quantitatively evaluating programmer modification of source code comprising:
receiving data representing source code modification history;
extracting programmer coding history; and
measuring programmer performance over at least one modularization perspective using at least a portion of the programmer coding history and the source code modification history in producing a programmer performance measure, wherein producing the programmer performance measure comprises calculating a cyclic dependency index at least by dividing a number of strongly connected components in a directed module dependency graph by a number of nodes in the directed module dependency graph, the directed module dependency graph comprising arcs indicating module dependencies and nodes corresponding to modules;
wherein producing the programmer performance measure further comprises measuring a change in a metric value produced from a portion of source code and a metric value produced from the portion of source code after the portion of source code is modified.

11. The method of claim 10 further comprising presenting the programmer performance measure to a user via a user interface.

12. The method of claim 10 further comprising receiving instructions for a user performance report through the user interface, and generating the report using the instructions received through the user interface and the programmer performance measure.

13. The method of claim 10 wherein the modularization perspective comprises at least one of: a structural perspective, an architectural perspective, a similarity of purpose perspective or a size perspective.

14. The method of claim 10 wherein the programmer performance measure comprises programmer performance rating based on how well a programmer retained modularity of the source code, the rating comprising at least one of a structural perspective rating, an architectural perspective rating, a similarity of purpose perspective rating, or a size perspective rating.

15. A non-transitory computer-readable storage medium having computer-executable instructions for performing a method when executed by a computer, the method comprising:
receiving data representing source code modification history, the source code modification history comprising a name of a programmer;
extracting programmer coding history;
measuring programmer performance over at least one modularization perspective using at least a portion of the programmer coding history and the source code modification history in producing a programmer performance measure, wherein producing the programmer performance measure comprises calculating a cyclic dependency index at least by dividing a number of strongly connected components in a directed module dependency graph by a number of nodes in the directed module dependency graph, the directed module dependency graph comprising arcs indicating pairwise module dependencies and nodes corresponding to modules, wherein a strongly connected component comprises a set of nodes in the directed module dependency graph in which there exists a path from all nodes in the set of nodes to all other nodes in the set of nodes;
ranking the programmer against at least one other programmer based at least on the programmer performance measure; and
generating a programmer performance report based at least on the programmer performance measure;
wherein producing the programmer performance measure further comprises measuring a change in a metric value produced from a portion of source code and a metric value produced from the portion of source code after the portion of source code is modified.

16. A method for identifying modularity changes produced by a programmer comprising:
measuring modularity of source code to produce a first modularity measurement, wherein measuring modularity of the source code comprises calculating a cyclic dependency index at least by dividing a number of strongly connected components in a directed module dependency graph by a number of nodes in the directed module dependency graph, the directed module dependency graph comprising arcs indicating module dependencies and nodes corresponding to modules;
receiving modified source code, the modified source code modified by the programmer;
measuring the modularity of the modified source code to produce a second modularity measurement; and
evaluating the programmer based on the first and second modularity measurements, wherein evaluating the programmer comprises determining a difference between the first and second modularity measurements.

17. The method of claim 16 wherein evaluating the programmer based on the first and second modularity measurement comprises evaluating the programmer based on the difference between the first and the second modularity measurements.

18. The method of claim 16 further comprising:
determining differences between the source code and the modified source code; and
analyzing the differences between the source code and the modified source code to determine causes for differences in the first and second modularity measurements.

19. The method of claim 16 wherein the measuring modularity of the source code comprises measuring modularity using at least one of a structural perspective, an architectural perspective, a similarity of purpose perspective, or a size perspective.

20. A computer-readable storage memory having computer-executable instructions for performing a method when executed by a computer, the method comprising:
measuring modularity of source code to produce a first modularity measurement, wherein measuring modularity of the source code comprises calculating a cyclic dependency index at least by dividing a number of strongly connected components in a directed module dependency graph by a number of nodes in the directed module dependency graph, the directed module dependency graph comprising arcs indicating module dependencies and nodes corresponding to modules;
receiving modified source code; the modified source code modified by the programmer;
measuring the modularity of the modified source code to produce a second modularity measurement; and
evaluating the programmer based on the first and second modularity measurements, wherein evaluating the programmer comprises determining a difference between the first and second modularity measurements.

* * * * *